(12) United States Patent
Morvan et al.

(10) Patent No.: US 6,574,452 B1
(45) Date of Patent: Jun. 3, 2003

(54) METHOD AND DEVICE FOR COMMUNICATION ON A NETWORK

(75) Inventors: Isabelle Morvan, Rennes (FR); Alain Caillerie, Rennes (FR); Lionel Tocze, St. Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/345,968

(22) Filed: Jul. 1, 1999

(30) Foreign Application Priority Data

| Jul. 28, 1998 | (FR) | 98 09629 |
| Jul. 28, 1998 | (FR) | 98 09632 |
| Jul. 28, 1998 | (FR) | 98 09627 |
| Aug. 17, 1998 | (FR) | 98 10470 |

(51) Int. Cl.$^7$ ................................. H04B 7/15
(52) U.S. Cl. ................ 455/11.1; 455/517; 455/518
(58) Field of Search ................ 455/11.1, 422, 455/509, 9, 518, 517

(56) References Cited

U.S. PATENT DOCUMENTS

| 4,056,779 A | * 11/1977 | Toler .................... 325/4 |
| 4,935,927 A | 6/1990 | Kaewell, Jr. et al. .... 370/105.1 |
| 5,040,205 A | 8/1991 | Kunihiro .................. 379/61 |
| 5,121,391 A | 6/1992 | Paneth et al. ............. 370/95 |
| 5,259,017 A | 11/1993 | Langmantel ............. 379/58 |
| 5,260,993 A | 11/1993 | Breeden et al. .......... 379/266 |
| 5,317,624 A | 5/1994 | Obana et al. ............. 379/61 |
| 5,606,560 A | 2/1997 | Malek et al. ............. 370/347 |
| 5,790,938 A | * 8/1998 | Talarmo .................. 455/11.1 |
| 5,857,144 A | * 1/1999 | Mangum et al. ......... 455/11.1 |
| 6,047,160 A | * 4/2000 | Priest et al. .............. 455/11.1 |
| 6,169,880 B1 | * 1/2001 | La Fratta et al. |

FOREIGN PATENT DOCUMENTS

| DE | 196 45 731 A1 | 7/1998 |
| EP | 0 260 763 A2 | 3/1988 |
| EP | 0 455 987 A2 | 11/1991 |
| EP | 0 462 782 A2 | 12/1991 |
| EP | 0 711 057 A2 | 5/1996 |
| EP | 0 798 909 A2 | 1/1997 |
| EP | 0 766 415 A2 | 4/1997 |
| WO | WO 94 05101 | 3/1994 |
| WO | WO 95 24081 | 9/1995 |
| WO | WO 96 03823 | 2/1996 |
| WO | WO 97 45994 | 12/1997 |

OTHER PUBLICATIONS

Moralee D: "CT2—a new generation of cordless phones", IEEE Review, vol. 35, No. 5, May 11, 1989, pp. 177–180.

* cited by examiner

*Primary Examiner*—William Cumming
*Assistant Examiner*—Lana Le
(74) *Attorney, Agent, or Firm*—Fitzpatrick, Cella, Harper & Scinto

(57) ABSTRACT

The communication method of the invention applies to communication stations adapted to communicate with each other when at least one of said communication stations supplies a control signal, said station then functioning in "base station" mode and the stations not supplying a control signal then functioning in "mobile station" mode.

It includes, performed by at least one communication station functioning initially in base station mode:

an operation of determining the presence of a station functioning in mobile station mode, and when, during the presence determination operation it is determined that no station is functioning in mobile station mode, an operation of switching into mobile station mode, during which said station goes into mobile station node.

24 Claims, 40 Drawing Sheets

State of the art

Figure 1:
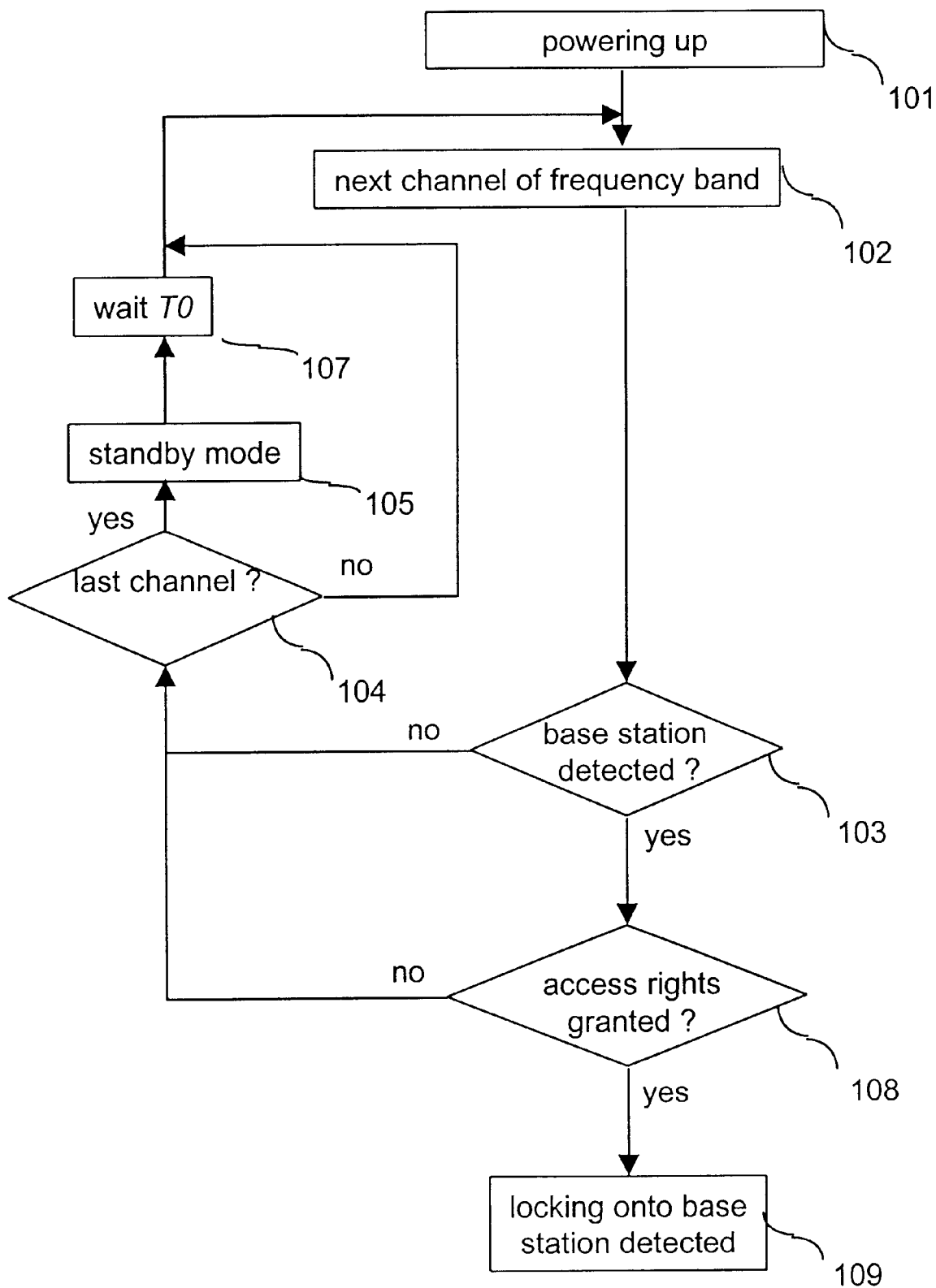

Fig. 1 : State of the art

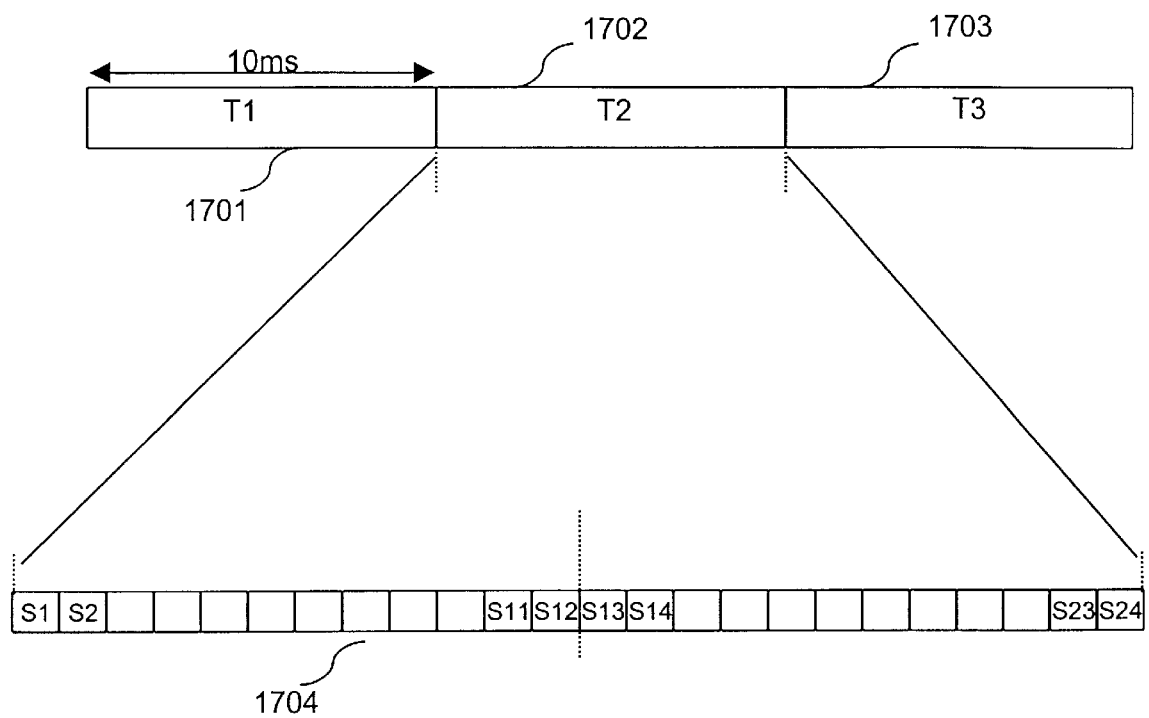
Fig. 17 : State of the art

METHOD AND DEVICE FOR COMMUNICATION ON A NETWORK

The present invention concerns a method and device for communicating on a network. It applies in particular to local wireless networks with centralised architecture, for which each communication is organised between a so-called base communication station, also referred to as the "fixed part", and a mobile communication station, also referred to as the "portable part".

An example of such a communication network is given by the telephones using the European DECT standard ("Digital Enhanced Cordless Telecommunication").

In such a local network, a base station supplies a synchronisation signal to all the mobile stations in the network. The set of stations (the base station and one or more mobile stations) which thus synchronise themselves with each other, constitutes a cell.

A particular problem with these networks is that, in the absence of a base station, there is no communication possible between the mobile stations since they are not synchronised.

The document U.S. Pat. No. 5,598,407 is known, which describes a local wireless network using the European DECT standard. The network consists there of a fixed base station and mobile stations. In the absence of a central station, no communication is possible between the mobile stations present in the network.

The document U.S. Pat. No. 5,551,066 is also known, which describes a local wireless network in which the master node can be changed dynamically. In this system, all the nodes are equal and the master node remains the master definitively once it has been chosen.

The present invention aims to remedy this drawback by enabling a mobile station, in the absence of a base station, to fulfill the role of base station. Thus a network can be established even in the absence of a permanent base station.

Another aim of the invention is to make it possible to establish a local wireless network dynamically in the absence of a base station.

To this end, the present invention relates, according to a first aspect, to a method of communicating between communication stations adapted to communicate with each other when at least one of said communication stations supplies a control signal, said station then functioning in "base station" mode and the stations not supplying a control signal then functioning in "mobile station" mode, characterised in that it includes, performed by at least one communication station initially functioning in base station mode:

an operation of determining the presence of a station functioning in mobile station mode, and when, during the presence determination operation it is determined that no station is functioning in mobile station mode, an operation of switching into mobile station mode, during which said station goes into mobile station mode.

By virtue of these provisions, when a communication station which is functioning in base station mode cannot communicate with any mobile station, it switches into mobile station mode, which enables it:

on the one hand to save its energy, and on the other hand, to enable a base station to enter into communication with it.

According to particular characteristics, in the communication method as briefly disclosed above, for at least one communication station functioning in mobile station mode:

an operation of determining the presence of a station functioning in base station mode, and when during the presence determination operation it is determined that no station is functioning in base station mode, an operation of switching into base station mode, during which said station goes into base station mode.

By virtue of these provisions, this station can take the role of base station in order to determine whether at least one communication station functioning in mobile station mode is in a position to communicate with it.

According to particular characteristics, following the operation of switching into mobile station mode, said communication station performs:

an operation of determining the presence of a station functioning in base station mode, and when, during the presence determination operation, it is determined that no station is functioning in base station mode, an operation of switching into base station mode, during which said station goes into base station mode.

According to other particular characteristics, between two successive operations of determining the presence of a station functioning in base station mode, the said station performs a waiting operation, during which it does not change functioning mode.

By virtue of each of these provisions, said station adopts successively the role of base station and of mobile station, which enables it to enter into contact with any communication station, whether the latter is functioning in mobile station mode or in base station mode.

According to a second aspect, the present invention relates to a device for communicating between communication stations adapted to communicate with each other when at least one of the said communication stations supplies a control signal, said station then functioning in "base station" mode and the stations not supplying a control signal then functioning in "mobile station" mode, characterised in that it has, in at least one communication station functioning initially in base station mode, a processing means adapted:

to determine the possible presence of a station functioning in mobile station mode, and when it has determined that no station is functioning in mobile station mode, to switch into mobile station mode.

The invention also relates to a network, a computer, a camera, a facsimile machine, a photographic apparatus, a television receiver, a printer, a scanner and an audio/video player, characterised in that they have a device as briefly disclosed above.

The invention also relates to:

a means of storing information which can be read by a computer or a microprocessor storing instructions of a computer program characterised in that it implements the method of the invention as briefly disclosed above, and a means of storing information which is removable, partially or totally, and which can be read by a computer or a microprocessor storing instructions of a computer program characterised in that it implements the method of the invention as briefly disclosed above.

The preferential or particular characteristics, and the advantages, of said device, said computer, said camera, said facsimile machine, said photographic apparatus, said television receiver, said printer, said scanner, said audio/video player and said information storage means being identical to those of the method as briefly disclosed above, these advantages are not repeated here.

For a facsimile machine which has a means of communicating on a network (see communication preamble) the communication stations on this network may have to access the telephone line of the facsimile machine. To this end, these stations send many access request messages and thus take up a large amount of passband.

The invention sets out to remedy this drawback by enabling each communication station to know the state of the telephone line.

More generally, the invention concerns any interface between two networks.

To this end, according to a third aspect, the present invention relates to a method of communicating between communication stations adapted to communicate with each other when at least one of said communication stations supplies a control signal, said station then functioning in "base station" mode and the stations not supplying any control signal then functioning in "mobile station" mode, characterised in that it includes, performed by a first communication station able to transmit facsimiles on an external line, and functioning in base station mode:

an operation of determining the occupation of said external line for facsimile transmission, and when, during said determination operation, it is determined that said external line is occupied for facsimile transmission, a request operation during which said first communication station transmits, to a second communication station, a message representing a request to change communication station functioning in base station mode.

By virtue of these provisions, the communication station in question is always entirely available either for communications effected on the external line, or for communications internal to the DECT cell. In addition, by knowing whether or not said communication station is functioning in base station mode, each of the other communication stations of the cell can determine whether or not the external line is available. This knowledge makes it possible to avoid numerous attempts to access the external line, attempts which would be doomed to failure, until the external line is free.

According to particular characteristics, during said request operation, the message requesting a change includes an item of information representing an identity of a mobile station envisaged as a new base station.

By virtue of these provisions, the first station which requires the change of base station can determine and transmit the identity of the station envisaged as a new base station.

According to other particular characteristics, the second communication station is a communication station envisaged for functioning in base station mode following the request operation.

By virtue of these provisions, the two communication partners are the two communication stations which envisage exchanging their role in the cell. This simplifies communication and avoids interfering with the other communication stations.

According to particular characteristics, the second communication station performs, following the reception of the message representing a request to change station functioning in base station mode:

an operation of determining agreement, or not, to functioning in base station mode, and an operation of answering the base station, during which the second communication station transmits a message representing agreement or not to function in base station mode.

By virtue of these provisions, it is the station envisaged as the future base station which determines whether or not it accepts this role. Thus, if the initial base station is only partially informed of the actual capability of the mobile station to take the role of base station, it cannot impose this change in role on the second communication station.

According to particular characteristics, in the absence of an answer from the second communication station, the first station considers that the envisaged change in base station has failed.

By virtue of these provisions, the method of the invention functions both with devices according to the present invention and with devices known in the state of the art prior to the present invention.

According to particular characteristics, following the request operation, the following are performed by the first communication station:

an operation of determining acceptance of change of station functioning in base station mode, and when it is determined that the envisaged change is not accepted, a new request operation during which a new message representing a change of base station request is addressed to another communication station.

By virtue of these provisions, the station which requires a change in base station can make several successive attempts to achieve this objective.

According to particular characteristics, each request operation includes an operation of selecting a station which is the destination of the message requesting a change in station functioning in base station mode.

According to other particular characteristics:

the selection operation includes an operation of reading an identity of a destination station in a list of communication stations, the selection operation includes an operation of determining the mobile station having better capabilities of becoming the new base station, the selection operation includes an operation of determining a mobile station having a need to transmit, the selection operation includes an operation of determining a mobile station which has already operated in base station mode.

By virtue of each of these provisions, the stations which are envisaged for functioning in base station mode can, in a preferential order which depends on the characteristics of the selection operation, be destinations of the messages representing a request to change station functioning in base station mode.

According to particular characteristics, the communication method according to the invention as briefly disterminated above includes, when the first station is functioning in mobile station mode, an operation of determining the occupation of said external line for facsimile transmission, and when, during said determination operation, it is determined that said external line is not occupied for facsimile transmission, a request operation during which said first communication station transmits, to the communication station functioning in base station mode, a message representing a request to change communication station functioning in base station mode.

By virtue of these provisions, as soon as the external line is available, the first communication station attempts to re-become a base station, so that each is informed of the availability of the external line.

According to a fourth aspect, the present invention relates to a device for communicating between communication stations adapted to communicate with each other when at least one of said communication stations supplies a control signal, said station then functioning in "base station" mode and the stations not supplying a control signal then functioning in "mobile station" mode, characterised in that it has a processing means adapted, in a first communication station able to transmit facsimiles on an external line, and functioning in base station mode:

to determine the occupation of said external line for facsimile transmission, and
  when said external line is occupied for facsimile transmission, to switch into mobile station functioning mode.

The invention also relates to a network, a computer, a camera, a facsimile machine, a photographic apparatus, a television receiver, a printer, a scanner and an audio/video player, characterised in that they have a device as briefly disterminated above.

The invention also relates to:

an information storage means which can be read by a computer or a microprocessor storing instructions of a computer program characterised in that it implements the method of the invention as briefly disclosed above, and
  an information storage means which is partially or totally removable and can be read by a computer or microprocessor storing instructions of a computer program characterised in that it implements the method of the invention as briefly disclosed above.

According to a fifth aspect, the present invention relates to a method of communicating between communication stations adapted to communicate with each other when at least one of said communication stations supplies a control signal, said station then functioning in "base station" mode, and the stations not supplying a control signal then functioning in "mobile station" mode, characterised in that it includes, performed by a first communication station which needs to send information:

an operation of determining the presence of a second communication station functioning in base station mode able to convey said information, and
  when, during the presence determination operation, it is determined that no second communication station is functioning in base station mode and is capable of conveying said information, a switching operation, during which said first communication station starts to function in base station mode.

By virtue of these provisions, when no base station is available, a station which needs to send information substitutes itself for the missing base station and thus effects the transmission of this information.

According to particular characteristics, when the first communication station functions in base station mode, it performs an operation of determining the completion of said communication and, when the communication of said information is completed, said first communication station performs a switching operation during which said first communication station starts to function in mobile station mode.

According to other particular characteristics, following said operation of switching into base station mode, said first communication station allows only a communication between itself and the communication station with which it is to communicate said information.

According to yet other particular characteristics, the communication method as briefly disclosed above includes, performed by said first communication station, when it is functioning in base station mode:

an operation of determining the presence of a station functioning in mobile station mode, and
  when, during the presence determination operation, it is determined that no station is functioning in mobile station mode, a switching operation during which said station goes into mobile station mode.

By virtue of each of these provisions, the communication station which has substituted itself for a base station unavailable for the transmission of information returns to mobile station mode and, consequently:

saves its energy, and
  enables a communication station functioning in base station mode to organise future communications on the network without being interfered with by the communication station which has switched into base station functioning mode.

According to particular characteristics, when the communication of said information is completed, said first communication station performs an operation of determining the existence of any communication in which it serves as a base station and, when no such communication exists, a switching operation during which said first communication station starts to function in mobile station mode.

By virtue of these provisions, the communication station which has switched into base station functioning mode enables other communication stations functioning in mobile station mode to communicate.

According to a sixth aspect, the present invention relates to a device for communicating between communication stations adapted to communicate with each other when at least one of said communication stations supplies a control signal, said station then functioning in "base station" mode and the stations not supplying a control signal then functioning in "mobile station" mode, characterised in that it has a processing means adapted, when the first communication station of which the processing means forms part needs to send information:

to determine the presence of a second communication station functioning in base station mode able to convey said information, and
  when it has determined that no second communication station is functioning in base station mode and is capable of conveying said information, of switching the functioning of said communication into base station mode.

The invention also relates to a network, a computer, a camera, a facsimile machine, a photographic apparatus, a television receiver, a printer, a scanner and an audio/video player, characterised in that they have a device as briefly disclosed above.

The invention also relates to:

an information storage means which can be read by a computer or a microprocessor storing instructions of a computer program characterised in that it implements the method of the invention as briefly disclosed above, and
  an information storage means which is partially or totally removable and can be read by a computer or microprocessor storing instructions of a computer program characterised in that it implements the method of the invention as briefly disclosed above.

In a local wireless network with centralised architecture, for example of the type using the DECT standard, the standardised procedures relating to security, such as authentication (a process allowing a DECT user or an item of DECT equipment to be positively verified as a legitimate user of a DECT service or item of equipment) and encryption (or "ciphering", a process making it possible to code transmitted information so that it is comprehensible only by an entity having a deciphering key) of the data, serve solely to make secure the transfer of data on the radio link which connects a mobile station and the base station. Confidentiality is therefore not provided at base station level. This may be a particular problem where the mobile stations which are communicating with one another are visiting stations with respect to the cell to which they belong for the moment since the data they exchange can be used by a data processing system connected to the base station.

Thus, in the DECT standard (ETS 300 175 published by ETSI in October 1992), only transmissions between a mobile station and a base station are protected at radio link level in order to be secured from pirate listening in. Similarly, the patent U.S. Pat. No. 4,555,805 is known, which describes a centralised wireless communication system where only the communications on the radio link are encrypted or coded.

The present invention intends to remedy these drawbacks by proposing, when at least one of the mobile stations which has to intercommunicate confidentially is capable of switching into base station operating mode, that a cell formed from the stations concerned by the said confidential communication is created, a cell in which one of the stations operates in base station operating mode.

To that end, the present invention relates, according to a seventh aspect, to a method of communication between communication stations adapted to communicate with one another when one, at least, of the said communication stations supplies a control signal, the said station then operating in "base station" mode, and the stations not supplying a control signal then operating in "mobile station" mode, characterised in that, for the establishment of a confidential communication between, at least, two communication stations initially operating in mobile station operating mode, in contact with a so-called "initial" base station, it includes:

an operation of switching, into so-called "new" base station operating mode, of one of the said communication stations initially operating in mobile station operating mode, and an operation of putting the new base station into communication with each of the communication stations concerned by the said confidential communication.

By virtue of these provisions, the initial base station does not have access to the data exchanged between the communication stations concerned by the said confidential communication. Confidentiality of the communication between the two communication stations is therefore provided. Furthermore, the invention can be implemented within the context of the DECT standard.

According to particular characteristics, at the end of the said confidential communication, the method which is the object of the invention includes an operation of switching the new base station into mobile station operating mode.

By virtue of these provisions, as soon as the confidential communication is finished, the communication stations concerned can again participate in communications with other communication stations.

According to other particular characteristics, by way of a preliminary to the operation of switching into so-called "new" base station operating mode, the method which is the object of the invention includes a confidential communication request operation during which at least one communication station concerned by the said confidential communication receives, from another communication station concerned by the said confidential communication, a message representing a confidential communication request.

By virtue of these provisions, the confidential communication can be accepted by each of the communication stations concerned before being set up. This makes it possible, in the event of it being impossible to set up the said confidential communication or in the event of risks of interference caused by this setting up, to abandon or delay the said confidential communication.

According to other particular characteristics, during a selection operation, when a communication station which sends a message representing a confidential communication request is capable of switching into base station operating mode, it is chosen for switching into base station operating mode.

By virtue of these provisions, if a number of other communication stations are concerned by the said confidential communication, the passband used is minimised for the data sent by the new base station, on the one hand, and no other communication station has to switch its operating mode, which reduces the risks of failure, on the other hand.

According to other particular characteristics, during the confidential communication request operation, the message representing a confidential communication request includes an information item representing the operating mode of the station which is the destination of the said message during the said confidential communication.

By virtue of these provisions, any one of the communication stations concerned by the said confidential communication can find itself requested to take the role of new base station.

According to other particular characteristics, on reception of the said message representing a confidential communication request, when the information item representing the operating mode of the station which is the destination of this message is the base station operating mode, this destination station performs an operation of determining its capability of switching into base station operating mode and, where it has the capability of switching, an operation of transmitting an agreement to the communication station having sent the said message.

By virtue of these provisions, it is the communication station intended to become the new base station which determines whether it accepts this role.

According to an eighth aspect, the present invention relates to a communication device for communication between communication stations adapted to communicate with one another when one, at least, of the said communication stations supplies a control signal, the said station then operating in "base station" mode and the stations not supplying a control signal then operating in "mobile station" mode, characterised in that it has a processing means adapted to:

determine a request for confidential communication between at least two stations initially operating in mobile station operating mode, cause the operating mode of one of the communication stations concerned by a confidential communication to switch into base station operating mode, the said station then being referred to as the "new base station", and to put the new base station into communication with each of the communication stations concerned by the said confidential communication.

The invention also relates to a network, a computer, a camera, a facsimile machine, a photographic apparatus, a television, a printer, a scanner and an audio/video player, characterised in that they include a device as briefly described above.

The invention also relates to:
- a means of storing information readable by a computer or a microprocessor storing instructions of a computer program, characterised in that it allows the implementation of the method of the invention as briefly described above, and
- a means of storing information which is removable, partially or totally, and readable by a computer or a microprocessor storing instructions of a computer program, characterised in that it allows the implementation of the method of the invention as briefly described above.

The preferential or particular characteristics and the advantages of this device, this computer, this camera, this facsimile machine, this photographic apparatus, this television, this printer, this scanner, this audio/video player and these information storage means being identical to those of the method as briefly described above, these advantages are not repeated here.

Figure 2:
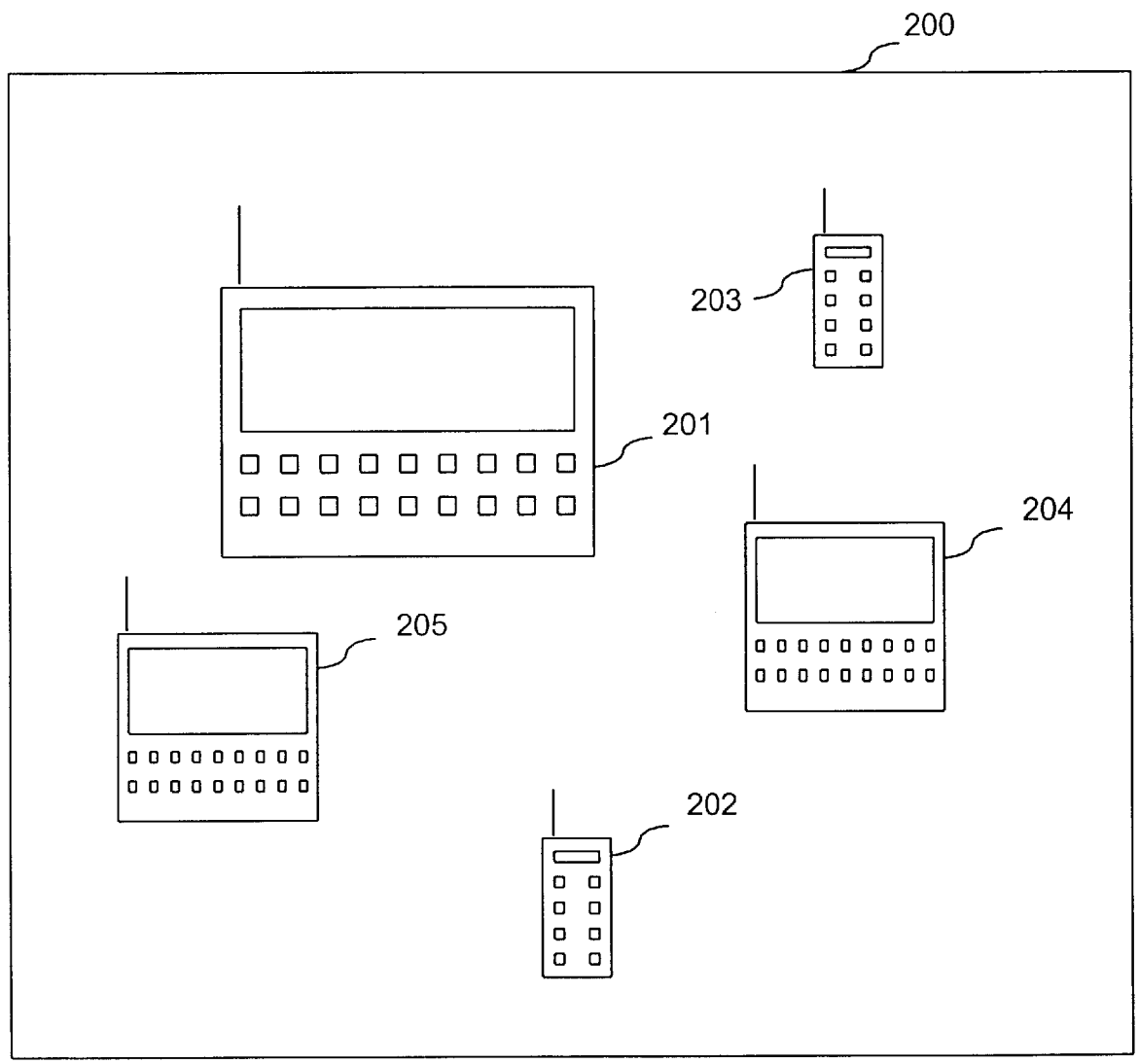
Figure 3A:
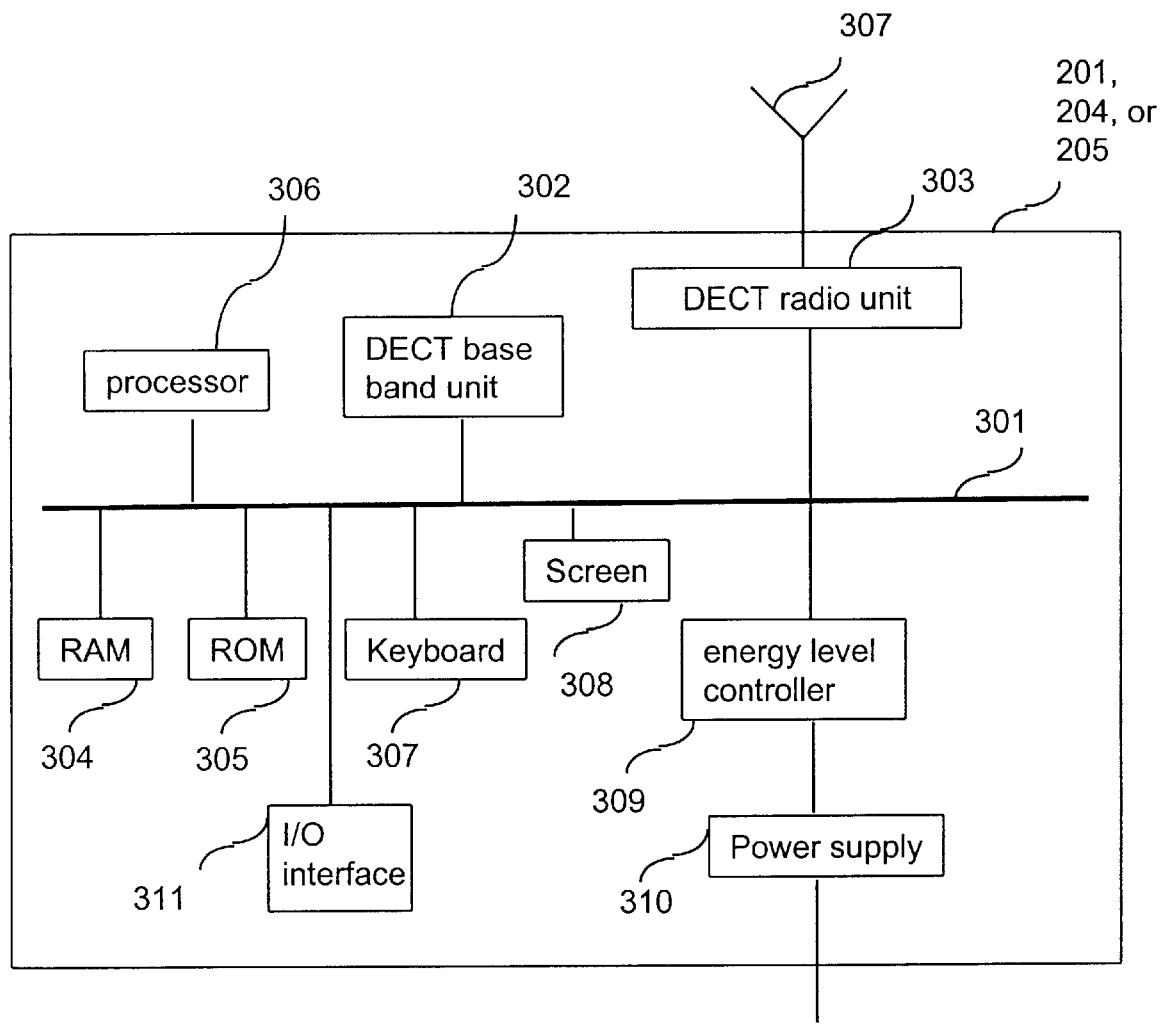
Figure 3B:
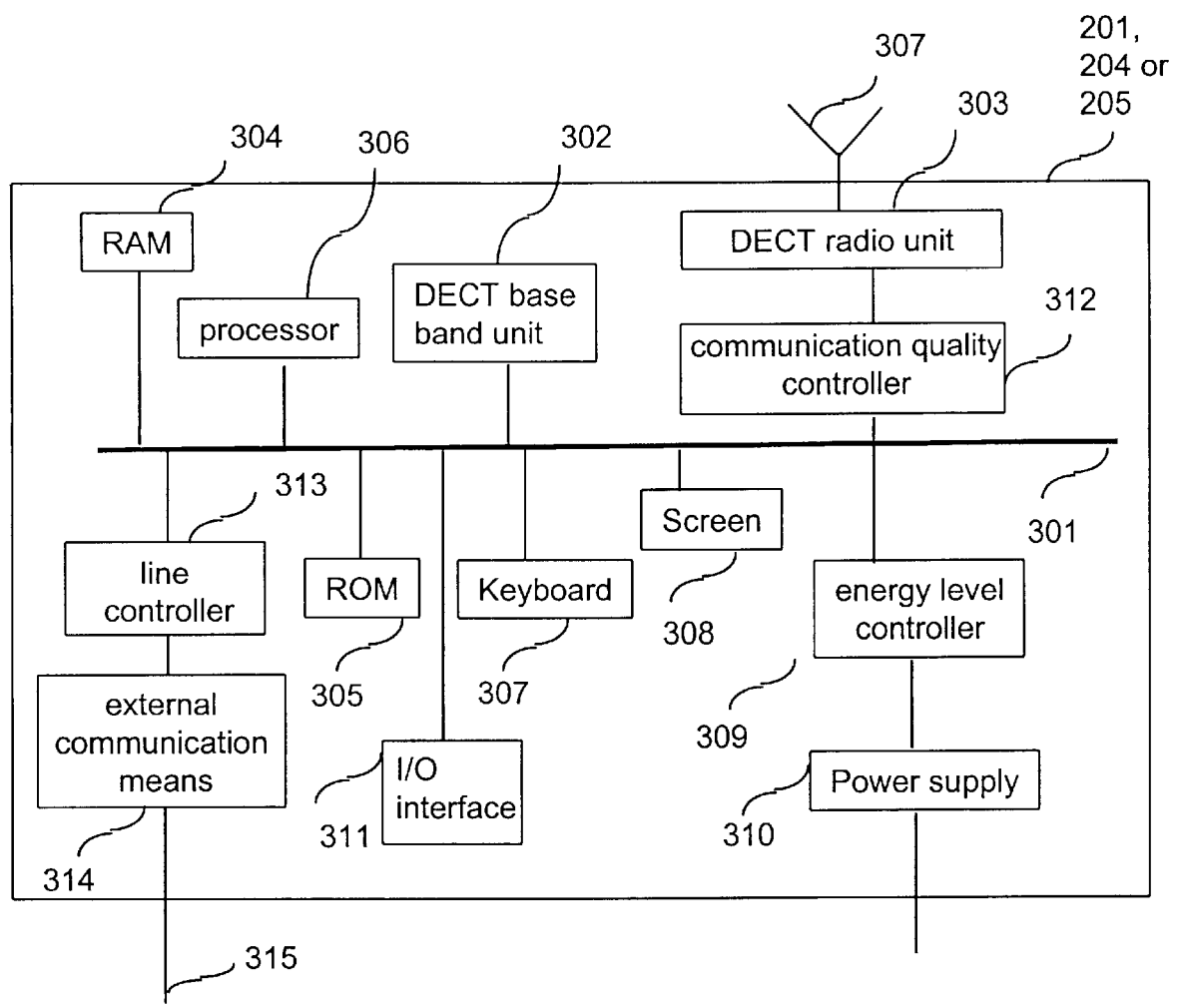
Figure 4:
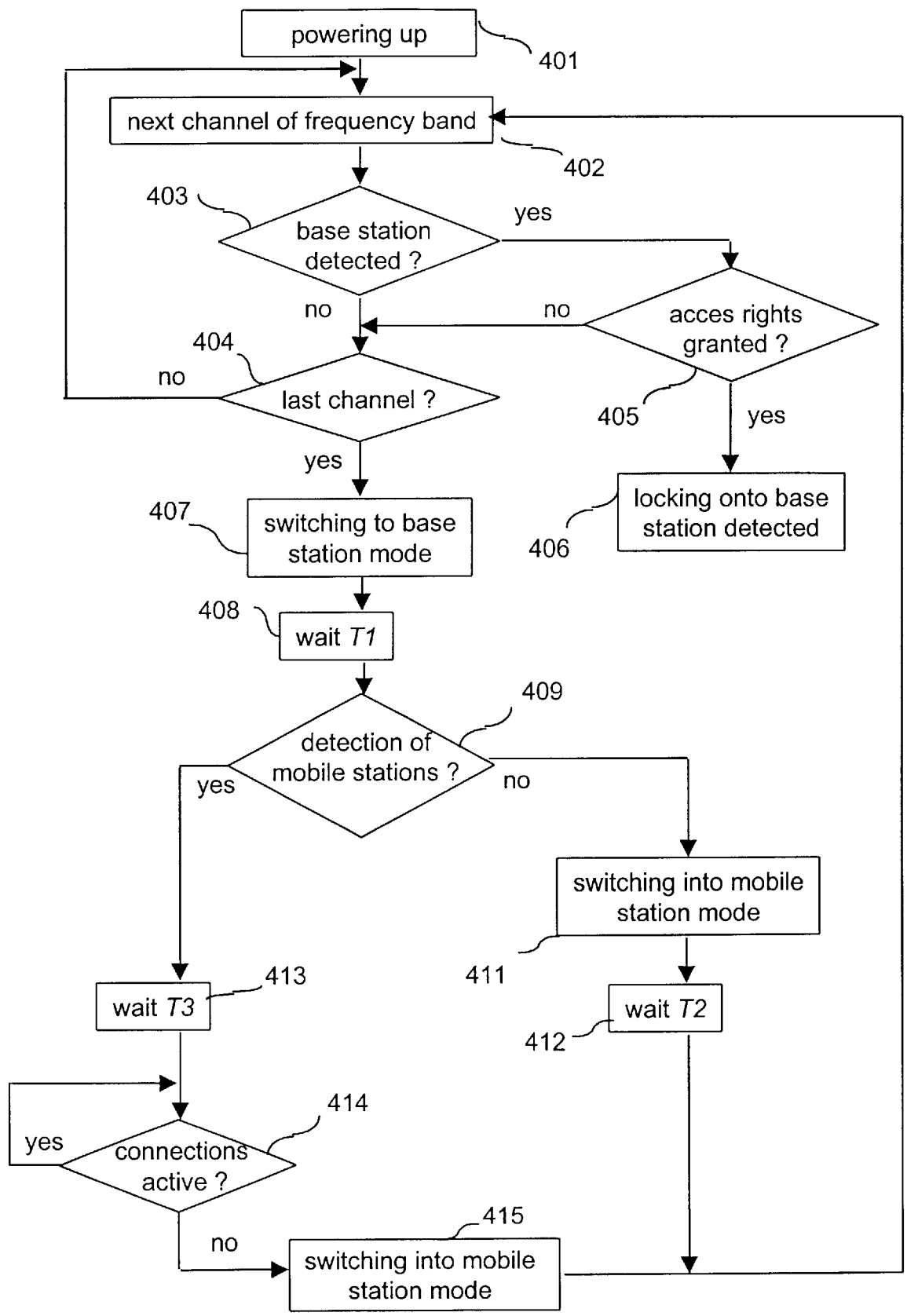
Figure 5:
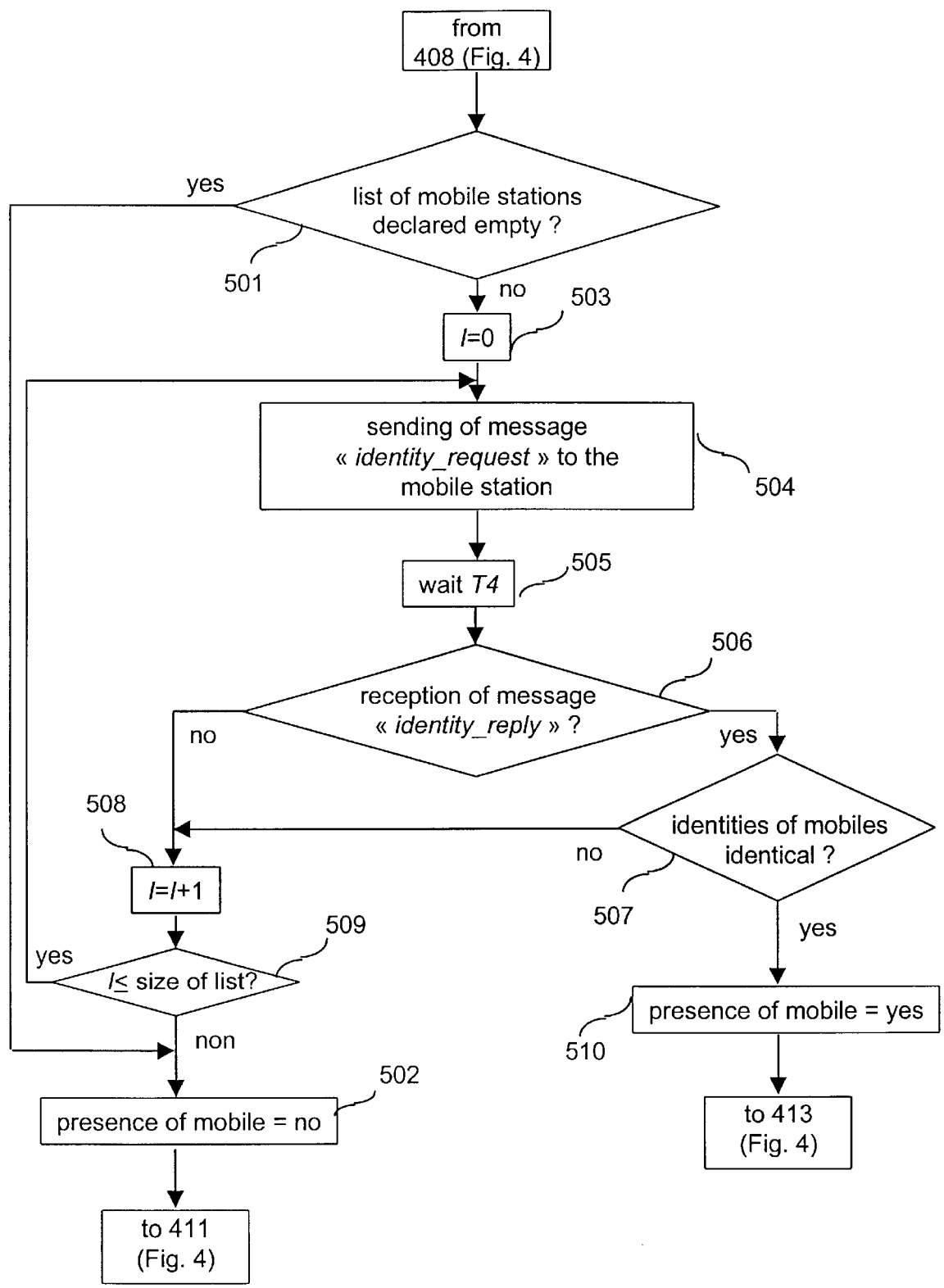
Figure 6A:
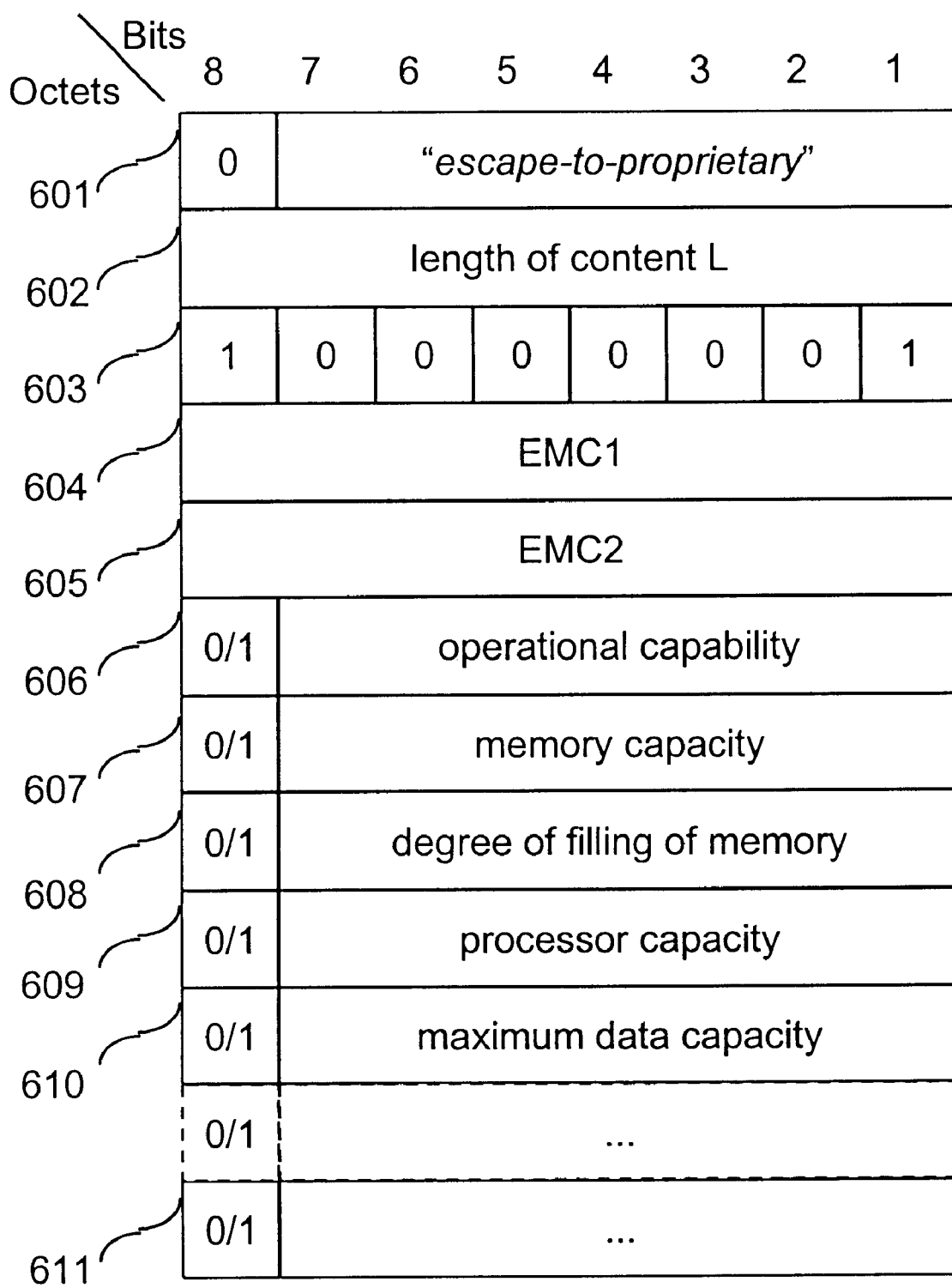
Figure 6B:
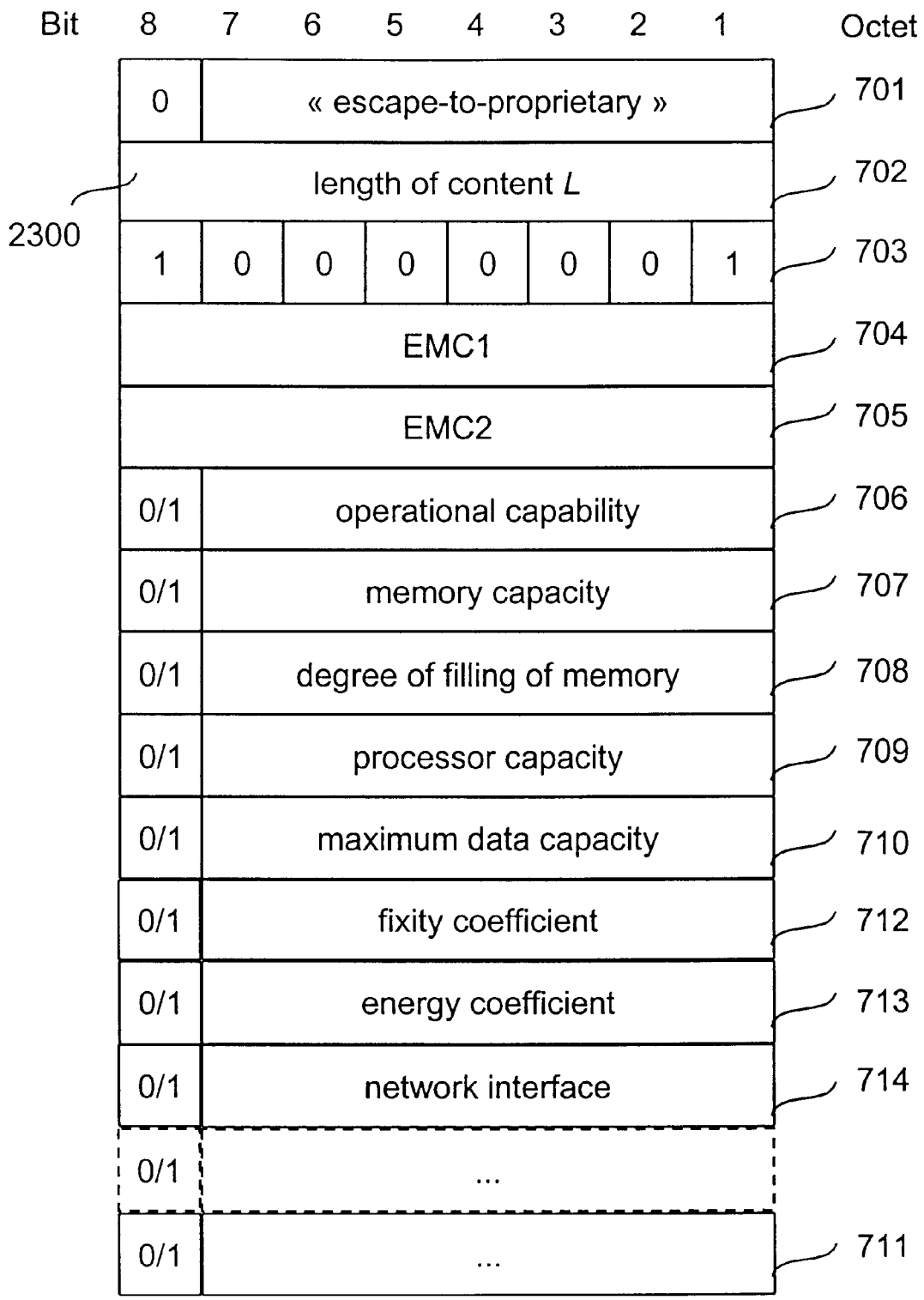
Figure 7:
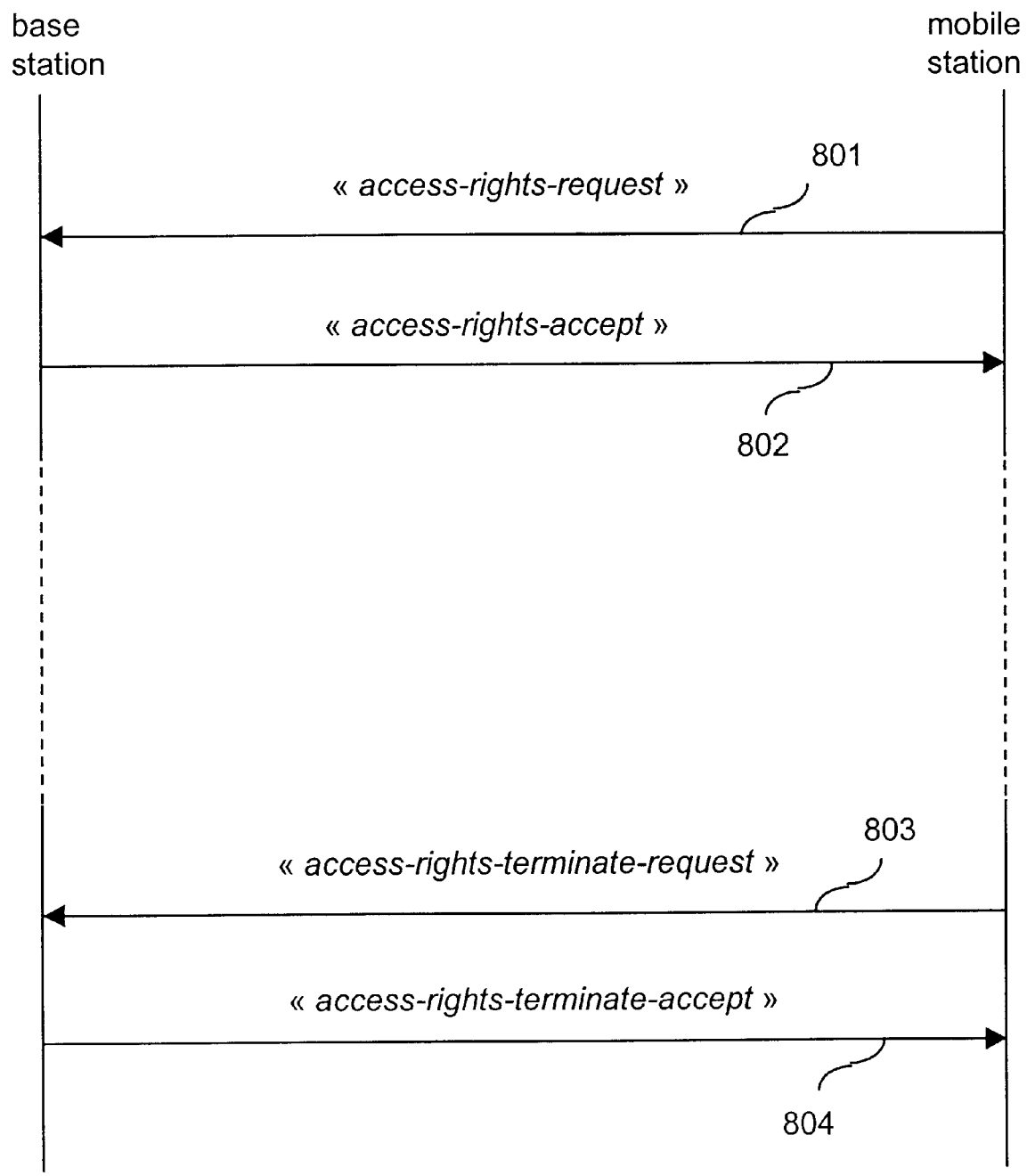
Figure 8A:
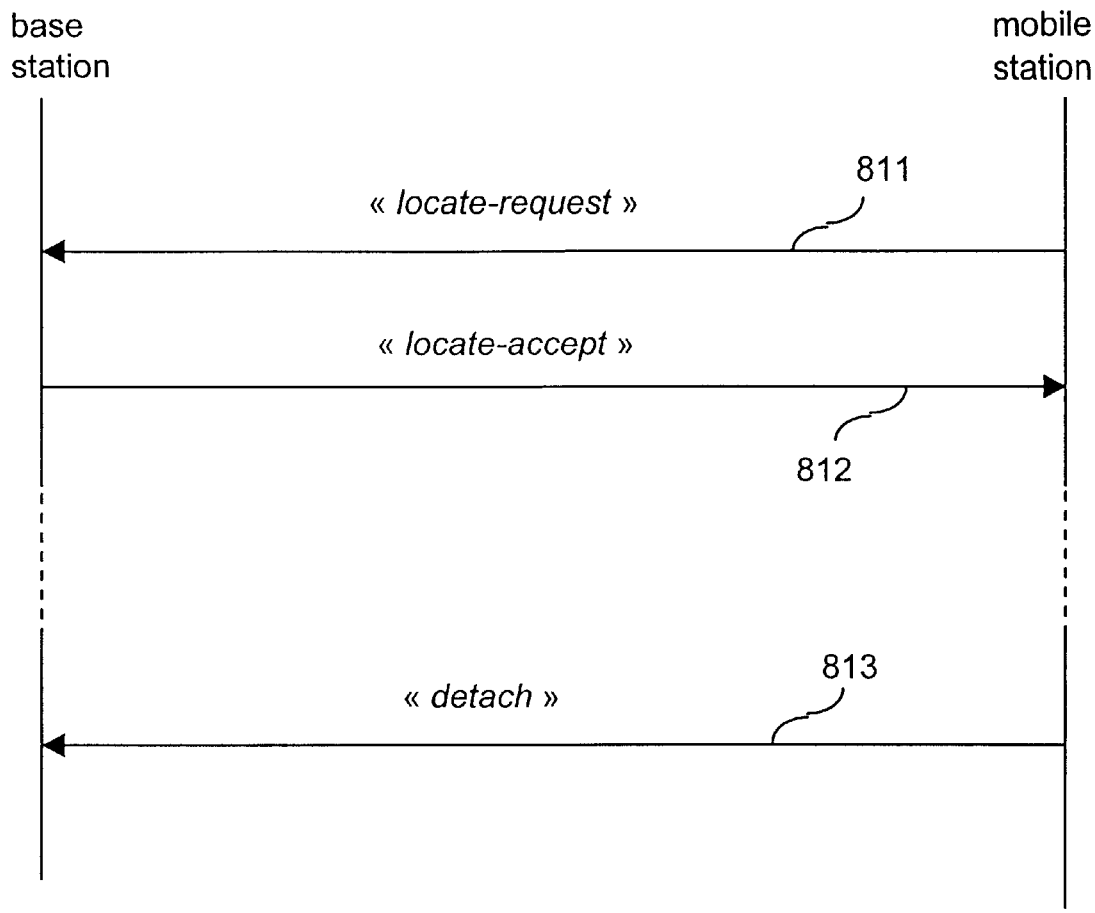
Figure 8B:
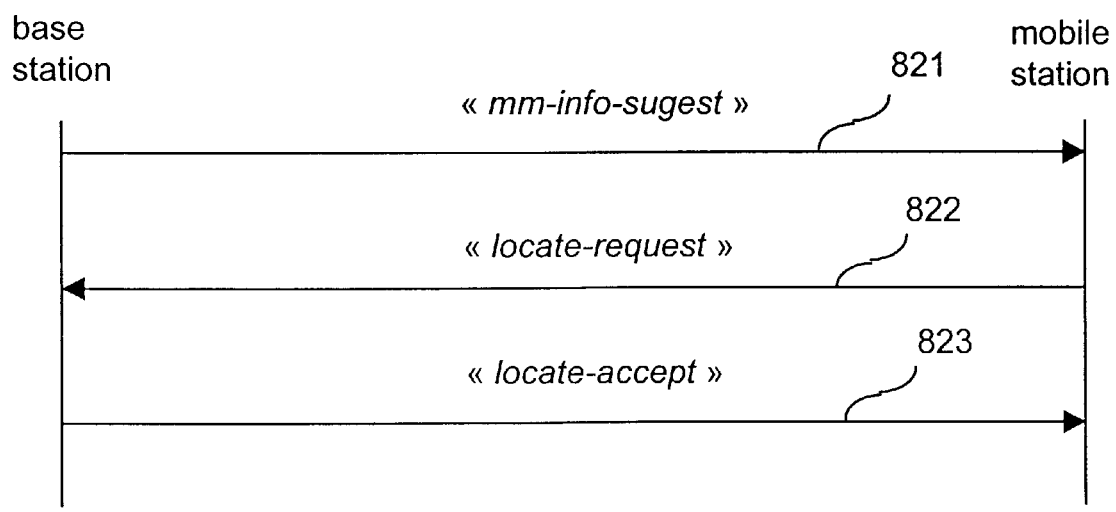
Figure 11:
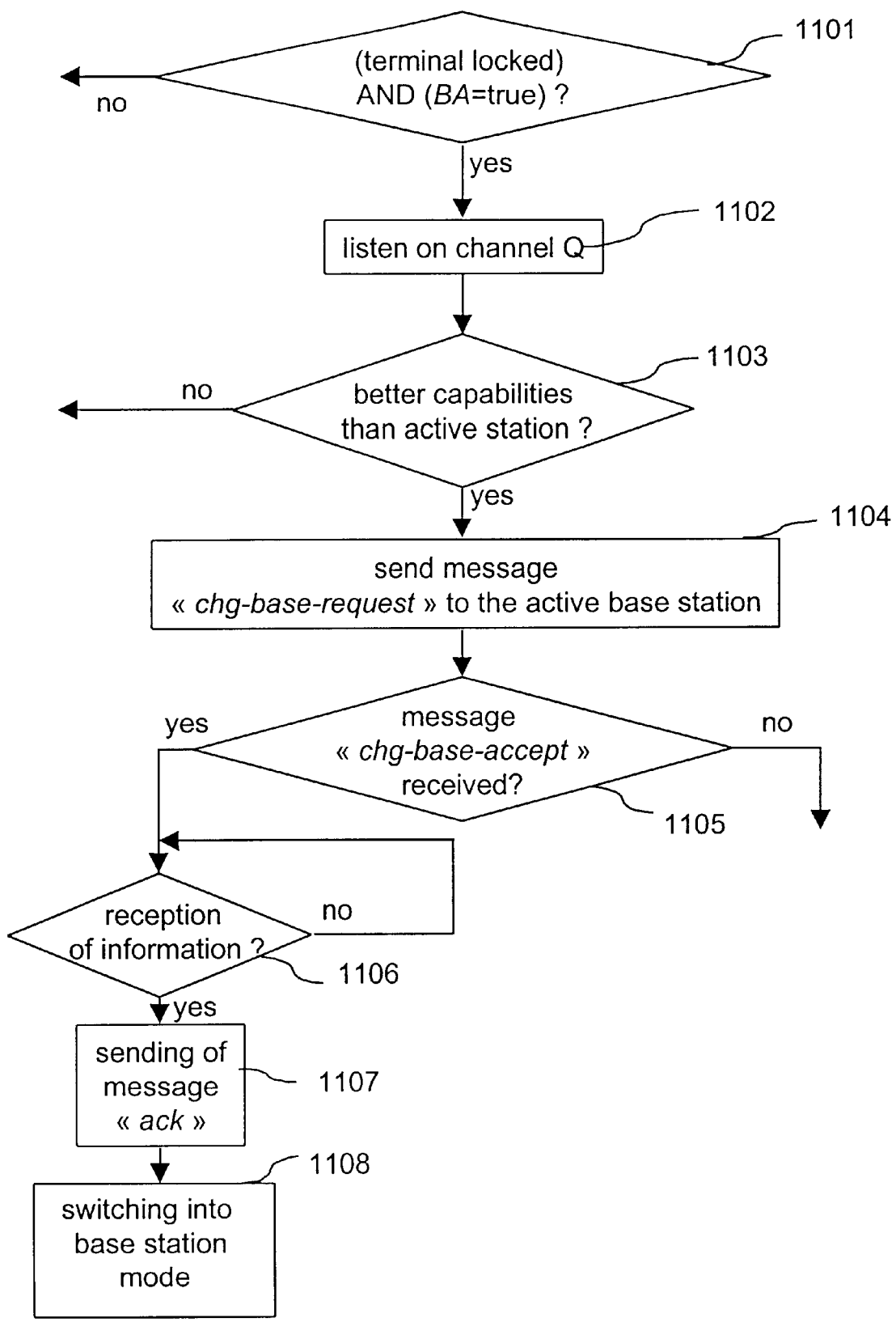
Figure 12:
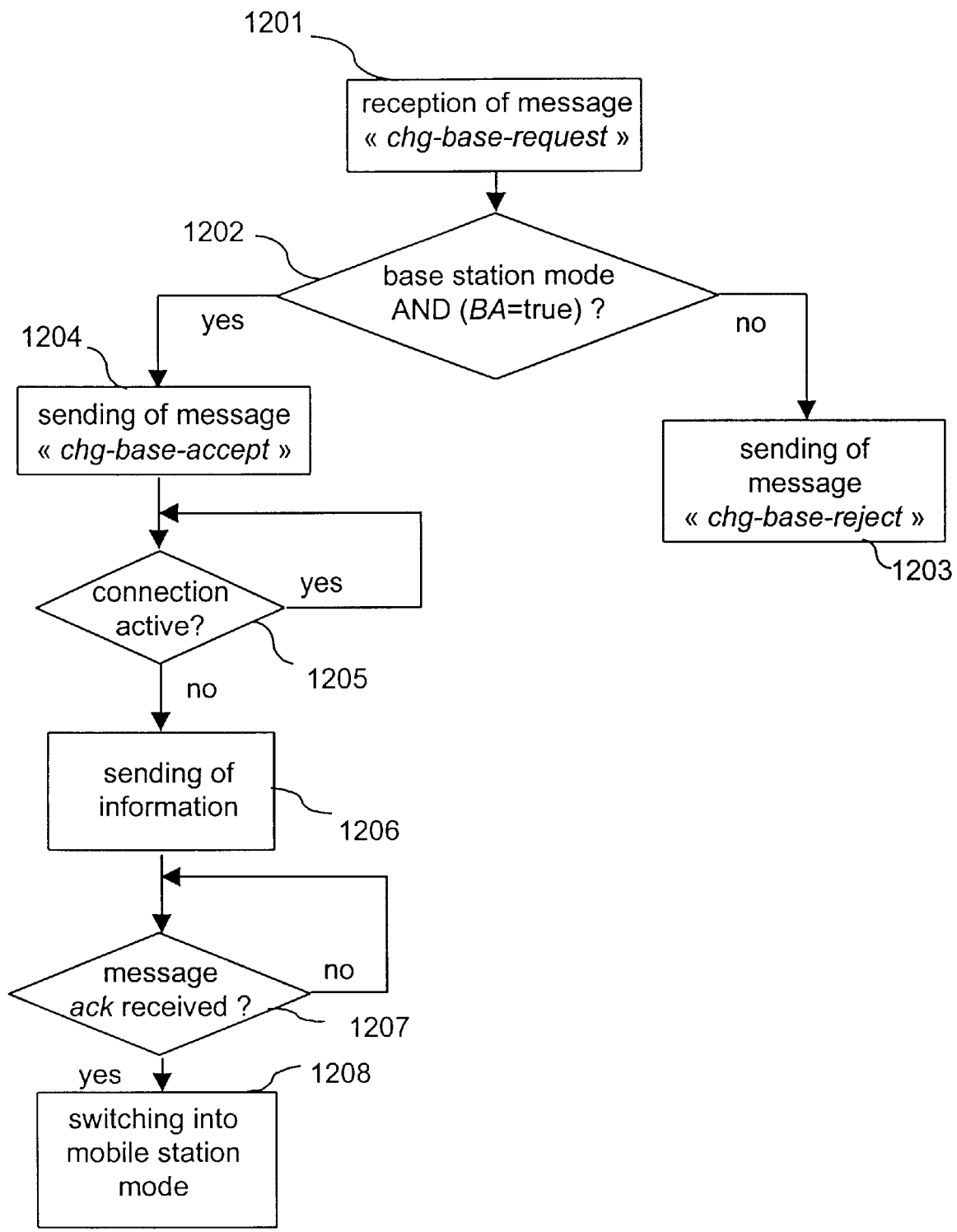
Figure 13:
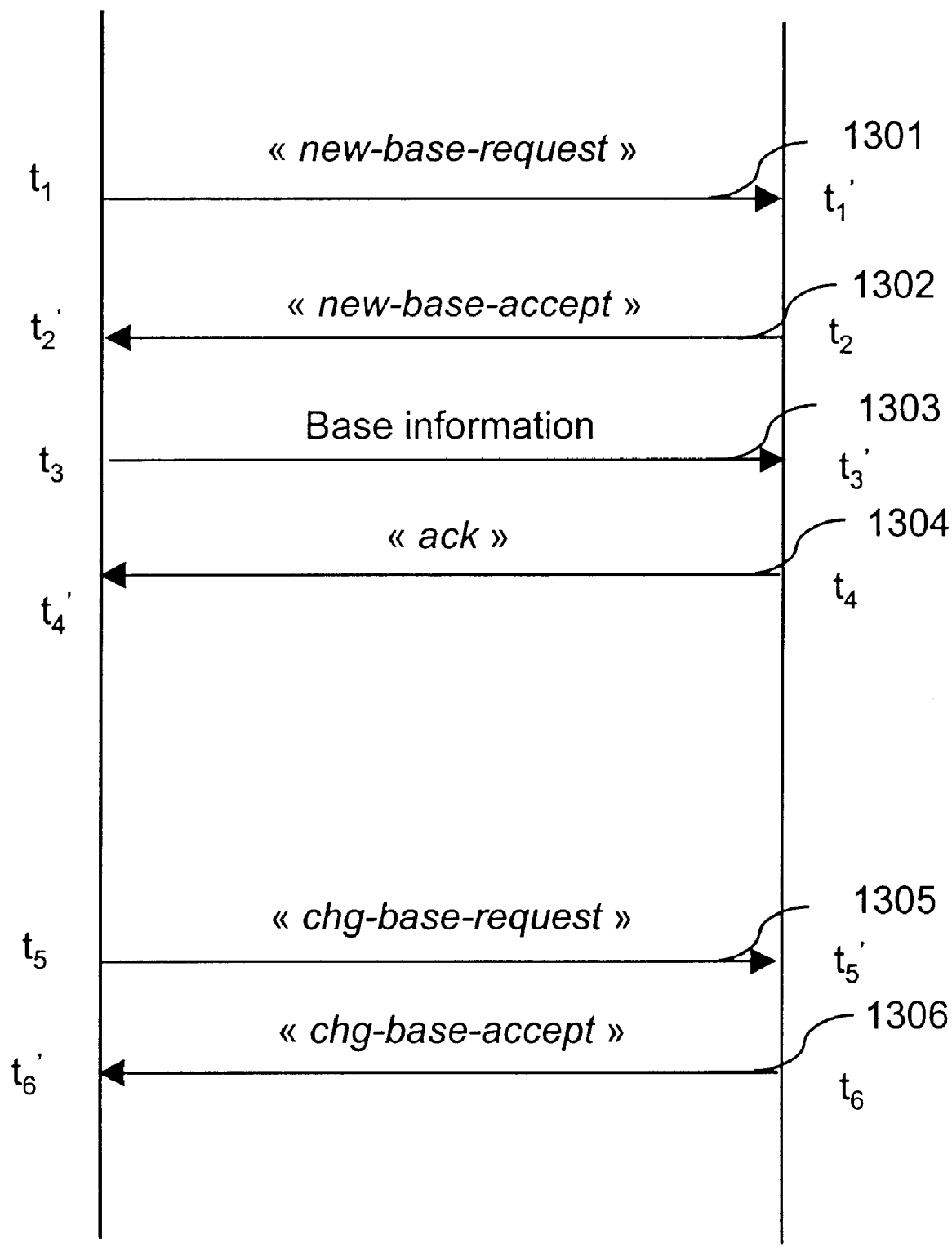
Figure 14A:
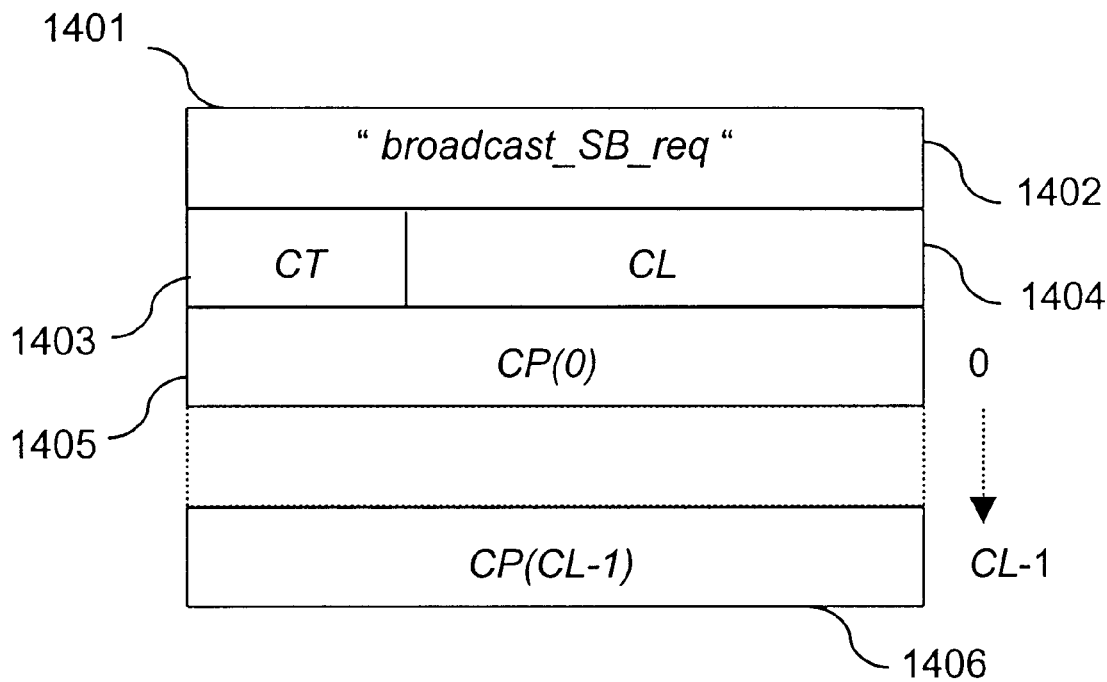
Figure 14B:
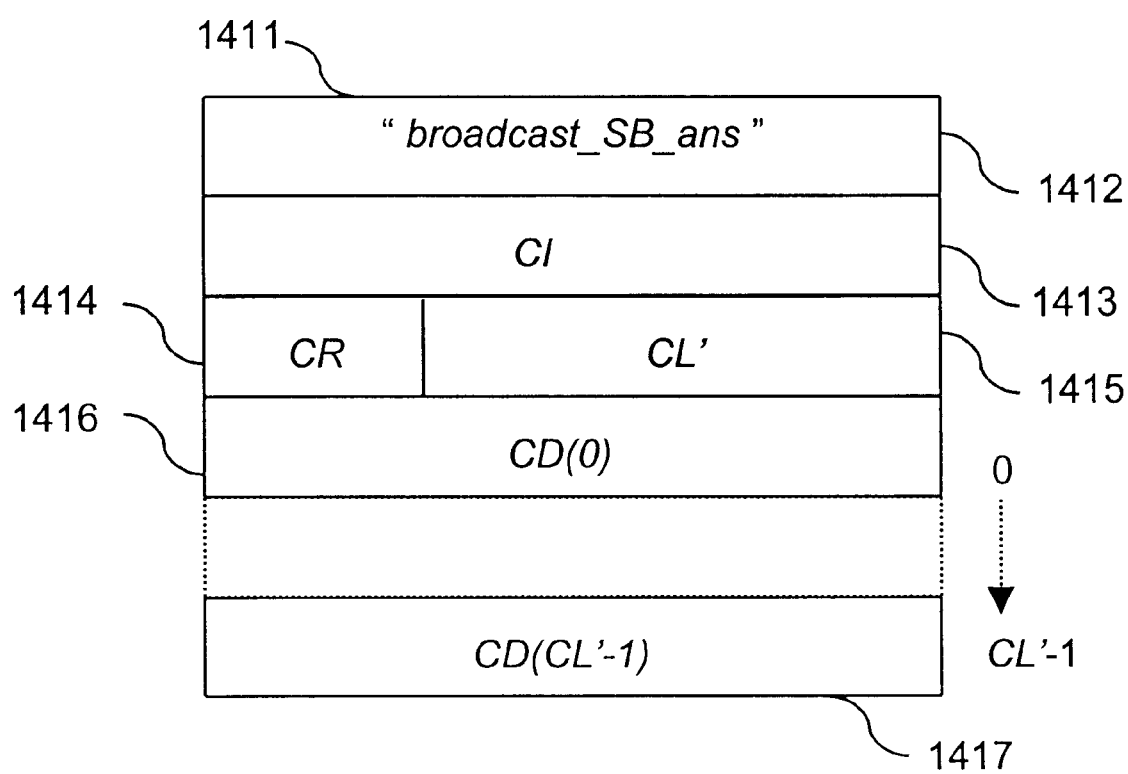
Figure 15:
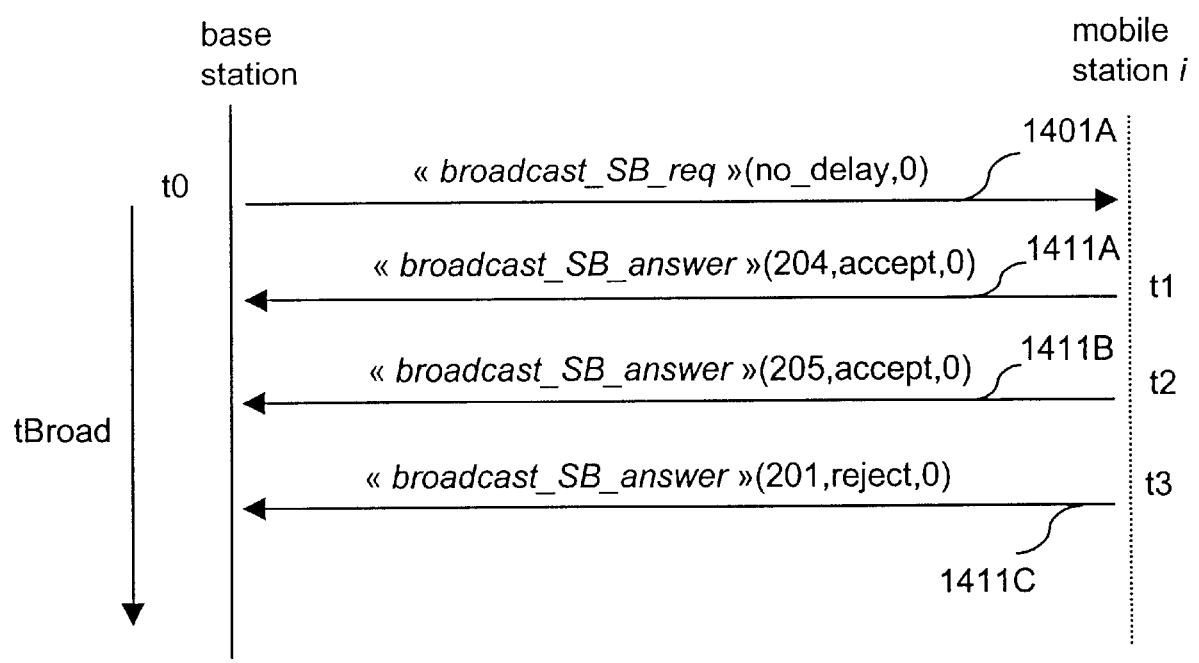
Figure 16:
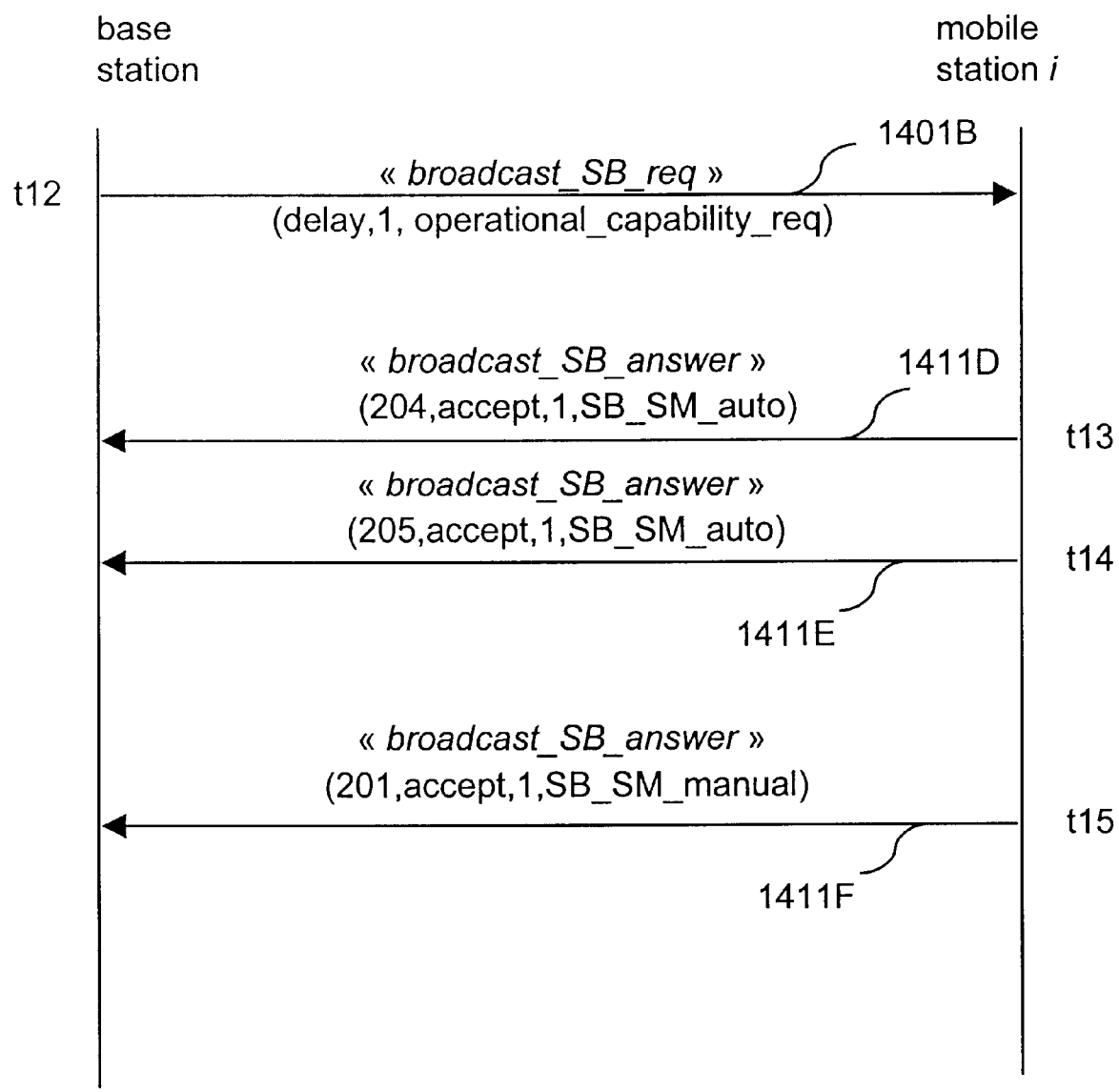
Figure 18A:
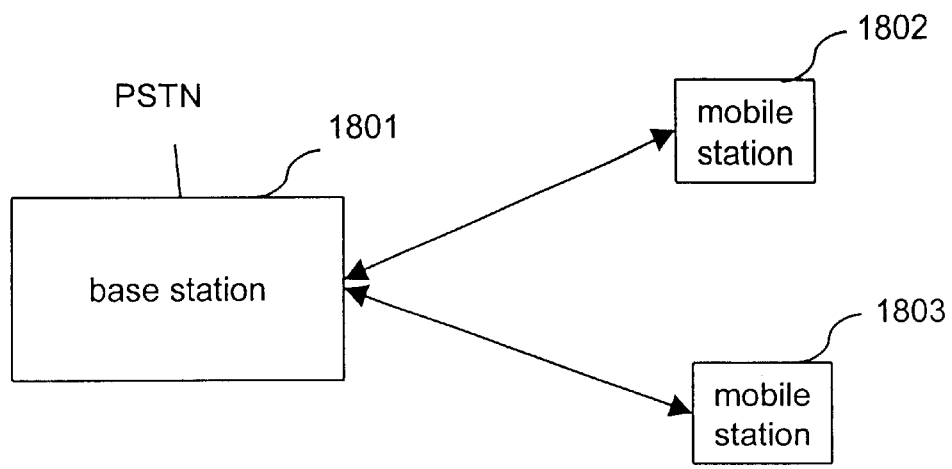
Figure 18B:
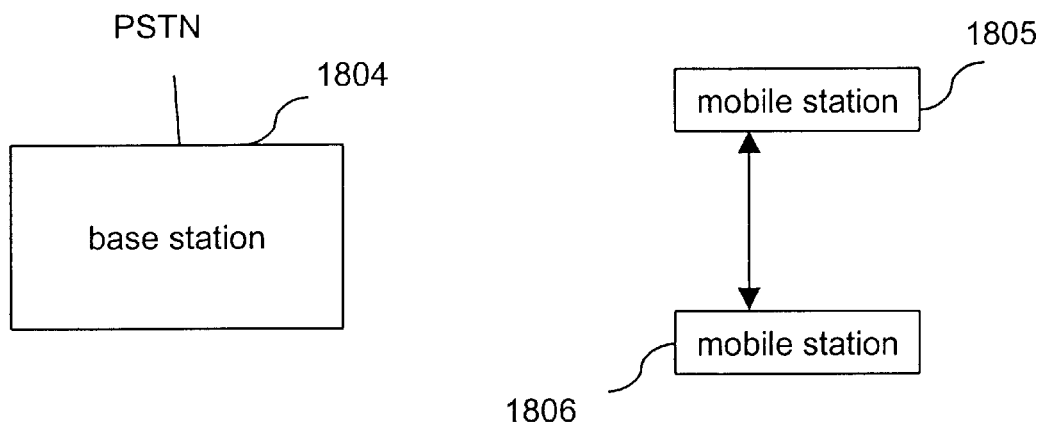
Figure 18C:
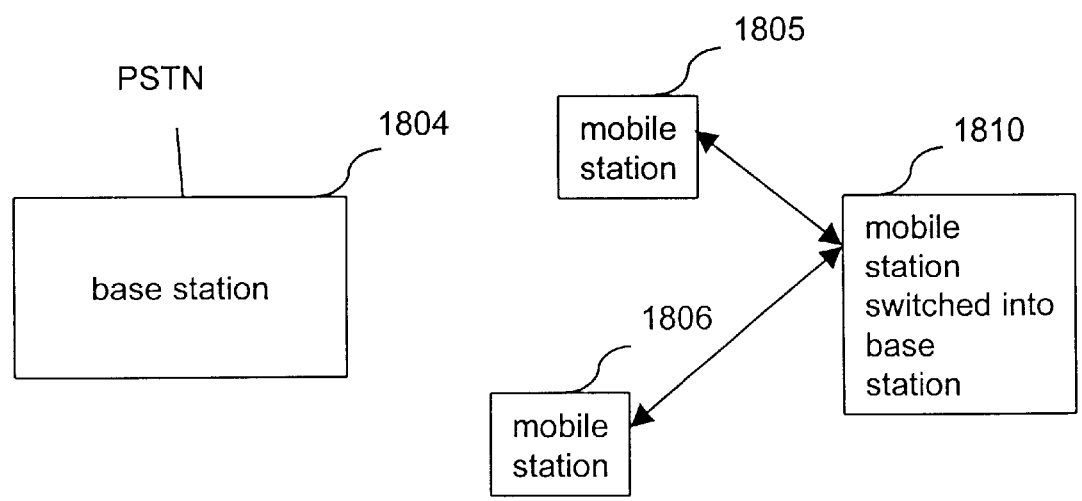
Figure 19:
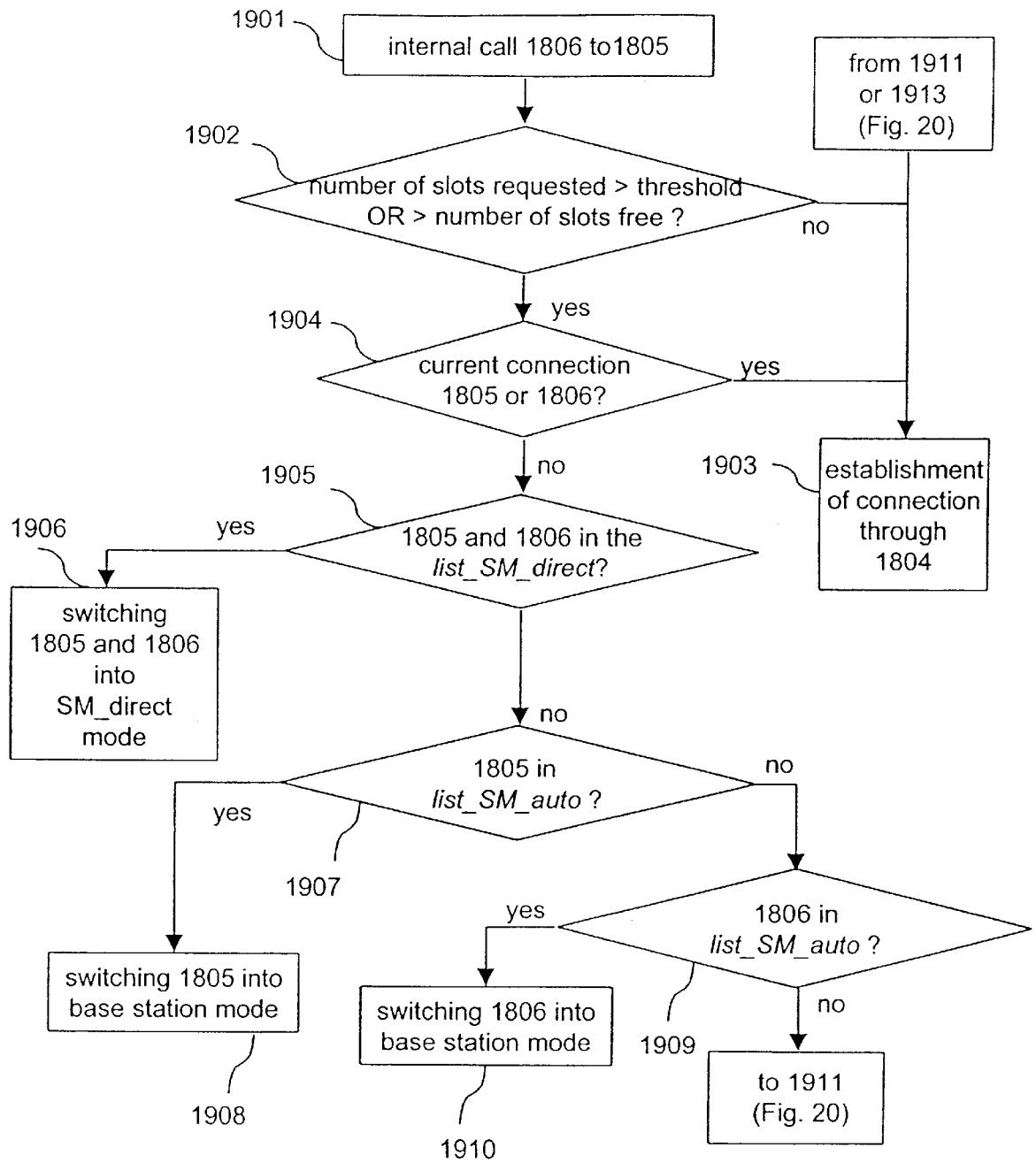
Figure 20:
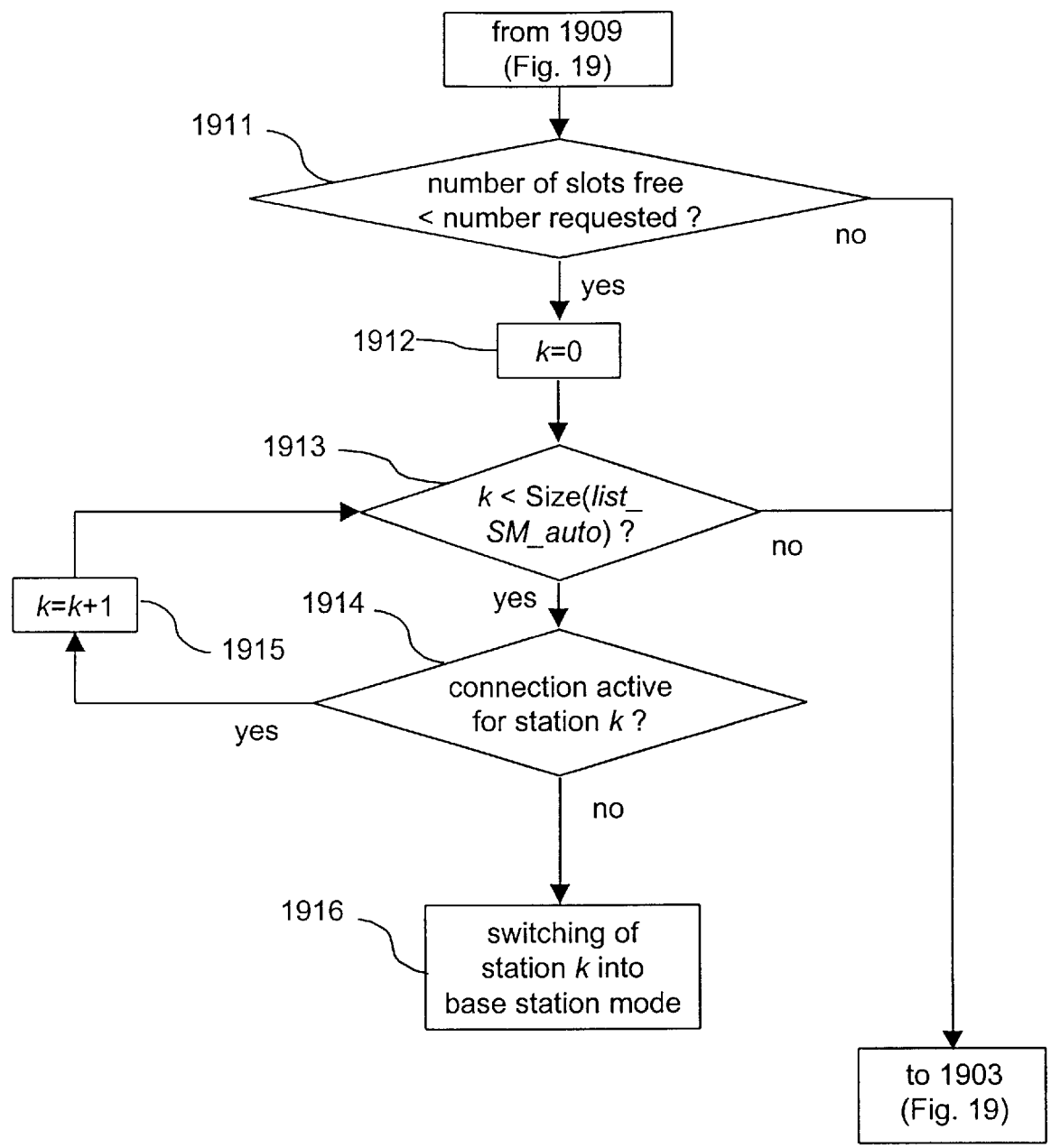
Figure 21A:
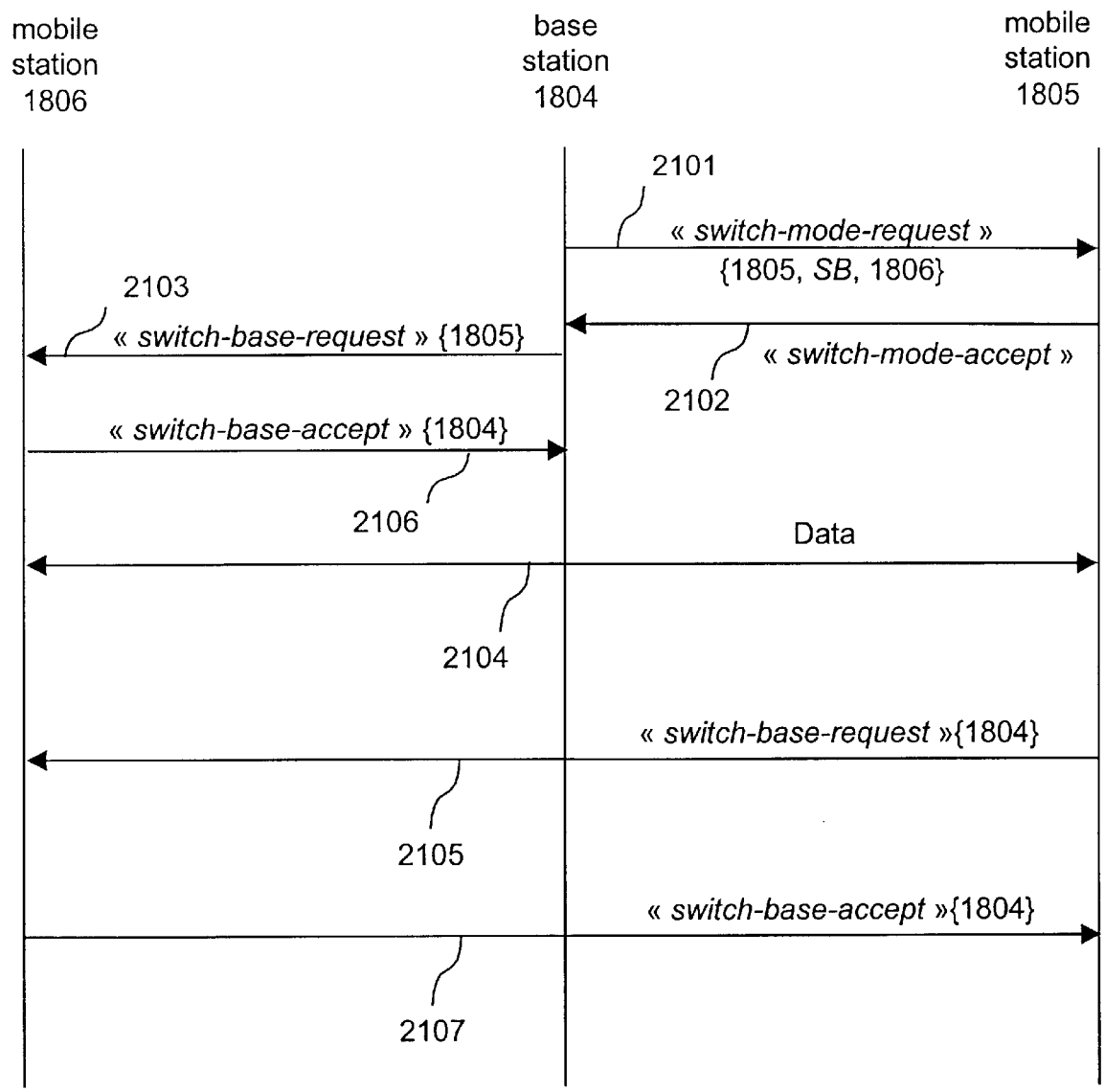
Figure 21B:
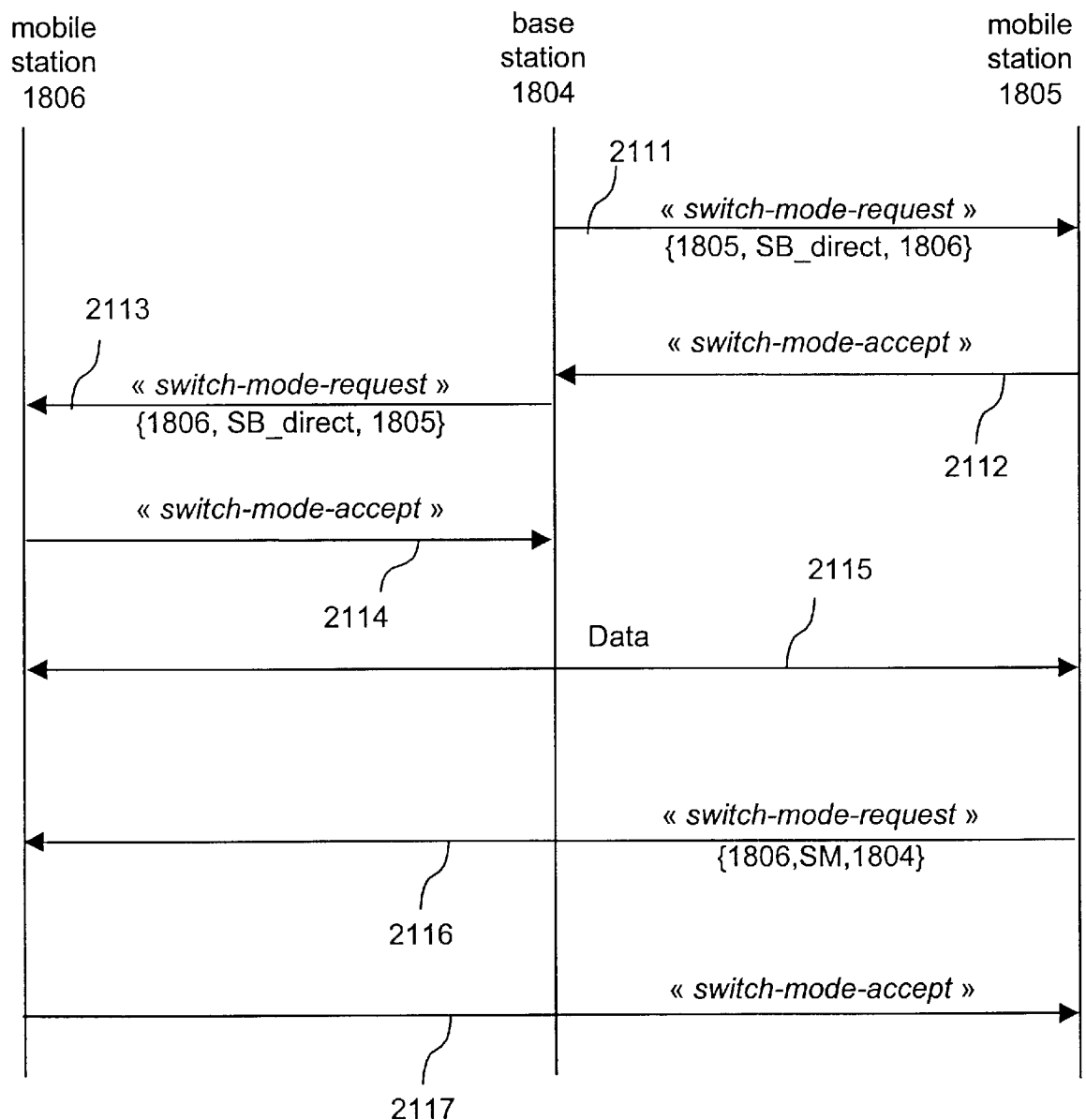
Figure 22:
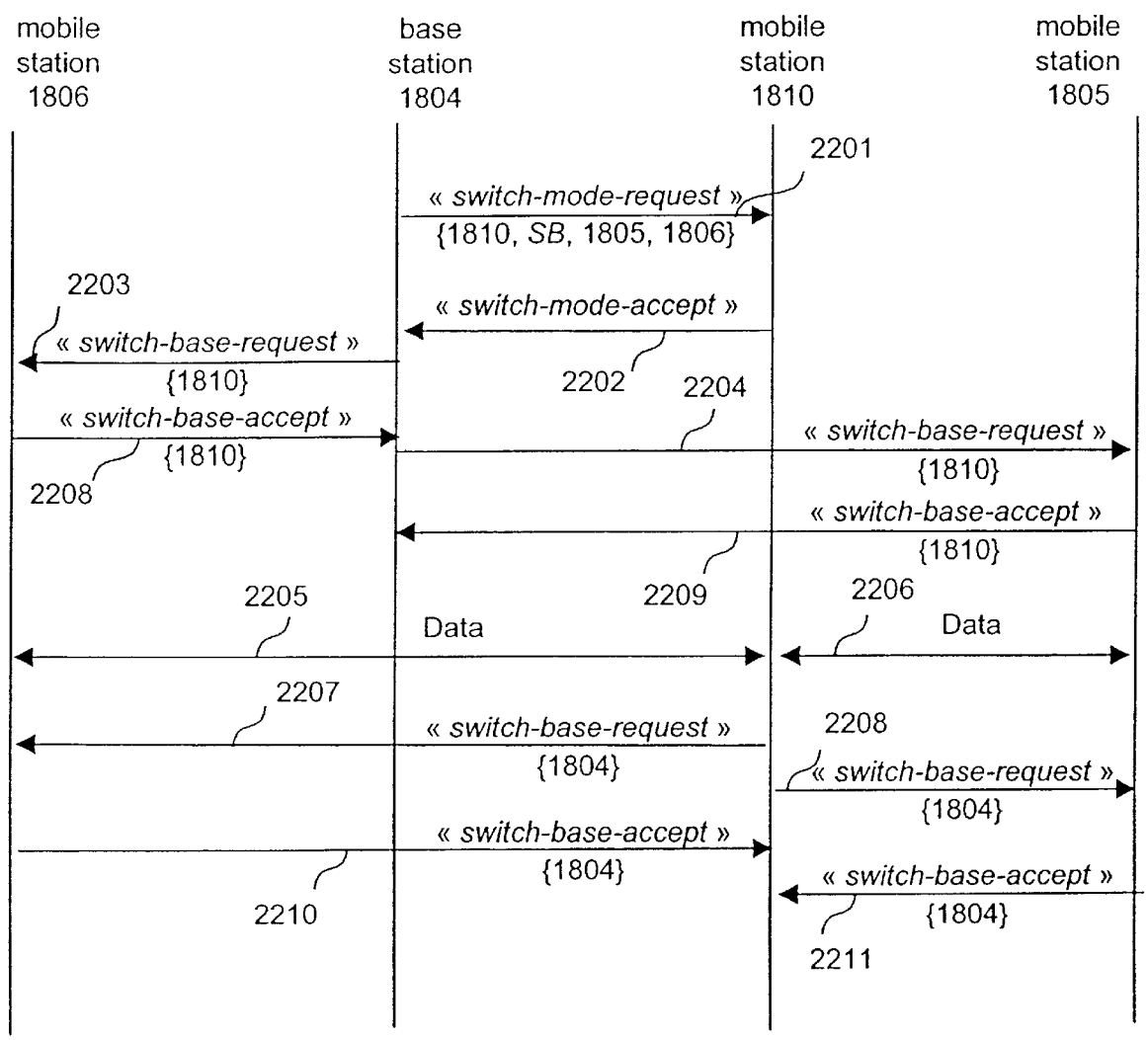
Figure 23:
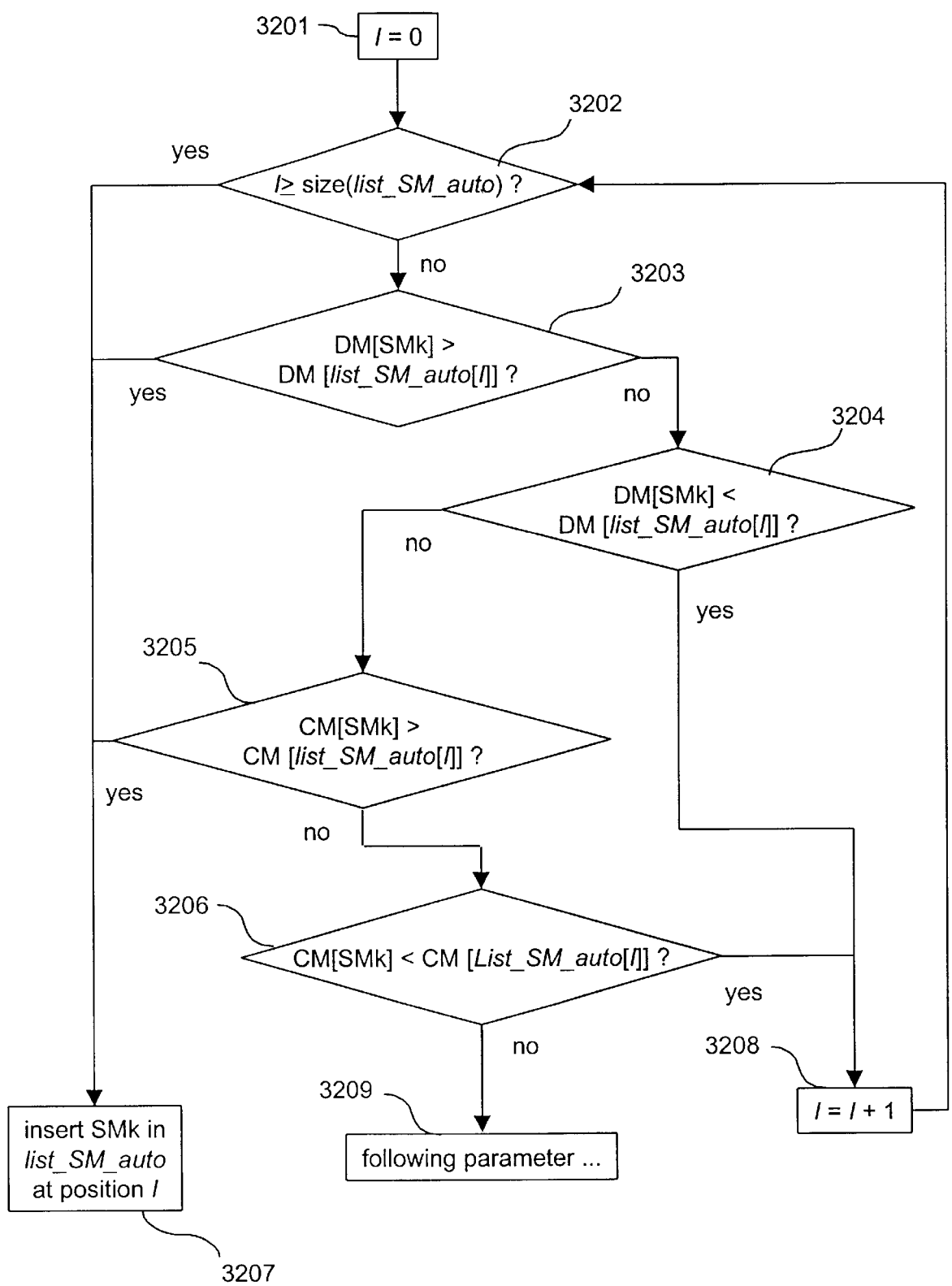
Figure 24:
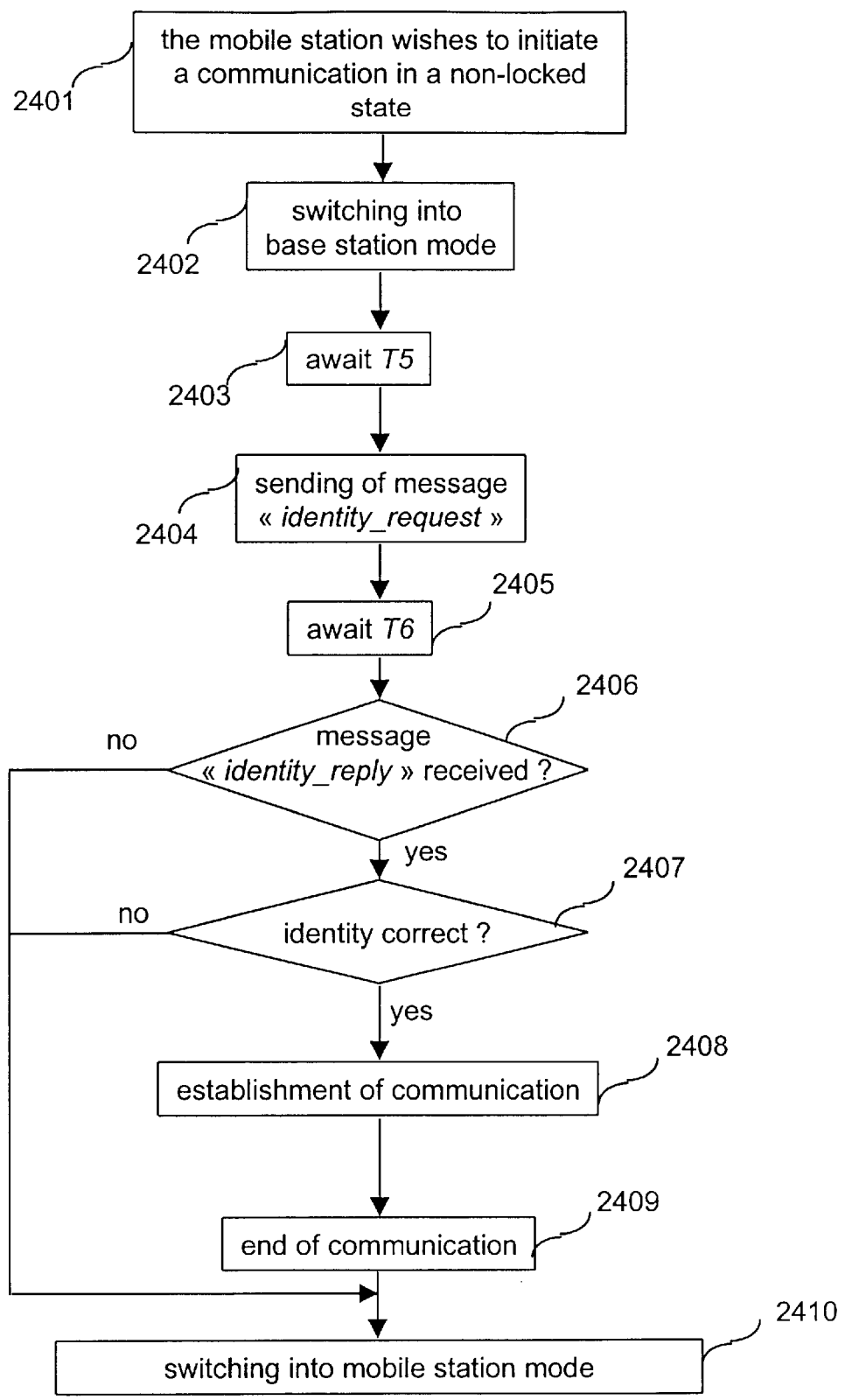
Figure 25:
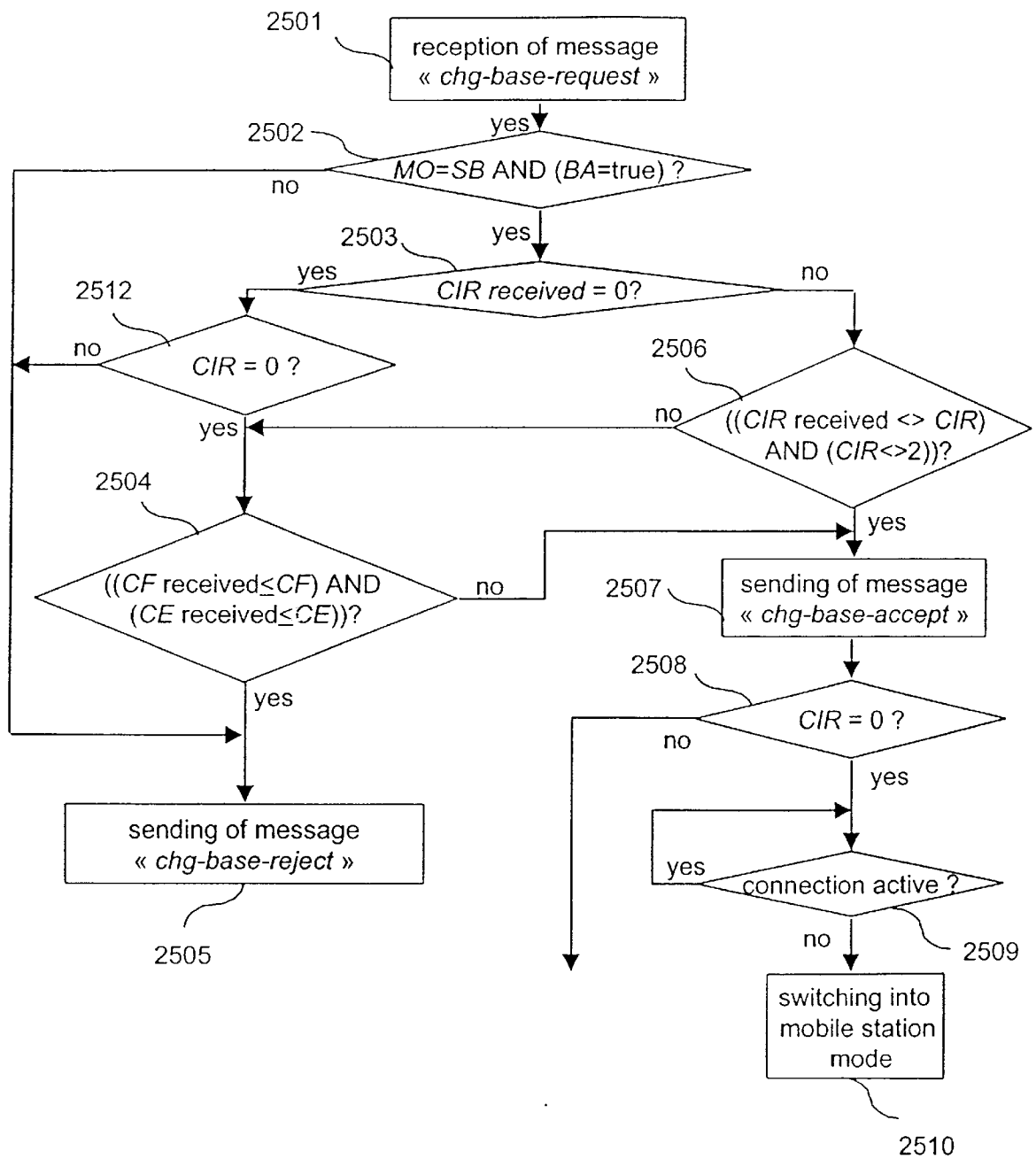
Figure 26:
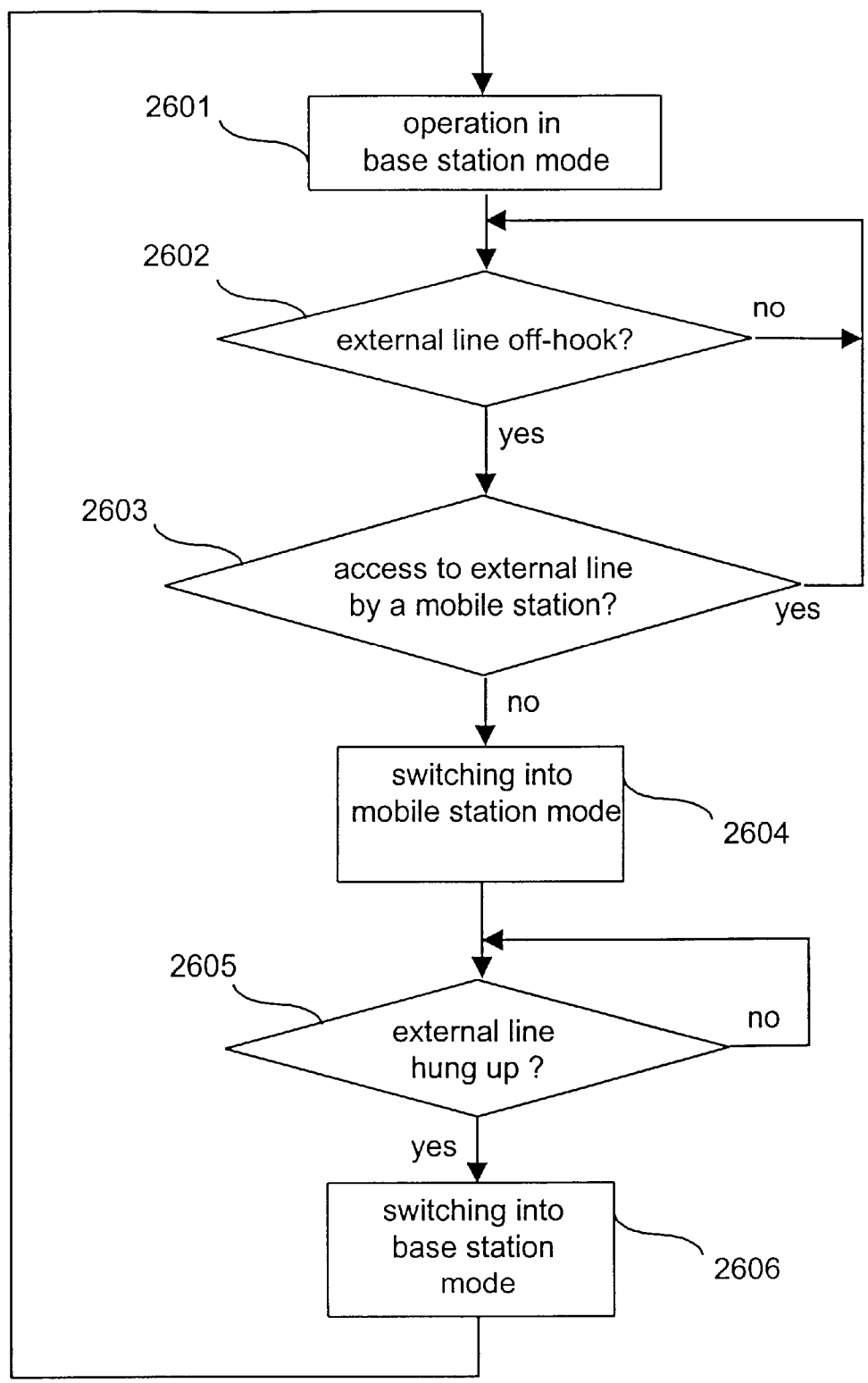
Figure 27:
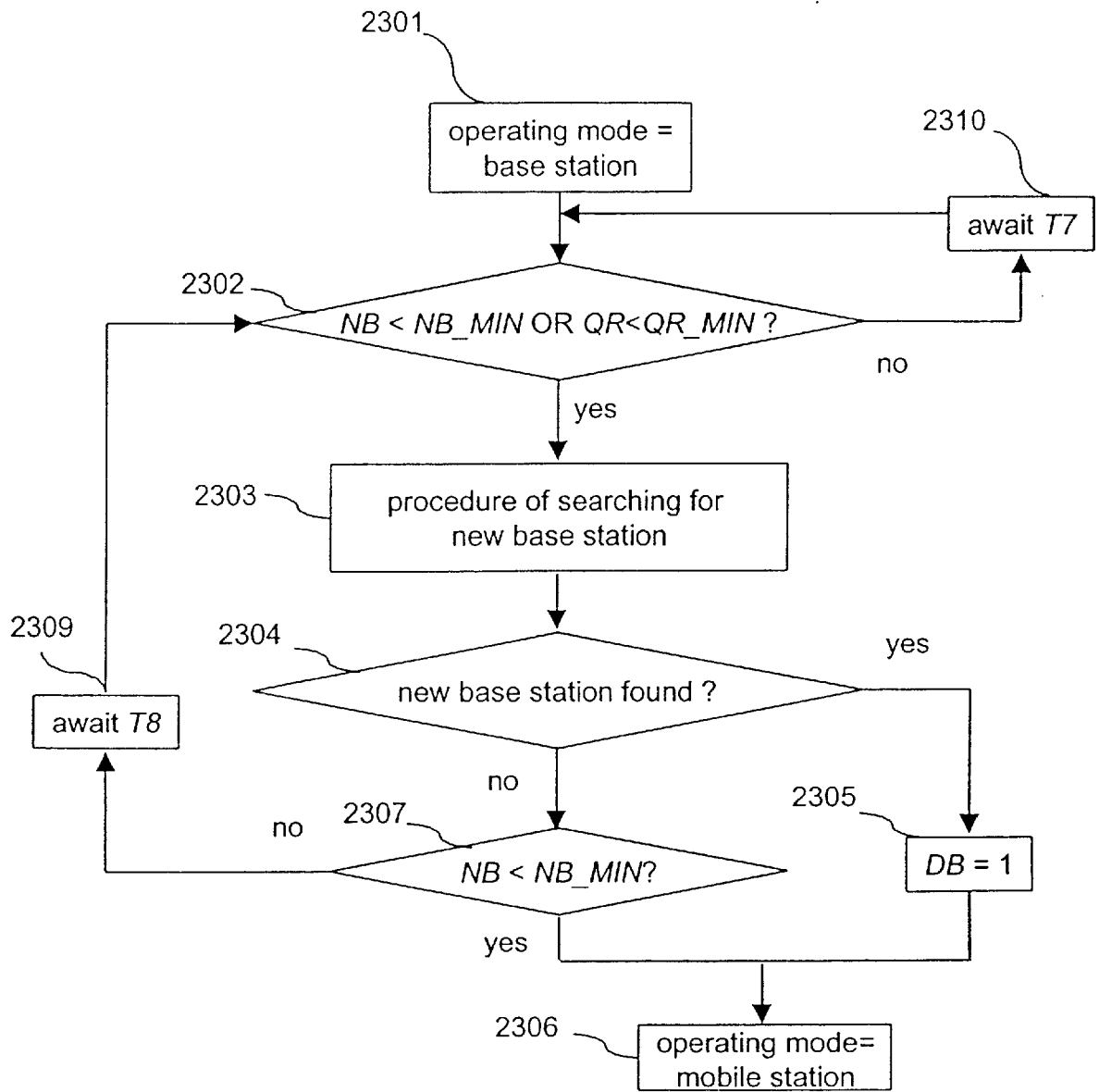
Figure 28:
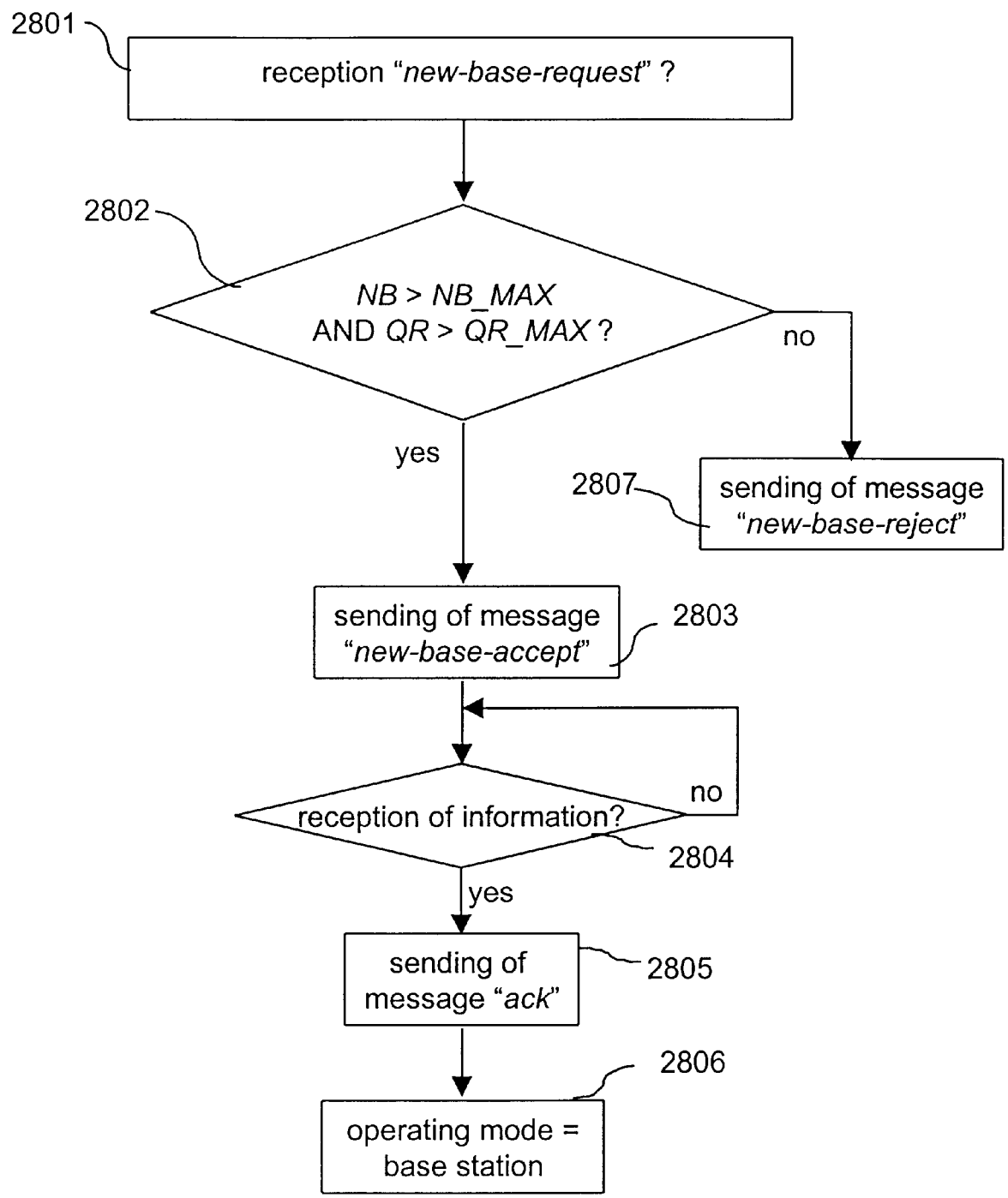
Figure 29:
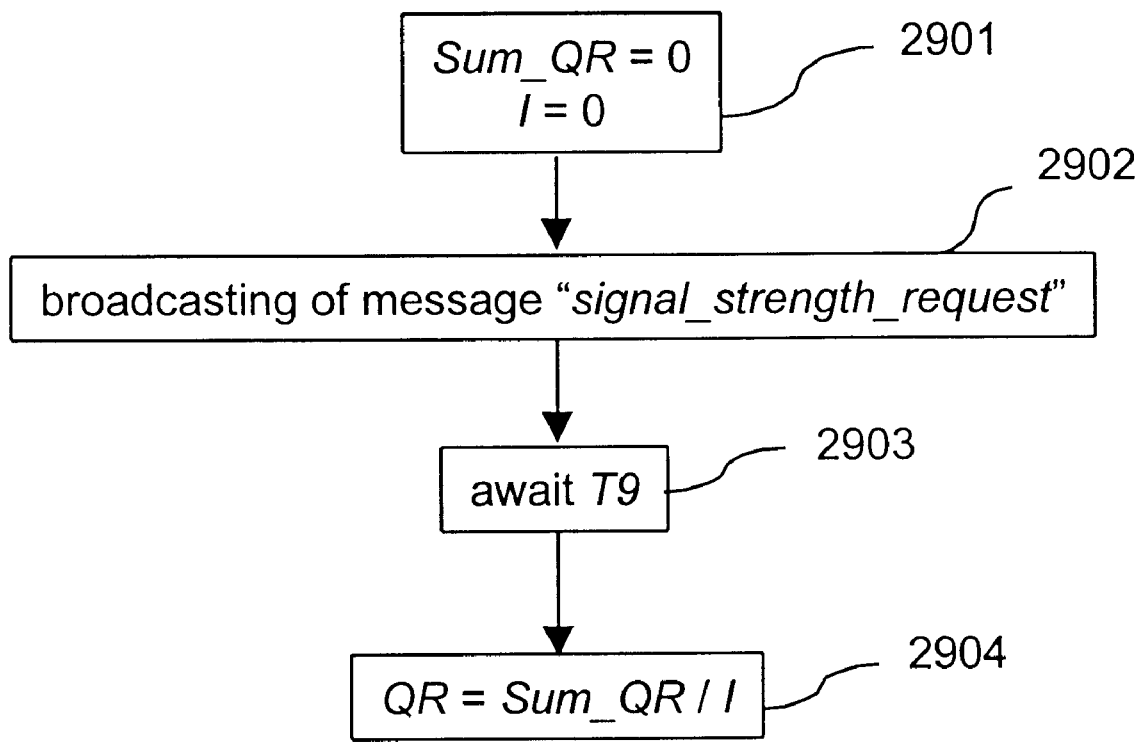
Figure 30:
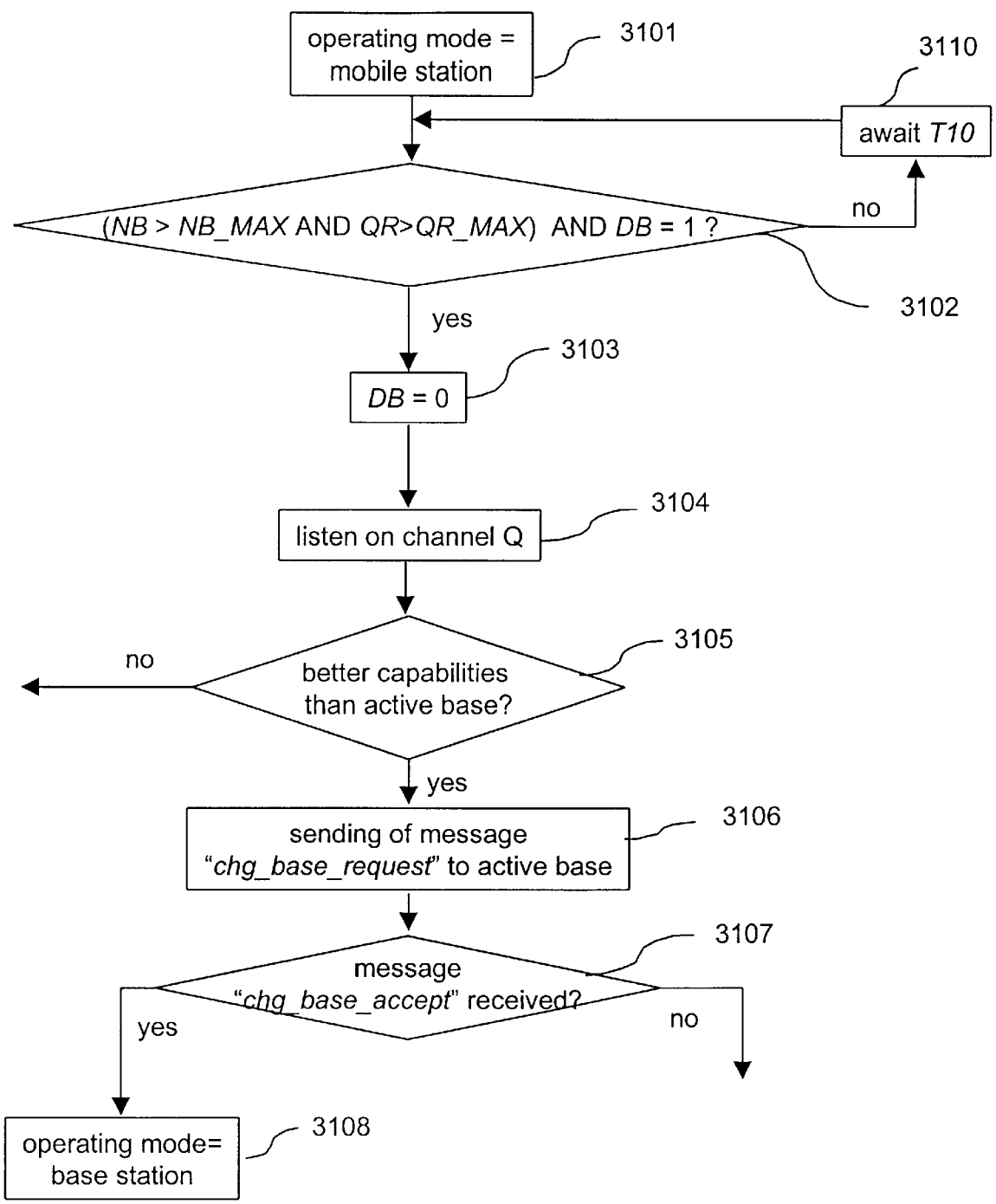
Figure 31:
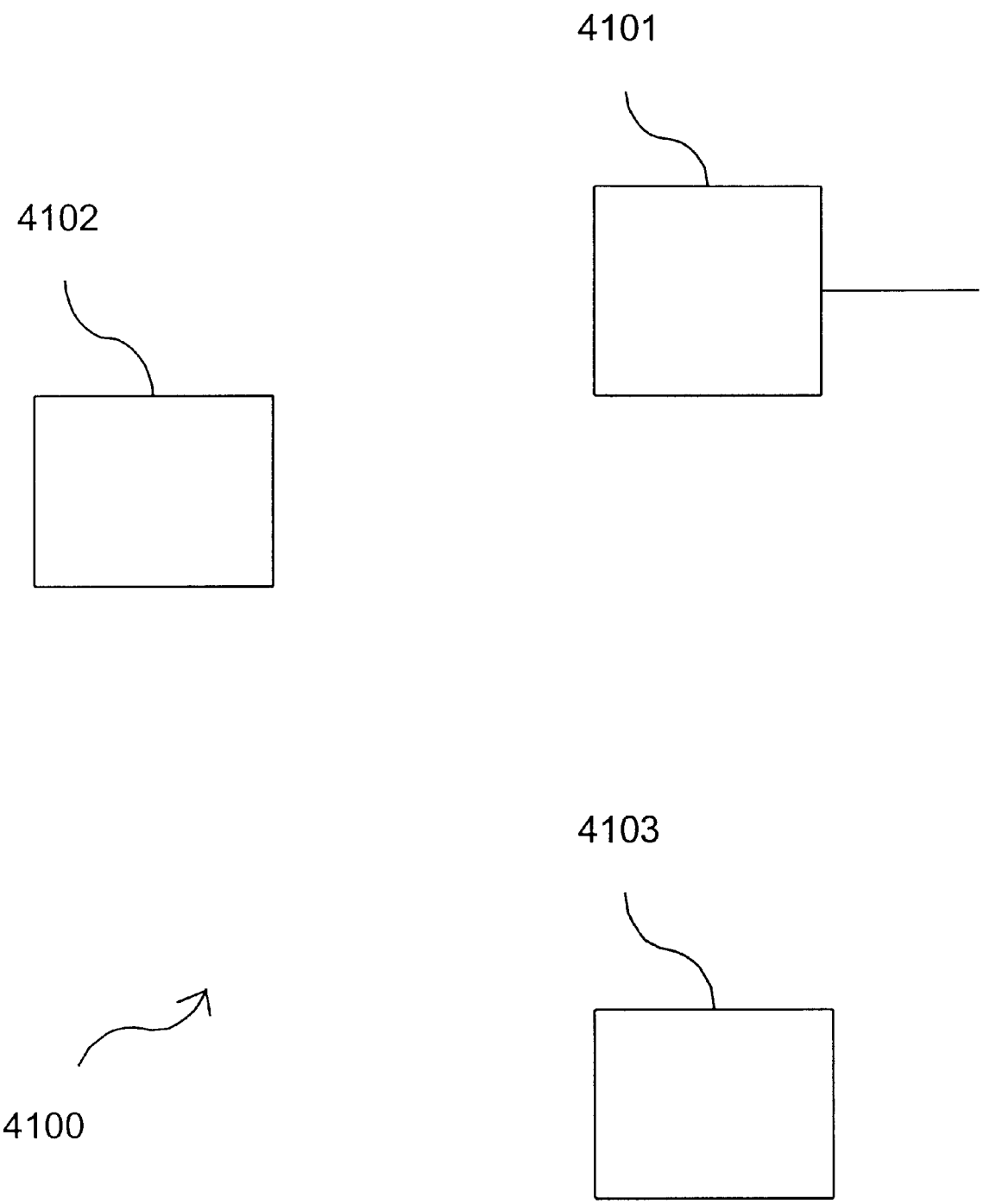
Figure 32:
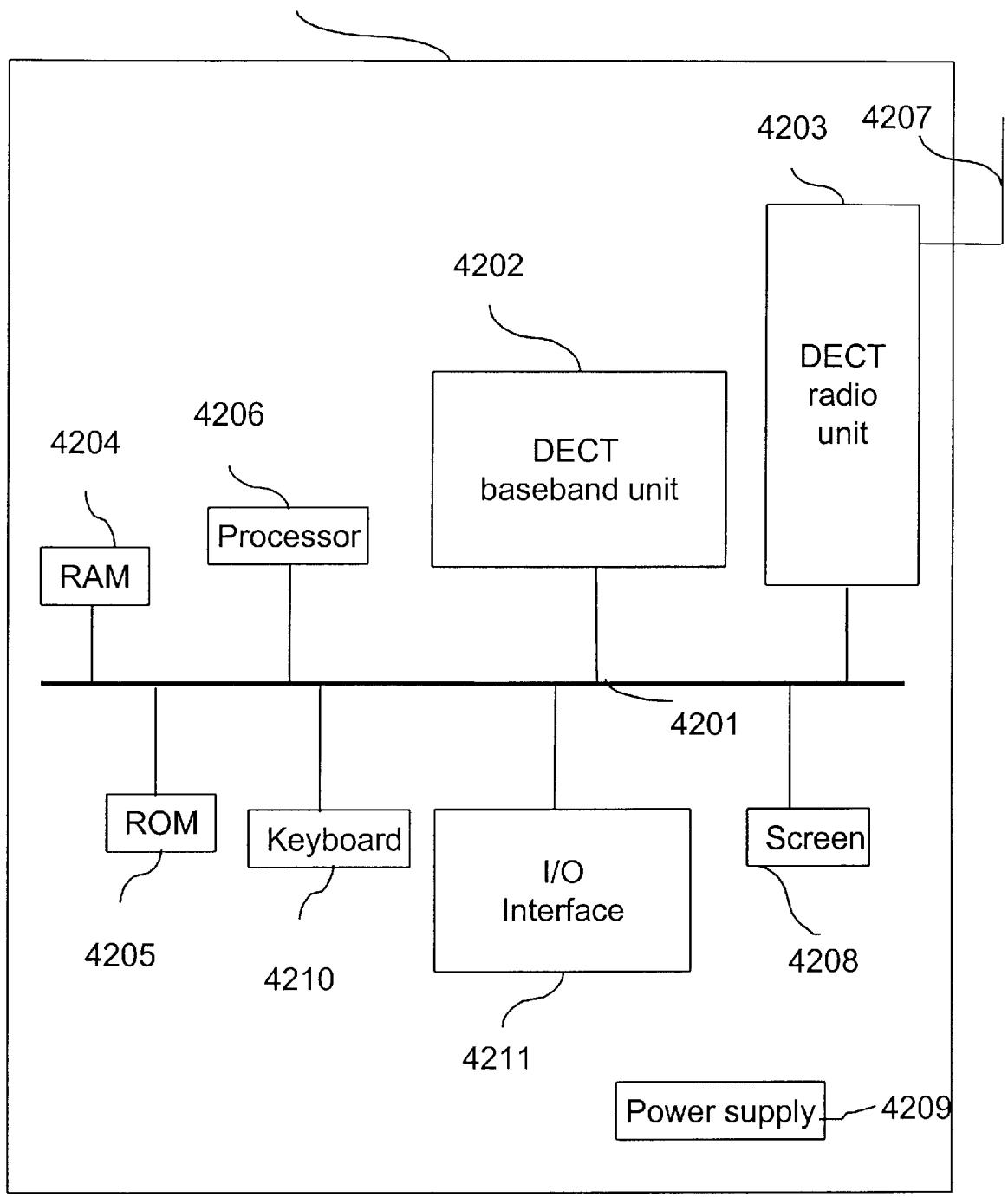
Figure 33:
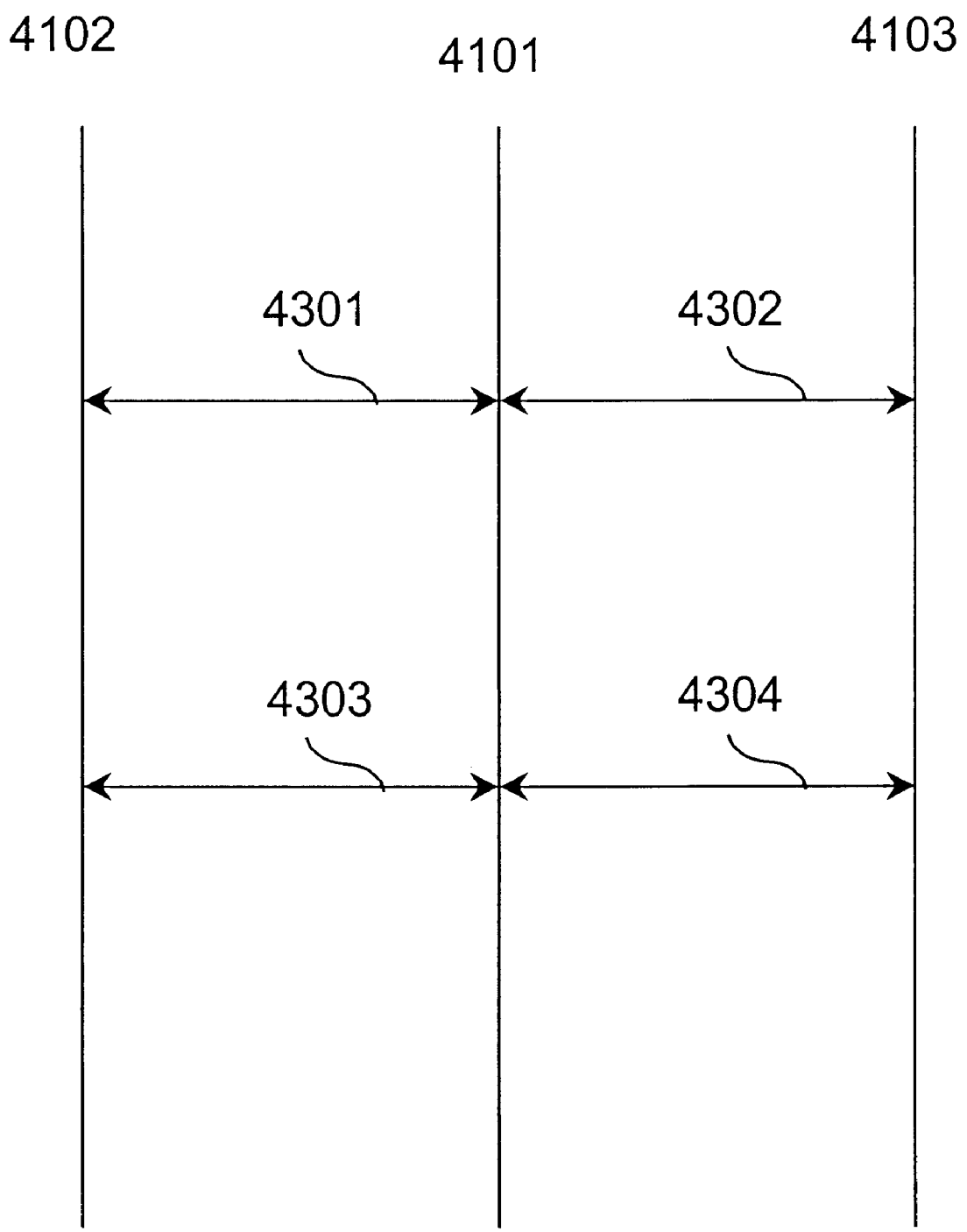
Figure 34:
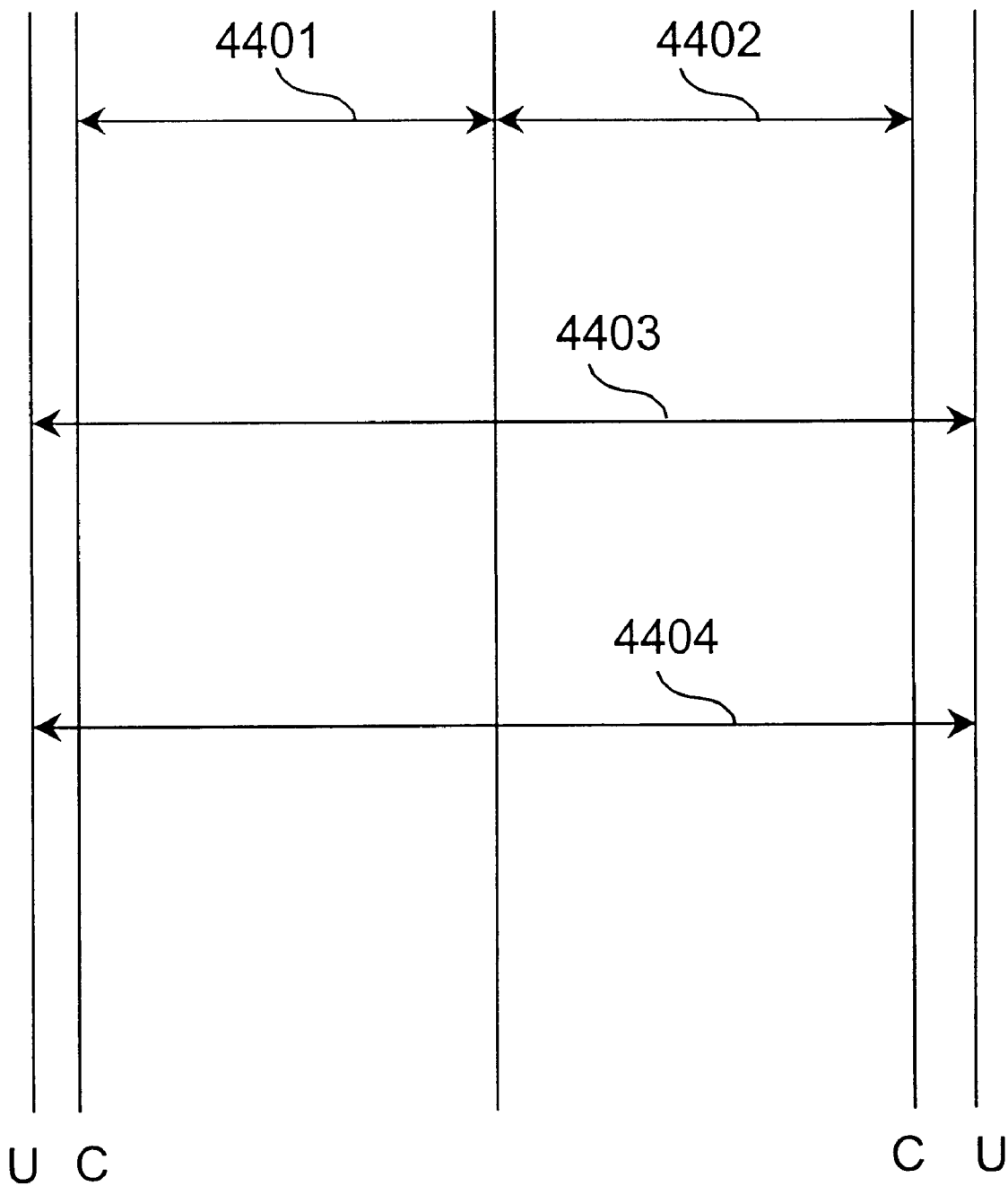
Figure 35:
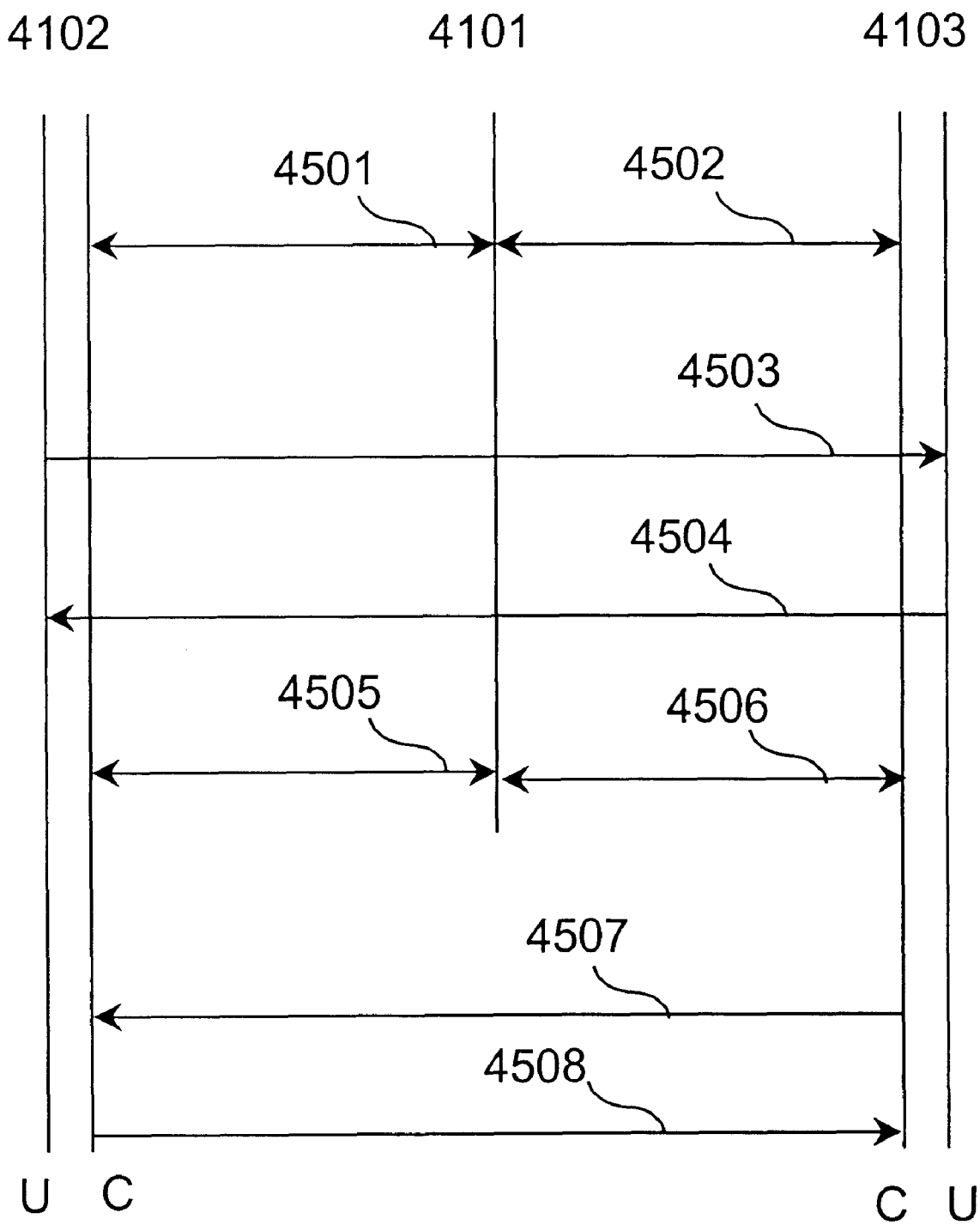
Figure 36:
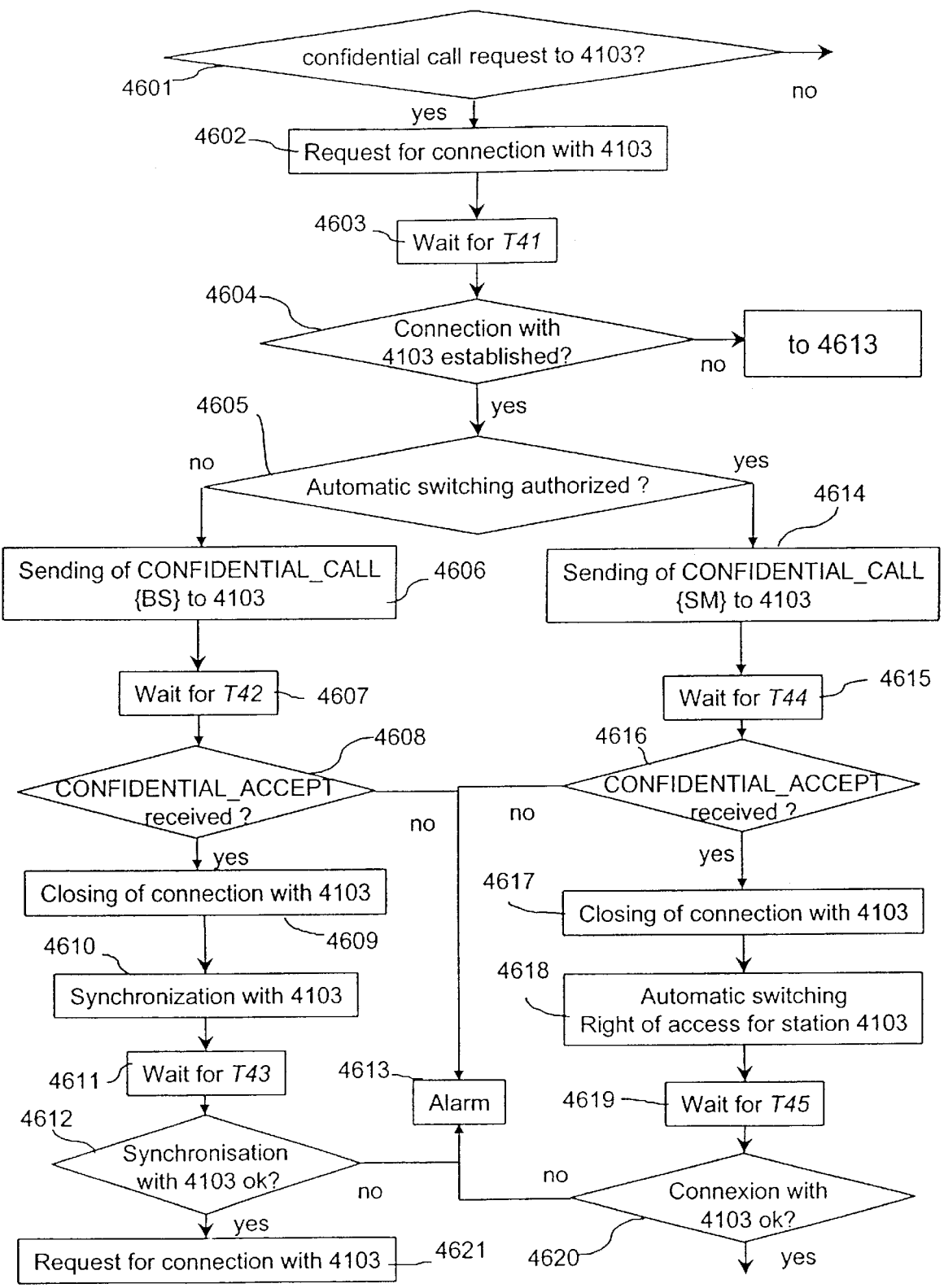
Figure 37:
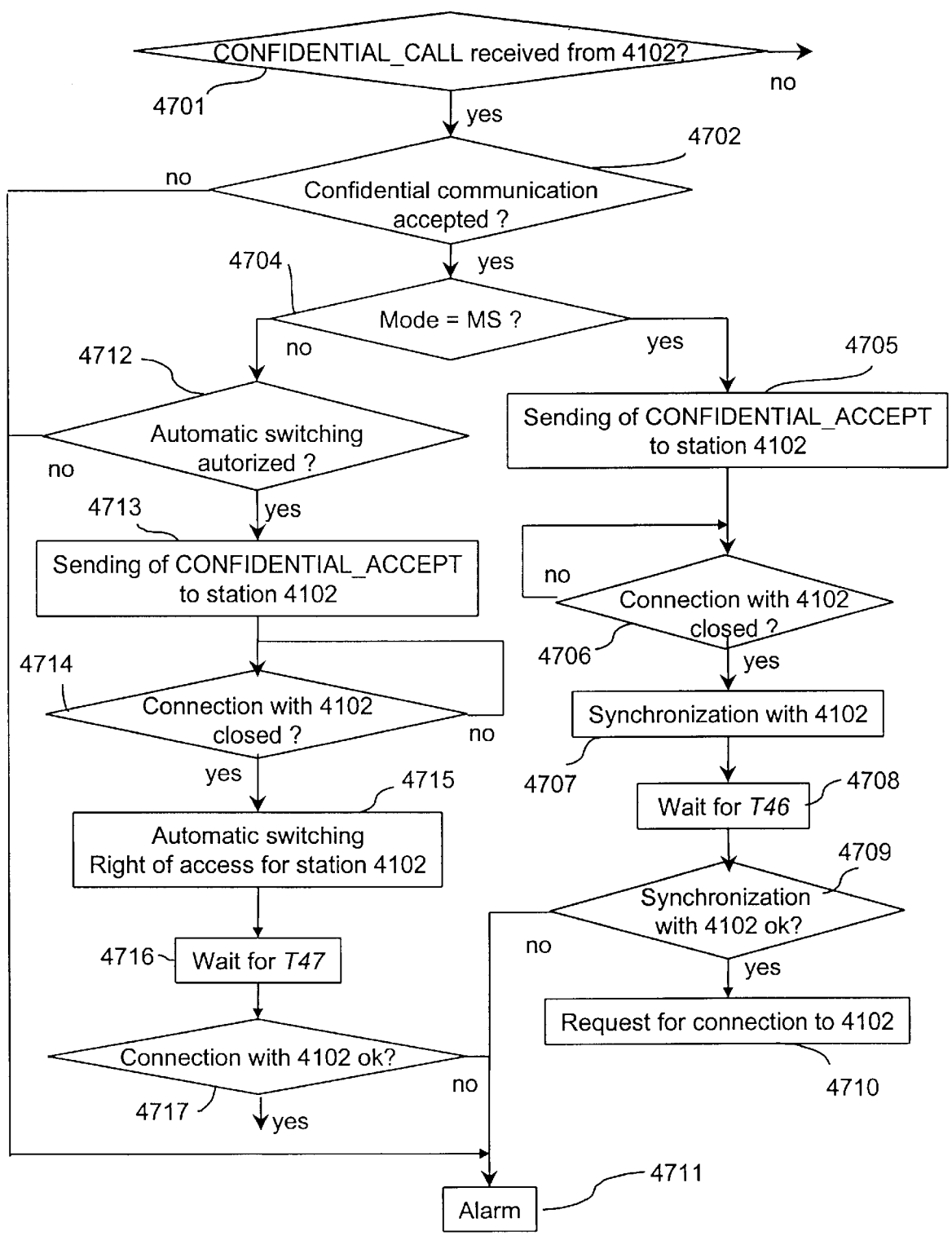

Other advantages, aims and characteristics of the present invention will emerge from the following description, given with reference to the accompanying drawings, in which:

FIG. 1 depicts, schematically, an operating flow diagram of a mobile station, with a view to its insertion in a network, in accordance with the prior art, FIG. 2 depicts schematically a network including communication devices according to the second, fourth and sixth aspects of the present invention, adapted to implement the communication method of the first, third and fifth aspects of the present invention, FIG. 3A depicts schematically the architecture of an electronic circuit incorporated in a communication device according to the second aspect of the present invention, FIG. 3B depicts schematically the architecture of an electronic circuit incorporated in a communication device according to the fourth and sixth aspects of the present invention, FIG. 4 depicts schematically an operating flow diagram of a communication device according to the second, fourth and sixth aspects of the present invention, with a view to its insertion in a network, FIG. 5 details part of the flow diagram illustrated in FIG. 4, FIG. 6A depicts schematically the organisation of information sent by a communication device according to the second aspect of the present invention, with a view to informing a base station of the capabilities of this device related to functioning in base station mode, FIG. 6B depicts schematically the organisation of information sent by a communication device according to the fourth and sixth aspects of the present invention, with a view to informing a base station of the capabilities of this device related to functioning in base station mode, FIGS. 7, 8A and 8B depict schematically exchanges of information occurring between communication devices according to the second, fourth and sixth aspects of the present invention, when a mobile station joins or leaves a cell, FIGS. 9, 10, 11 and 12 depict schematically operating flow diagrams of communication devices according to the second, fourth and sixth aspects of the present invention, with a view to a change in base station, FIG. 13 is a schematic time representation of the messages exchanged between communication devices in accordance with the flow diagrams in FIGS. 9 to 12, FIGS. 14A and 14B depict schematically the organisation of information sent by communication devices according to the second, fourth and sixth aspects of the present invention, with a view to collecting information concerning the capability of mobile stations of functioning in base station mode, FIGS. 15 and 16 depict schematically messages exchanged between communication devices according to the second, fourth and sixth aspects of the present invention, with a view to collecting information concerning the capability of mobile stations of functioning in base station mode, FIG. 17 depicts schematically a physical frame structure known in the state of the art, FIG. 18A depicts schematically a communication internal to a cell according to the state of the art, FIGS. 18B and 18C depict schematically a cell split implemented by the device which is the object of the second, fourth and sixth aspects of the present invention, FIGS. 19 and 20 depict schematically operating flow diagrams of communication devices according to the second, fourth and sixth aspects of the present invention, with a view to splitting the cell during an internal communication, FIGS. 21A, 21B and 22 depict schematically information exchanges occurring between communication devices according to the second, fourth and sixth aspects of the present invention, with a view to splitting the cell during an internal communication, FIG. 23 depicts schematically a flow diagram of classification of mobile stations as a function of criteria defining their capability of functioning as a base station, FIG. 24 depicts schematically a flow diagram implemented by a communication station functioning initially as a mobile station, with a view to communication, in the absence of a base station, FIG. 25 depicts schematically a flow diagram implemented by a communication station functioning initially as a mobile station, on reception of a message requesting a change in base station in accordance with the message illustrated in FIG. 6B, FIG. 26 depicts schematically a flow diagram implemented by a communication station connected to an external network, FIG. 27 depicts schematically a flow diagram implemented by a communication station functioning initially as a base station, when its capability of pursuing this functioning mode decreases, FIG. 28 depicts schematically a flow diagram implemented by a communication station functioning initially in mobile station mode, on reception of a message requesting a change in base station, FIG. 29 depicts schematically a flow diagram implemented by a communication station, functioning in base station mode, in order to determine a radio transmission quality, FIG. 30 depicts schematically a flow diagram implemented by a communication station functioning initially in mobile station mode, but having already functioned in base station mode, when its capabilities of functioning in base station mode have been restored, FIG. 31 depicts, schematically, a network having communication devices according to the eighth aspect of the present invention, adapted to implement the communication method of the seventh aspect of the present invention, FIG. 32 depicts, schematically, the architecture of an electronic circuit incorporated in a communication device in accordance with the eighth aspect of the present invention, FIG. 33 depicts, schematically, a first sequence of message exchanges between devices of a network in accordance with the prior art, FIG. 34 depicts, schematically, a second sequence of message exchanges between devices of a network, in accordance with the prior art, FIG. 35 depicts, schematically, a sequence of message exchanges between devices of a network, in accordance with the seventh and eighth aspects of the present invention, and FIGS. 36 and 37 depict, schematically, flow diagrams of the operation of communication devices in accordance with the eighth aspect of the present invention with a view to the setting up of a confidential communication between these devices.

In the description which follows, the term "communication device" designates part of a communication station allowing it to behave, in a communication network, as a base station or as a mobile station, in accordance, on the one hand, with the DECT standard and, on the other hand, with the different operating modes described with reference to the accompanying drawings. By extension, the term "communication device" designates the whole communication station which includes it.

FIG. 1 describes the procedure of locking a mobile station onto a signal transmitted by a base station, as known in the prior art.

When a mobile station is powered up, it goes into an internal initialisation state 101. Next, during an operation 102, the mobile station goes into reception mode on the next channel (there are ten of them) in the frequency band allocated for communications in accordance with the DECT standard (that is to say 1880 to 1900 MHz), seeking a signal transmitted by a base station which is suitable to it. When operation 102 is first iterated, it is the first channel which is chosen. When, before performing operation 102, the last channel is considered, it is the first channel which is chosen, during operation 102.

Next, during a test 103, the mobile station listens out on the radio channel under consideration, for a predetermined period, in order to detect a synchronisation pulse coming from a base station. The mobile station thus determines whether or not a base station is using the channel under consideration for sending a synchronisation signal.

When the result of test 103 is negative, during a test 104, the mobile station determines whether or not the channel under consideration is the last one. When the result of test 104 is negative, operation 102 is reiterated. When the result of test 104 is positive, during an operation 105, the mobile station goes into standby mode and then, during an operation 107, it waits for a predetermined period T0 (which can be a decreasing function of the energy resources of the mobile station), before reiterating operation 102.

When the result of test 103 is positive, during a test 108, the mobile station determines whether or not it has a right of access to the base station which sends the synchronisation signal.

To this end, when the result of test 103 is positive, the mobile station can obtain the information broadcast by the base station, every multiframe (each multi-frame being composed of sixteen frames with a duration of ten milliseconds). Amongst the information broadcast by the base station, there is notably the so-called "ARI" parameter (initials of the words "Access Rights Identity") which defines the access rights to the base station under consideration. Each mobile station having at least one identity referred to as "PARK" (initials of the words "Portable Access Rights Key"), it is the correspondence between at least one of the "PARK" identities and the "ARI" parameter which is tested during test 108.

When the result of test 108 is negative, test 104 is performed. When the result of test 108 is positive, during an operation 109, the mobile station locks onto the base station which is sending the synchronisation signal detected on the channel under consideration.

At the end of operation 109, the mobile station can obtain the information broadcast by the base station whose ARI parameter corresponds with at least one of its "PARK" identities.

The mobile station can then initiate or accept a connection by means of the base station onto which the mobile station is locked. The mobile station can then communicate with the other mobile stations which are also locked onto the same base station and with the base station itself, in particular when the latter supplies an access point to another network, for example by telephone.

It should be noted here that, if there is no base station which is sending a synchronisation signal, no communication is possible between the mobile stations, in accordance with the prior art.

FIG. 2 depicts, in one and the same local area 200, different communication devices in accordance with the present invention:

the communication devices 202 and 203 are telephones of a known type, complying, for example, with the DECT GAP standard (initials of the words "Generic Access Profile") and which is dedicated to portable telephone voice transmission, the communication devices 201, 204 and 205 are multimedia terminals able to behave, in the cell 200, as a base station or as a mobile station.

In the embodiment described and depicted, the communication devices 201, 204 and 205 support the DECT GAP standard, and comply with the type "A" data profile, relating to data transfers up to a rate of 24 kilobits per second. The communication device 201 also complies with the type "AB" data profile, relating to the transfer of data up to a rate of 552 kilobits per second, but can switch into base station mode only following a manual operation by the user.

Each device according to the present invention, 201, 204 and 205, operates, by default, in accordance with the description of FIG. 1, that is to say, at the time of initialisation, it goes into mobile station functioning mode.

In FIG. 3A, it can be seen that each communication device according to the second aspect of the present invention, 201, 204 or 205, has, connected together by a bus 301:

a controller 306, a DECT base band unit 302, a DECT radio unit 303, itself connected in addition to a sending/receiving antenna 307, a random access memory 304, a read-only memory 305, a keyboard 307, a display 308, an energy level controller 309, itself connected in addition to an electrical power supply 310 (battery, accumulator or mains), and an input/output interface 311.

The controllers 306 and 309 and the DECT base band unit 302 consist in fact of a processor and an operating program stored in the read-only memory 305.

The DECT base band unit 302 is of a known type and is adapted to exploit all the capabilities of the DECT standard known up to the time of the present invention.

The controller 306 is adapted to implement the method of the first aspect of the invention and in particular the flow diagrams illustrated in the figures. The energy level controller 309 is intended to evaluate the available energy level, in a known fashion, in order to determine timing values (see below).

The random access memory 304 stores, in registers which, for convenience, each bear the same name as the data which they contain:

- temporary variables I and k,
- a variable "MO" representing the current operating mode, mobile station or base station,
- a variable "MD" representing the random access memory available,
- a variable "CMD" representing a value coefficient for the available memory which takes one of three values "0", "1" or "2" depending on whether the memory area available has a capacity less than two predetermined values MD_N1 and MD_N2, is between the two predetermined values or is greater than the two predetermined values,
- a memory area "Tx/Rx" reserved for the reception or transmission of data,
- a table "Table_SM" containing a list of the identities of the mobile stations (including the devices according to the second aspect of the present invention) declared to the base station, and the information associated with these mobile stations,
- a list "List_SM_auto" containing a list of the identities of the devices according to the second aspect of the present invention, that is to say those able to change operational mode automatically (for example stations 204 and 205),
- a list "List_SM_manual" containing a list of the identities of the mobile stations able to change operational mode, through the intervention of their user (for example station 201), and
- a list "List_SM_direct" containing a list of the identities of the mobile stations able to communicate directly with each other, without a base station.

The read-only memory 305 stores, in registers which, for convenience, each bear the same name as the data which they contain:

- an item of information "CM" on the memory capacity of the device,
- an item of information "CP" on the capacity of the processor of the device,
- an indicator "IP" representing profiles of the DECT standard supported by the device (in fact by its DECT base band unit 302),
- an item of information "TS" representing the types of time intervals (referred to as "slots" in the remainder of the description and, in particular, in FIG. 17, a term in accordance with the usage of persons skilled in the art of communications) which are DECT supported (single, double or halfslot),
- an item of information "DM" representing a maximum data rate supported by the device (for example between 24 and 552 kilobits per second),
- the memory area capacity values MD_N1 and MD_N2,
- an item of information representing its identity,
- a coefficient "CPR" representing the number of DECT profiles supported,
- an item of information "CO" representing the operational capability of the device. This information can take the following values:
  - "SB": the device can operate only in base station mode,
  - "SM": the device can operate only in mobile station mode,
  - "SB/SM_manual": the device can change operating mode through the intervention of its user,
  - "SB/SM_auto": the device can automatically change operating mode,
  - "SM/SM_direct": the device can communicate directly with another mobile whose information "CO" takes the value "SM/SM_direct", and
- an item of information "BA" representing the automatic or manual switching capability from a base station functioning mode to a mobile station functioning mode and vice versa ("BA" being equal to "true", when this capability exists, and "false" otherwise).

The read-only memory 305 constitutes a means of storing information which can be read by a computer or a microprocessor, storing instructions of a computer program characterised in that it implements the method of the first aspect of the invention. According to a variant, the read-only memory 305 is removable, partially or totally, and has for example a magnetic strip, a flash memory, a diskette or a fixed-memory compact disc (CD-ROM).

In FIG. 3B, it can be seen that each communication device according to the fourth and sixth aspects of the present invention, 201, 204 or 205, has, connected together by a bus 301:

- a controller 306,
- a DECT base band unit 302,
- a radio unit 303, itself connected in addition to a sending/receiving antenna 307,
- a random access memory 304,
- a read-only memory 305,
- a keyboard 307,
- a display 308,
- an energy level controller 309, itself connected in addition to an electrical power supply 310 (battery, accumulator or mains),
- an input/output interface 311, and
- a communication quality controller 312.

The controllers 306 and 309 and the DECT base band unit 302 consist in fact of a processor and an operating program stored in the read-only memory 305.

The DECT base band unit 302 is of a known type and is adapted to exploit all the capabilities of the DECT standard known up to the time of the present invention.

The controller 306 is adapted to implement the method of the third and fifth aspects of the invention and, in particular, the flow diagrams illustrated in the figures. The energy level controller 309 is intended:

- to recognise the type of electrical power supply (mains or battery), in a known fashion, and to evaluate the energy level available for the communication device, in order to determine:
- time delay values (see below), and
- an ability to become a base station or to remain so.

The communication quality controller 312 is adapted to evaluate the quality of the radio signal and to supply a value QR representing this quality.

The random access memory 304 stores, in registers which, for convenience, each bear the same name as the data which they contain:

- temporary variables I and k,
- a value "QR" representing the quality of the radio signal measured by the controller 312, a value "NB" representing an available energy quantity, a value "DB" representing the past functioning of the station, in base station mode, a variable "MO" representing the current operating mode, mobile station or base station, a variable "MD" representing the random access memory available, a variable "CMD" representing a value coefficient for the available memory which takes one of three values "0", "1" or "2" depending on whether the memory area available has a capability less than two predetermined values MD_N1 and MD_N2, is between the two predetermined values or is greater than the two predetermined values, a memory area "Tx/Rx" reserved for the reception or transmission of data, a table "Table_SM" containing a list of the identities of the mobile stations (including the devices according to the fourth and sixth aspects of the present invention) declared to the base station, and the information associated with these mobile stations, a list "List_SM_auto" containing a list of the identities of the devices according to the fourth and sixth aspects of the present invention, that is to say those able to change operational mode automatically (for example stations 204 and 205), a list "List_SM_manual" containing a list of the identities of the mobile stations able to change operational mode, through the intervention of their user (for example station 201), and a list "List_SM_direct" containing a list of the identities of the mobile stations able to communicate directly with each other, without a base station.

The read-only memory 305 stores, in registers which, for convenience, each bear the same name as the data which they contain:

an item of information "CM" on the memory capacity of the device, an item of information "CP" on the capacity of the processor of the device, a minimum communication quality value QR_min, a maximum communication quality value QR_max, a minimum available energy quantity value NB_min, a maximum available energy quantity value NB_max, an indicator "IP" representing the profiles of the DECT standard supported by the device (in fact by its DECT base band unit 302), an energy coefficient "CE" which represents the energy source of the station under consideration, according to three values: "CE_HIGH", equal to "2", for a printer, copier, facsimile machine or office computer, and more generally for any equipment which is generally connected to the mains or which has a means of detecting connection to the mains which indicates that the station is connected to the mains, "CE_MID", equal to "1", for a portable computer and more generally for a communication station which can operate either on the mains or on a battery, and "CE_LOW", equal to "0", for a pocket organiser or portable telephone, and more generally for a communication station which operates almost exclusively on a battery, a fixity coefficient "CF" which represents the normal mobility of the station under consideration, according to three values: "CF_HIGH", equal to "2", for a printer, copier, facsimile machine or office computer, and more generally for any equipment which generally fixed, "CF_MID", equal to "1", for a portable computer and more generally for a communication station which can be moved but which is generally not in movement during its operation, and "CF_LOW", equal to "0", for a pocket organiser or portable telephone, and more generally for a communication station which may be in movement during its use, an item of network interface information "IR" which represents the types of network which: can be accessed by the station, equal to "0" when no other network can be accessed and being non-nil when another network can be accessed, the positions of the bits equalling "1" in the binary representation of "IR" indicating which types of network can be accessed:

xxxx xxx1 PSTN (Public Switched Telephone Network)

xxxx xx1x ISDN (Integrated Service Digital Network)

xxxx x1xx LAN (Local Area Network)

xxxx 1xxx ATM (Asynchronous Transfer Mode), a network interface coefficient "CIR" which represents the number of external networks accessible, an item of information "TS" representing the types of time intervals (referred to as "slots" in the remainder of the description and, in particular, in FIG. 17, a term in accordance with the usage of persons skilled in the art of communications) which are DECT supported (single, double or half-slot), an item of information "DM" representing a maximum data rate supported by the device (for example between 24 and 552 kilobits per second), the memory area capacity values MD_N1 and MD_N2, an item of information representing its identity, a coefficient "CPR" representing the number of DECT profiles supported, an item of information "CO" representing the operational capability of the device. This information can take the following values:

"SB": the device can operate only in base station mode,

"SM": the device can operate only in mobile station mode,

"SB/SM_manual": the device can change operating mode through the intervention of its user, "SB/SM_auto": the device can automatically change operating mode, "SM/SM_direct": the device can communicate directly with another mobile whose information "CO" takes the value "SM/SM_direct", and an item of information "BA" representing the automatic or manual switching capability from a base station functioning mode to a mobile station functioning mode and vice versa ("BA" being equal to "true", when this capability exists, and "false" otherwise).

The read-only memory 305 constitutes a means of storing information which can be read by a computer or a microprocessor, storing instructions of a computer program characterised in that it implements the method of the third and fifth aspects of the invention. According to a variant, the read-only memory 305 is removable, partially or totally, and has for example a magnetic strip, a flash memory, a diskette or a fixed-memory compact disc (CD-ROM).

The procedure followed by the controller 306 for determining the operating mode (base station or mobile station) is detailed in FIG. 4. When a communication device according to the second, fourth and sixth aspects of the present invention is powered up, it goes into an internal initialisation state 401. Next, during an operation 402, the communication device goes into reception mode on the next channel of the frequency band allocated for communications in accordance with the DECT standard, as disclosed with regard to operation 102 (FIG. 1).

Next, during a test 403, the communication device listens to the radio channel under consideration, for a predetermined period, in order to detect a synchronisation pulse coming from a base station (including the case of another communication device behaving as a base station). The communication device thus determines whether or not a base station is using the channel under consideration for sending a synchronisation signal.

When the result of test 403 is negative, during a test 404, the communication device determines whether or not the channel under consideration is the last. When the result of test 404 is negative, operation 402 is reiterated.

When the result of test 403 is positive, during a test 405, the communication device determines whether or not it has a right of access to the base station which is sending the synchronisation signal, as described with regard to operation 108 (FIG. 1).

When the result of test 405 is negative, the communication device performs test 404. When the result of test 405 is positive, during an operation 406, identical to operation 109 (FIG. 1), the communication device locks onto the base station which is sending the synchronisation signal detected on the channel under consideration.

At the end of operation 406, the communication device can obtain the information broadcast by the base station whose ARI parameter corresponds with at least one of its "PARK" identities. The communication device can also initiate or accept a connection by means of the base station onto which the device is locked. The communication device can then communicate on the one hand with the other mobile stations and the communication devices according to the present invention which behave as a mobile station, and which are also locked onto the same base station, and on the other hand with the base station itself or with the communication device which is behaving as a base station.

When the result of test 404 is positive, during an operation 407, the controller 306 of the communication device causes this communication device to switch into base station mode.

In this base station functioning mode, it sends, at regular time slots, with a duration less than the predetermined duration of test 403, a synchronisation signal, on one of the DECT channels. The duration of the regular time slot is, according to the DECT standard, 160 milliseconds.

Next, the communication device allows a time T1 to pass (for example one minute), operation 408, whilst continuing its functioning as a base station, before performing a test 409, during which it determines whether mobile stations are synchronised with it (see detail of test 409 in FIG. 5).

When the result of test 409 is negative, during an operation 411, the controller 306 causes the functioning mode to switch into mobile station mode, and then the communication device allows a predetermined time T2 to pass (for example as a decreasing function of the available energy evaluated by the energy level controller 309), operation 412, before renewing operation 402.

When the result of test 409 is positive, during an operation 413, the communication device allows a predetermined time T3 to pass (for example as an increasing function of the available energy evaluated by the energy level controller 309), whilst continuing its functioning in base station mode, before performing a test 414, during which the communication device determines whether or not at least one communication with a mobile station is active. When the result of test 414 is positive, it is reiterated. When the result of test 414 is negative, during an operation 415, the controller 306 causes the communication device to switch from base station mode to mobile station mode. Next, the communication device reiterates operation 402.

It will be understood that, in accordance with the flow diagram of FIG. 4, two operating criteria are used:
when, in mobile station functioning mode, the communication device detects no base station, it goes into base station functioning mode, and
when, in base station functioning mode, the communication device detects no mobile station, it goes into mobile station functioning mode.

In addition, when, in base station functioning mode, the communication device does not detect any communication with a mobile station, it goes into mobile station functioning mode. The purpose of the latter arrangements is to cause the base station to return to mobile station mode before once again seeking whether another base station can be detected.

In order to detect the presence of mobile stations (including the case of communication devices according to the second, fourth and sixth aspects of the present invention which behave as a mobile station), the case is chosen, with regard to FIG. 5, in which each communication device able to function in base station mode is informed of the identity of each communication device and of each mobile station able to communicate with it.

In this case, the communication, device first of all performs a test 501 (FIG. 5), during which the controller 306 determines whether or not the list of mobile stations able to communicate with the communication device is empty. When the result of test 501 is positive, the result of test 409 is negative, operation 502. When the result of test 501 is negative, during an operation 503, a temporary variable I, which serves as an indicator on said list, is initialised to the value "0". Then, during an operation 504, the communication device sends, to the network, a message requesting an answer to the device identified by the I$^{th}$ identifier of the list. Then the communication device allows a predetermined time T4 to pass, operation 505, before performing a test 506, during which it determines whether or not an answer message has been sent by a communication device. When the result of test 506 is positive, during a test 507, the device determines whether the identity of the device which sent the answer message corresponds to the identity of the device which was called during operation 504. When the result of test 507 is positive, the result of test 409 is positive, operation 510. When the result of test 507 is negative, or when the result of test 506 is negative, during an operation 508, the value of the variable I is incremented.

Next, during a test 509, the communication device determines whether or not the value of the variable I is less than or equal to the size of the list. When the result of test 509 is positive, operation 504 is reiterated. When the result of test 509 is negative, the result of test 409 is negative, operation 502.

As a variant, in order to detect the presence of mobile stations, the following procedure is used: when a mobile station detects a base station and locks onto this base station, the mobile station sends to the base station a message representing its identity and its capabilities (see below). The base station can then update a list of mobiles present in the cell. Conversely, when a mobile station leaves the cell (that is to say the area of coverage of the base station) or before switching off, it sends to the base station a message indicating that it is terminating its access rights.

It should be noted here that the procedure of detecting that a mobile station is leaving its cell is known from the prior art, by analysing the signal reception power.

FIG. 6A depicts the structure of information concerning the operational mode capability of a station in the network, according to the first and second aspects of the present invention. This information can be transmitted in DECT protocol messages using a field reserved for the transfer of nonstandardised information, referred to in the standard as "escape-to-proprietary". According to the first and second aspects of the invention, the non-standardised information is used solely in the following messages in the standard:

"access-rights-request", and

"locate-request", which includes an attachment request.

The first octet 601 of the field described in FIG. 6A indicates that the information elements which follow are non-standardised information to be sent within a DECT protocol message. The second octet 602 contains the information octet number to be transmitted. The third octet 603 indicates that the octets 604 and 605 contain an EMC ("Equipment Manufacturer Code") parameter, which serves to identify the manufacturer using this proprietary information. Thus, if an item of equipment whose EMC parameter is different from that indicated by the octets 604 and 605, it does not process the information which follows.

Naturally, if the present invention were to be the subject of standardisation between different manufacturers, octets 601, 604 and 605 would no longer be used in the same way.

Octet 606 represents the operational capability CO (identical to its value, in the embodiment described and depicted) of the device which acts as a mobile station. The following octets, 607 to 611, whose number is equal to the number of information octets to be transmitted (number represented by octet 602) minus four, serve to transmit more precise information on the capabilities of the device of operating as a base station. For example, the following parameters can be transmitted:

memory capacity of the device (octet 607), degree of filling of the memory of the device (octet 608), power, speed of the processor of the device (octet 609), and maximum rate supported by the device (octet 610).

The position bit 8 (on the left) of the information octets 607 to 610 takes one of the values:

"1", when the information element is transmitted in this message, or

"0" when the value of the following bits of the octet has no meaning (the information element is not transmitted in the message).

FIG. 6B depicts the structure of information concerning the operational mode capability of a station in the network, according to the third and sixth aspects of the invention. This information can be transmitted in DECT protocol messages using a field reserved for the transfer of non-standardised information, referred to in the standard as "escape-to-proprietary". According to the invention, the non-standardised information is used solely in the following messages in the standard:

"access-rights-request", and

"locate-request", which includes an attachment request.

The first octet 701 of the field described in FIG. 6B indicates that the information elements which follow are non-standardised information to be sent within a DECT protocol message. The second octet 702 contains the information octet number to be transmitted. The third octet 703 indicates that the octets 704 and 705 contain an EMC ("Equipment Manufacturer Code") parameter, which serves to identify the manufacturer using this proprietary information. Thus, if an item of equipment whose EMC parameter is different from that indicated by the octets 704 and 705, it does not process the information which follows.

Naturally, if the present invention were to be the subject of standardisation between different manufacturers, octets 701, 704 and 705 would no longer be used in the same way.

Octet 706 represents the operational capability CO (identical to its value, in the embodiment described and depicted) of the device which acts as a mobile station. The following octets, 707 to 711, whose number is equal to the number of information octets to be transmitted (number represented by octet 702) minus four, serve to transmit more precise information on the capabilities of the device for operating as a base station. For example, the following parameters can be transmitted:

memory capacity of the device (octet 707), degree of filling of the memory of the device (octet 708), power, speed of the processor of the device (octet 709), and maximum rate supported by the device (octet 710), fixity coefficient "CF" (octet 712), energy coefficient "CE" (octet 713), network interface "IR" (octet 714).

The position bit 8 (on the left) of the information octets 707 to 712 take one of the values:

"1", when the information element is transmitted in this message, or

"0" when the value of the following bits of the octet has no meaning (the information element is not transmitted in the message).

FIG. 7 describes how a mobile station obtains rights of access to a base station and how it terminates its rights of access. The access rights procedure enables a base station and a mobile station to exchange their respective identities and information concerning the capabilities of the mobile station. The mobile station initiates the procedure by sending, to the base station, a message "access_rights_request" which contains notably the capabilities of the mobile station in the field "terminal capability". In this field, according to the first to sixth aspects of the invention, use is made of the profile indicator parameter ("profile indicator") and slot type parameter ("slot type capability") (see below).

The additional information necessary for the functioning of the device according to the first and second aspects of the present invention is transmitted in the field "escape to proprietary" of the message "access_rights_request" (FIG. 6A).

When a base station receives a message "access-rights-request", if the mobile station is authorised to access the resources of the base station, the latter returns a message "access_rights_accept", and adds, in the table of the declared mobile stations, the information concerning the mobile station which sent the message "access_rights_request".

The information thus collected is stored in the table_SM, of the random access memory 304, organised in the following fashion:

No Identity CO CM RM CP IP TS DM . . .

1

2

. . .

When a mobile station is added to the table_SM, the following information concerning it are stored therein:

its mobile identity,
its operational capability (CO),
its memory capacity (CM),
the degree of filling of its memory (RM),
its processor capacity (CP),
its profile indicator (IP),
its slot type capability (TS),
its maximum throughput (DM), and possibly other information characterising it.

The parameters IP and TS are read in the field "Terminal Capability" of the message "access_rights_request", whilst the parameters CO, CM, RM, CP and DM are read in the field "escape to proprietary" described in FIG. 6A. When a mobile station wishes to terminate its access rights to a base station, it sends a message 803 "access_rights_terminate_request". The base station then erases the information concerning this mobile station in its table_SM and returns a message "access_rights_terminate_accept" 804. The mobile station can then no longer use the resources of the base station.

The additional information necessary for the functioning of the device according to the third to sixth aspects of the present invention is transmitted in the field "escape to proprietary" of the message "access_rights_request" (FIG. 6B).

When a base station receives a message "access_rights_request", if the mobile station is authorised to access the resources of the base station, the latter returns a message "access_rights_accept", and adds, in the table of the declared mobile stations, the information concerning the mobile station which sent the message "access_rights_request".

The information thus collected is stored in the table_SM, of the random access memory 304, organised in the following fashion:

No Identity CO CM RM CP IP TS DM CE CF IR
1
2
. . .

When a mobile station is added to the table_SM, the following information concerning it are stored therein:
its mobile identity,
its operational capability (CO),
its memory capacity (CM),
the degree of filling of its memory (RM),
its processor capacity (CP),
its profile indicator (IP),
its slot type capability (TS),
its maximum throughput (DM),
its energy coefficient (CE),
its fixity coefficient (CF),
its network interface information (IR),
and, optionally, other information characterising it.

The parameters IP and TS are read in the field "Terminal Capability" of the message "access_rights_request", whilst the parameters CO, CM, RM, CP, DM, CF, CE and IR are read in the field "escape to proprietary" described in FIG. 6B. When a mobile station wishes to terminate its access rights to a base station, it sends a message 803 "access_rights_terminate_request". The base station then erases the information concerning this mobile station in its table_SM and returns a message "access_rights_terminate_accept" 804. The mobile station can then no longer use the resources of the base station.

FIG. 8A illustrates how a mobile station attaches itself to or detaches itself from a base station. When a mobile station enters the cell of a base station over which the mobile station has obtained access rights, it must initiate a procedure of attachment to the base station. By this procedure, the mobile station indicates to the base station that it is ready to receive calls. To attach itself, the mobile station sends to the base station a message "Locate_request" 811 which contains information concerning notably the identity and capabilities of the communication station and the possibility of sending non-standardised information. With the message "Locate_request" 811, it is possible to transfer to the base station the same information as with the message "access_rights_request". If a mobile station has important changes to its parameters (for example memory space still available) compared with the time of the access right procedure, it can use the field "escape to proprietary" as defined in FIGS. 6A and 6B, to inform the base station thereof.

When a base station receives a message "Locate_request" 811, it verifies that the mobile station is identified in its "table_SM" and, in the affirmative, returns a message "Locate_accept" 812. The base station then uses the information contained in its "table_SM", the table of the declared mobile stations, in order to insert the mobile station under consideration in the appropriate list, List_SM_auto, if its operational capability CO is equal to SB/SM_auto, List_SM_manual if its operational capability CO is equal to SB/SM_manual or List_SM_direct if its operational capability is equal to SM/SM_direct.

The reverse procedure to attachment is detachment. When a mobile station leaves the cell or is switched off, it sends a message "detach" 813 to the base station, which then withdraws the mobile station from the list corresponding to its operational capability.

However, the detachment procedure may not always be initiated by the mobile station which leaves the cell (because of breakdown or excessive speed for example). The last part, in FIG. 8B, illustrates how the base station can periodically check on the validity of the information which it is keeping in the list stored in its random access memory 304.

The base station then periodically sends a request for a procedure of updating its location (or its attachment), by means of a message "MM_info_suggest" 821, whose field "info_type" is equal to "locate_suggest". The procedure of updating the location of a mobile station is identical to the attachment procedure, the messages 822 and 823 being respectively identical to the messages 811 and 812.

By virtue of the provisions illustrated in FIGS. 7, 8A and 8B, the list list_SM_auto contains all the mobile stations present in the cell and having the capability of switching automatically between base station mode and mobile station mode.

As explained with regard to FIG. 23, the list_SM_auto is classified according to the decreasing capability of the mobile stations of becoming a base station: the first element in the list concerns the mobile station which has the best capability of becoming a base station. In order to classify this list, after each attachment, detachment or updating procedure, the base station takes into account all the parameters stored in the table_SM_auto (CM, RM, CP, IP, TS, DM, . . . according to the first and second aspects of the invention; CM, RM, CP, IP, TS, DM, CF, CE, IR, . . . according to the third to sixth aspects of the invention).

The list_SM_manual is sorted in the same way as the list_SM_auto. These lists can be used in the following situations:
the base station becomes inactive following a powering down or a switching into mobile station mode and it seeks a replacement base station amongst the mobile stations having a capability of becoming a base station, the base station is excessively used (memory full, number of simultaneous communications greater than a predetermined value) and it seeks a second base station for taking over some of the traffic.

The base station then chooses the first mobile station in the list_SM_auto. If the list_SM_auto is empty, or if none of the stations in the list list_SM_auto is suitable, the base station can have recourse to the first mobile station represented in the list_SM_manual. It must then transmit a message which triggers the display or sending of a signal to the mobile station chosen in order to warn the user that a change of functioning mode at the mobile station under consideration is required.

The base station uses the list_SM_direct so that the communications internal to the cell each involving at least one station represented in this list are directly organised by this station.

Figure 9:
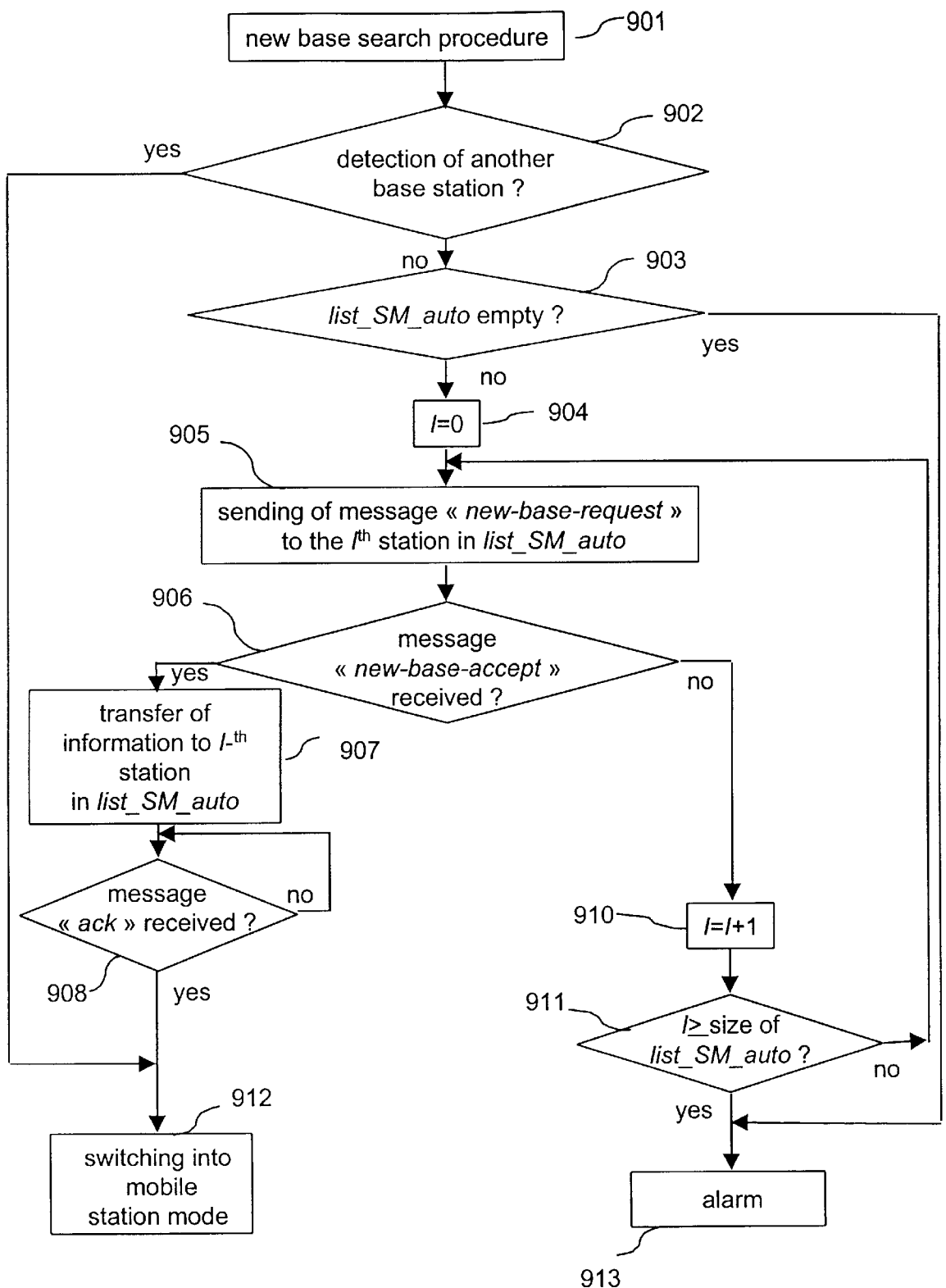
Figure 10:
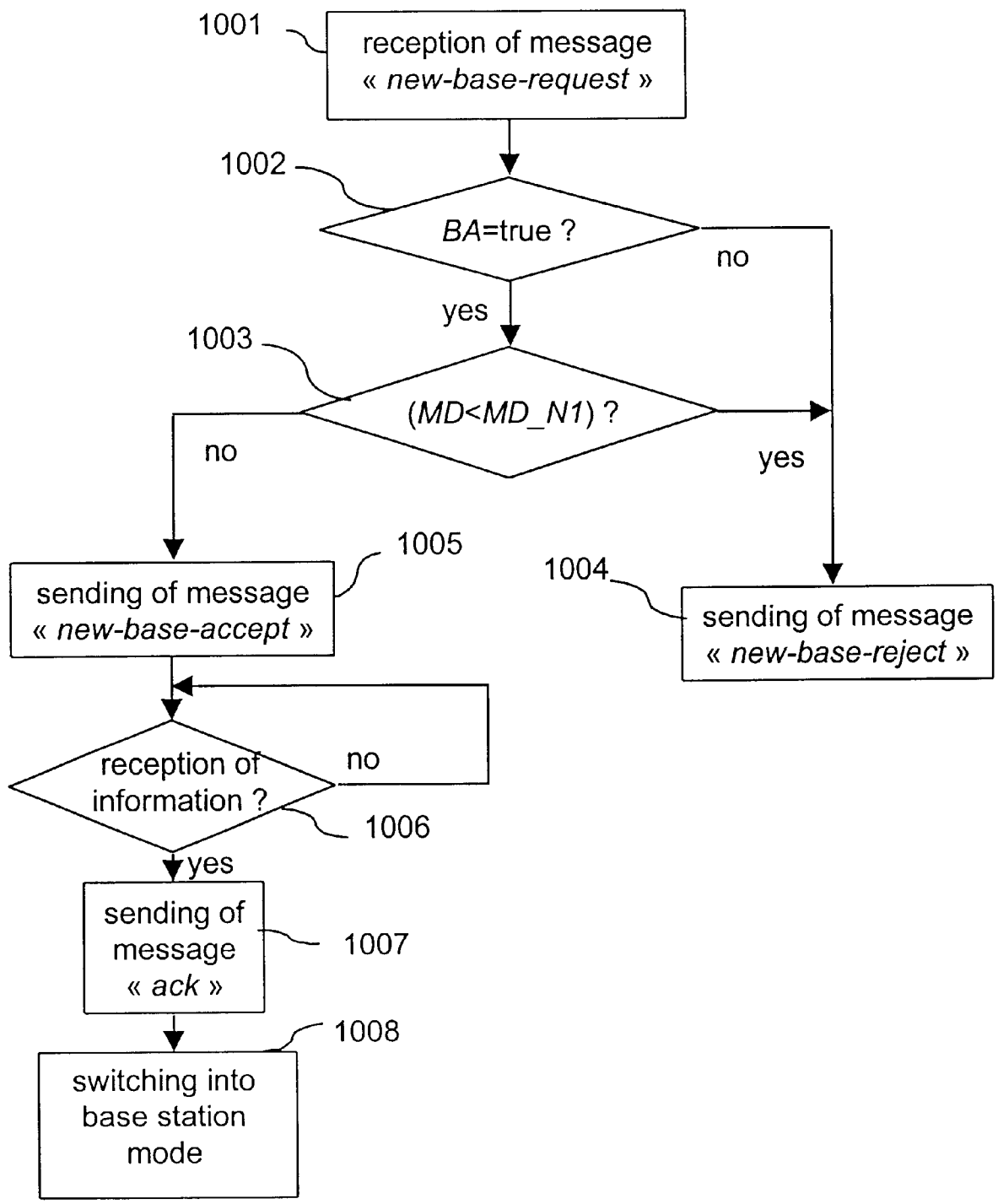

FIGS. 9 and 10 illustrate how a base station in activity (referred to as "initial") finds a replacement base station (referred to as "final"), for example when the initial base station can no longer fulfil its role as base station (switching off or automatic or manual switching to mobile station mode).

The procedure described in FIG. 9 can be implemented only when there is no active connection. In addition, any new connection request is refused during this procedure.

As illustrated in FIG. 9, the initial base station commences with a test 902 during which it determines whether or not another base station is present (as illustrated in FIG. 1). When the result of the test 902 is positive, the procedure is complete, with success, since the mobile stations which communicate with the initial base station will be able to replace the latter for their communications and the initial base station changes functioning mode and becomes a mobile station, operation 912.

When the result of test 902 is negative, during a test 903, the initial base station determines whether or not the list_SM_auto is empty. When the result of test 903 is positive, the procedure is ended, having failed, since no mobile station can take the role of base station. The user is then informed that, if the base station ceases its activity, all the communications will be suspended, operation 913.

When the result of test 903 is negative, during an operation 904, the variable I is initialised to the value "0". Then, during an operation 905, the initial base station sends a message "new_base_request" to the $I^{th}$ mobile station in the list_SM_auto. During operation 905, the initial base station waits for a sufficient period of time to enable a mobile station in accordance with the device which is the object of the second, fourth and sixth aspects of the present invention to reply, before performing a test 906. Next, during this test 906, the initial base station determines whether or not it has received, from the mobile station under consideration, a message "new_base_accept".

When the result of test 906 is positive, during an operation 907, the information stored in the table table_SM, and in the lists list_SM_auto, list_SM manual and list_SM_direct, are transferred into the random access_memory of the mobile station under consideration. Next, during a test 908, the initial base station determines whether or not it has received, from the mobile station under consideration, a data transfer acknowledgement message. When the result of test 908 is negative, it is reiterated. When the result of test 908 is positive, the initial base station changes operating mode, operation 912, and the base station change operation is ended, on the initial base station side, with success.

When the result of test 906 is negative, the initial base station considers that the allocation of the base station role has been refused by the $I^{th}$ station in the list list_SM_auto. Then, during an operation 910, the value of the variable I is incremented by 1. Then, during a test 911, the initial base station determines whether or not the value of the variable I is greater than or equal to the number of mobile stations represented in the list_SM_auto.

When the result of test 911 is negative, operation 905 is reiterated. When the result of test 911 is positive, the base station change procedure is ended, having failed, and the user is warned that the cessation of the activity of the initial base station will cause the suspension of all the communications, operation 913.

According to a variant, not shown, when, during test 911, it is determined that the list list_SM_auto has been entirely run through, the operations and tests 905 to 912 are reiterated, running through the list list_SM_manual. Operation 912 is then performed only after the mobile station which sent the message "new-base-accept" (test 906) has sent a message confirming change in functioning mode.

When the procedure has been ended with success, by the detection of another base station during test 902 or by the acknowledgement of an information transfer by a mobile station during a test 908, the base station has thus changed operating mode and has become a mobile station, unless the procedure illustrated in FIG. 9 has been brought about by a switching off of the initial base station, in which case the latter ceases its activity.

FIG. 10 illustrates the procedure of changing base station on the part of a mobile station, when, during a test 1001, it determines that a message "new_base_request" has been received from the base station and is intended for the mobile station under consideration. Next, during a test 1002, the mobile station determines whether or not its operating capability CO has one of the values SB/SM_auto or SB/SM_manual, determining whether or not the value of the information "BA" is "true". When the result of test 1002 is negative, during an operation 1004, a message "new_base_reject" is sent by the mobile station under consideration to the base station in order to indicate to it that the allocation of the base station role has been refused. Then the procedure is ended, without the mobile station having switched into base station functioning mode.

When the result of test 1002 is positive, during a test 1003, the mobile station determines whether its available memory capacity MD is strictly less than the value MD_N1 stored in the read-only memory 305. This value MD_N1 corresponds in fact to a minimum available memory capacity for taking the base station role.

When the result of test 1003 is positive, operation 1004 is performed. When the result of test 1003 is negative, during an operation 1005, the mobile station sends a message accepting the role of base station "new_base_accept", to the initial base station. Then, during a test 1006, the mobile station determines whether it has received, from the initial base station, the necessary information for taking the base station role, that is to say all the information stored in the lists list_SM_auto, list_SM_manual and list_SM_direct, and in the table table_SM.

When the result of test 1006 is negative, it is reiterated. When the result of test 1006 is positive, during an operation 1007, the mobile station sends, to the base station, an acknowledgement of receipt of the information. Then, during an operation 1008, the mobile station changes functioning mode and becomes a base station. The procedure is then ended.

Where the mobile station has an operating code value SB/SM_manual, the test 1003 is supplemented by:
- a triggering of a warning signal intended to warn the user that he must manually switch the operating mode of the communication station concerned,
- a wait for a sufficient period for the user to have the time to effect the manual switching, and
- a test of change of operating mode by the user (not shown) and, where the user has not effected the change in operating mode during a predetermined period which follows the test 1003, operation 1004 is performed.

It will be noted that, in accordance with the functioning mode illustrated in FIGS. 9 and 10, the initial base station uses static criteria, that is to say which do not immediately change value according to the change in the network or mobile stations, in order to choose a replacement base station, whilst the mobile station envisaged as the future base station can accept or refuse the role of new base station, using dynamic criteria, that is to say taking into account immediately any change in the state of the mobile station which would prevent its activity as a base station.

FIGS. 11 and 12 illustrate how, at the initiative of a station which is initially a mobile station, a change in base station can be effected. For example, when such a mobile station has locked onto the initial base station, following its being powered up, and when this mobile station is a candidate for being a base station (for example because it supports all the variants and the most extensive modes of the DECT standard), a test 1101 is positive. Otherwise, this procedure is ended. When the result of test 1101 is positive, during an operation 1102, the mobile station listens to the channel known, in the DECT standard, under the name of "Q". On this channel, in fact, the initial base station regularly broadcasts information which may be useful to mobile stations and, in particular, information concerning the DECT profiles which it supports.

Next, during a test 1103, the mobile station determines whether or not it has better capabilities of being a base station than the initial base station. When the result of test 1103 is negative, the procedure is ended. When the result of test 1103 is positive, during an operation 1104, the mobile station sends a message "chg_base_request", which means change in base required, to the initial base station, and then allows a sufficient period to pass for the base station to be able, if it is in accordance with the communication device of the present invention, to send a message in answer.

Then, during a test 1105, the mobile station determines whether or not it has received, in return, from the base station, a message "chg_base_accept", which means acceptance of change in base. When the result of test 1105 is negative, the mobile station considers that it has received a refusal to change base on the part of the initial base station, and the base change procedure is ended.

When the result of test 1105 is positive, the operations 1106, 1107 and 1108 are respectively identical to operations 1006, 1007 and 1008. Then the base station change procedure is ended.

On the initial base station side, when, during a test 1201, it determines that it has received a message "chg_base_request", from a mobile station which is locked, it performs a test 1202 during which it determines whether or not, both at the same time, the information "BA" representing its communication capability is equal to "true" and its operating mode MO corresponds to that of a base station.

When the result of test 1202 is negative, during an operation 1203, the initial base station sends, to the mobile station under consideration, a message "chg_base_reject".

Then the procedure is ended. When the result of test 1202 is positive, during an operation 1204, the initial base station sends, to the mobile station under consideration, a message "chg_base_accept". Then, during a test 1205, the initial base station determines whether or not there is an active connection.

When the result of test 1205 is positive, it is reiterated. When the result of test 1205 is negative, during an operation 1206, the base station sends, to the mobile station under consideration, the information stored in the table table_SM, and in the lists list_SM_auto, list_SM_manual and list_SM_direct.

Next, during a test 1207, the initial base station determines whether or not it has received, from the mobile station under consideration, a message acknowledging the data transfer. When the result of test 1207 is negative, it is reiterated. When the result of test 1207 is positive, during an operation 1208, the initial base station changes operating mode and starts to function in mobile station mode, and the operation of changing base station is ended with success.

FIG. 13 depicts:
- in the form of messages 1301 to 1304, the messages exchanged between the initial base station, on the left, and the mobile station which will become a base station, on the right, in the context of the procedure illustrated in FIGS. 9 and 10, and
- in the form of messages 1305 and 1306, the messages exchanged between a mobile station, on the left, and the base station, in the context of the procedure illustrated in FIGS. 11 and 12.

In order to collect information concerning the capability of the mobile stations present in the network of operating in base station mode, the base station according to the first to sixth aspects of the present invention uses a message of the broadcast type illustrated in FIG. 14A. The base station thus interrogates all the mobile stations in order to obtain the following information:
- a list of the mobile stations which can switch automatically into base station mode,
- this same list sorted according to one or more parameters chosen by the base station,
- the identity of the mobile station which has the best overall capability of operating in base station mode, at a given instant,
- the identity of the mobile station which has the best capability of operating in base station mode, according to one or more criteria fixed by the base station.

A first type of message 1401 (in FIG. 14A) is a request from the base station broadcast to all the mobile stations, which includes the following fields:
- a message code field 1402 "broadcast_SB_req", which means approximately "request broadcast by the base",
- a type field 1403 CT, defining the type of request concerned,
- a length field 1404 CL, which defines the number of parameters in the request, and
- parameter fields 1405 CP(0) to 1406 CP(CL-1), which contain the criteria with respect to which the answer is awaited.

The type field 1403 CT and length field 1404 CL can take different values, making it possible to specify to the different mobile stations how to respond to the request and according to which criteria, the latter being specified by the fields 1405 to 1406.

When the information transmitted in the field 1403 CT is equal to "0", each mobile station must without delay send its capability of acting as a base station and, if the value contained in the field 1404 CL is non-nil, each mobile station must return the value of the parameters specified in the request.

When the information transmitted in the field 1403 CT is equal to "1", each mobile station must send its capability of acting as a base station after a period whose value represents the value of the capability of the mobile station of becoming a base station, and, if the value contained in the field 1404 CL is non-nil, each mobile station must return the value of the parameters specified in the request.

The measurement of the capability of the mobile station of becoming a base station is determined in accordance with the answer time described below.

According to the first and second aspects of the invention, the parameters represented by the fields 1405 to 1406 include:

the operational capability CO, the available memory capacity, the DECT profiles supported, the DECT slot type supported (single, double or half-slot), and the computing capacity of the central unit.

According to the third to sixth aspects of the invention, the parameters represented by the fields 1405 to 1406 include:

the operational capability CO, the available memory capacity CM, its energy coefficient CE, its fixity coefficient CF, its network interface information IR, the DECT profiles supported, the DECT slot type supported (single, double or half-slot), and the computing capacity of the central unit.

The message 1411 "broadcast_SB_ans" (in FIG. 14B, which means approximately "answer to the message broadcast by the base station", concerns the answer of the different mobile stations to the base station. This message 1411 is sent using the oriented connection mode. It includes the following fields:

a message code field 1412, an identity field 1413, in which the mobile station specifies its identity, an answer field 1414 CR, stating the answer of the mobile station, a length field 1415 CL', representing the number of data in the answer, data fields 1416 to 1417, containing the data required by the base station.

The answer field 1414 CR can take the following values:

"accept" ("acceptance"), meaning that the communication station has the capability of acting as a base station, the data fields, if the field length 1415 indicates a non-nil length, then give information concerning the parameters required by the base station, "reject" ("refusal"), meaning that, momentarily, the mobile station cannot act as a base station or does not have information relating to the parameters required by the base station. The data fields, if the field length 1415 indicates a non-nil length, can then give an explanation for the rejection.

An absence of answer to the message 1401, on the part of a mobile station, is considered to be an answer whose answer field CR would be "reject", when a predetermined period of time has elapsed.

By default, if in the message 1401 the operational capability is not required, only the mobile stations having the capability of switching automatically from one functioning mode to another can respond by means of a message 1411.

FIG. 15 represents an exchange of messages between the base station and each mobile station having the capability of becoming a base station. The message 1401 is broadcast by the base station at regular time slots, for example every minute.

In FIG. 15, the message 1401A is a message 1401 of the type without delay (CT=0) and the length field CL is also equal to "0". Each of the mobile stations according to the first to sixth aspects of the present invention then answers by return (that is to say without waiting), in the form of messages 1411A, 1411B or 1411C. In the example described the mobile stations 204, 205 and 201 answer, the first two with an answer field CR of the "accept" type and the last with an answer field CR of the "reject" type.

In order to determine the answer field, each mobile station according to the present invention determines whether or not its operating code is one of the codes "SB/SM_auto" or "SB/SM_manual", and, in the affirmative, whether its available memory capacity is greater than the predetermined value MD_N1.

In FIG. 16, the broadcast message 1401B is a message 1401 of the type with delay (CT=1) and with parameters (CL=1), the only parameter adopted being the operational capability. The mobile stations which have a capability of functioning as a base station answer whilst waiting for a period of time which is a function of the value of their operational capability: the first mobile stations which answer have an operational capability equal to "SB/SM_auto" (message 1411D and 1411E), whilst the last mobile station which responds has an operational capability equal to "SB/SM_manual" (message 1411F).

In general terms, in the embodiment of the first and second aspects of the present invention, the period of waiting before the answer is determined as from the instant of receiving the message 1401B. This period takes the value:

$$T_{answer} = CCO \cdot t_{CO} + CPR \cdot t_{CPR} + CMD \cdot t_{CMD},$$

a formula in which:

CCO is the operational capability coefficient (which is equal to "0" if the operational capability is "SB/SM_auto", "5" if the operational capability is "SB/SM_manual", "5" if the operational capability is "SM/SM_direct" and infinity if the operational capability is equal to "SM"), CPR is the supported profiles coefficient (which is equal to "0" if the profiles supported are B, MMAP and GAP, "1" if the profiles supported are A and GAP and "2" if the only profile supported is GAP), CMD is the available memory coefficient, $t_{CCO}$ is the period allocated to the operational capability coefficient, $t_{CPR}$ is the period allocated to the supported profile coefficient, $t_{CMD}$ is the period allocated to the available memory coefficient.

For example the above three periods are equal to 10 milliseconds (the period of a DECT frame for which the answer period is always a multiple of the period of a DECT frame).

In general terms, in the embodiment of the third to sixth aspects of the present invention, the period of waiting before the answer is determined as from the instant of receiving the message 1401B. This period takes the value:

$$T_{answer} = CCO \cdot t_{CO} + CPR \cdot t_{CPR} + CND \cdot t_{CMD} + CE \cdot t_{CE} + CF \cdot t_{CF} + CIR \cdot t_{CIR},$$

a formula in which:

CCO is the operational capability coefficient (which is equal to "0" if the operational capability is "SB/SM__ auto", "5" if the operational capability is "SB/SM__ manual", "5" if the operational capability is "SM/SM__ direct" and infinity if the operational capability is equal to "SM"), CPR is the supported profiles coefficient (which is equal to "0" if the profiles supported are B, MMAP and GAP, "1" if the profiles supported are A and GAP and "2" if the only profile supported is GAP), CMD is the available memory coefficient, $t_{CCO}$ is the period allocated to the operational capability coefficient, $t_{CPR}$ is the period allocated to the supported profile coefficient, $t_{CMD}$ is the period allocated to the available memory coefficient, $t_{CE}$ is the period allocated to the energy coefficient, $t_{CF}$ is the period allocated to the fixity coefficient, $t_{CIR}$ is the period allocated to the network interface coefficient.

For example the above six periods are equal to 10 milliseconds (the period of a DECT frame for which the answer period is always a multiple of the period of a DECT frame).

In FIG. 16, the formula for calculating the answer time is limited to $$T_{answer} = CCO \cdot t_{CO},$$

since the only parameter represented in the message 1601 is the operational capability parameter.

FIG. 17 shows that the messages are transmitted according to a predetermined timing. Each communication cycle 1701, 1702 or 1703 lasts 10 milliseconds and is divided into twelve equal time slots. For a communication, one or more time slots for each cycle are allocated in a fixed manner.

FIG. 18A depicts the state of the art for establishing a connection internal to a cell. FIG. 18A shows the route of an internal communication between a mobile station 1802 and a mobile station 1803. This communication passes through a base station 1801. The information which pass at time t over the link between the mobile station 1802 and the base station 1801 next passes over the link between the base station 1801 and the mobile station 1803. There is therefore a duplication of the information and a dual occupation of the communication medium of the cell for two transmissions of the same information.

This dual occupation of the communication medium is not critical when the information transmitted is voice information. In the case of a data communication, the duplication of the links, of the information and of the occupation of the communication medium may saturate the cell and block a request for connection to the outside of the cell.

In FIGS. 18B and 18C, the functioning of the device which is the object of the first to sixth aspects of the present invention can be seen, a functioning intended to avoid such a duplication.

In this functioning:

when at least one of the mobile stations which is to communicate, referenced 1805 and 1806, is capable of functioning in base station mode, or when the mobile stations 1805 and 1806 are both capable of communicating direct, the cell is organised so that communication between the two mobile stations is direct, without passing through another station, and, in the contrary case, a mobile station 1810 capable of functioning as a base station takes this role vis-a-vis the two mobile stations 1805 and 1806 which are to communicate and constitutes with them a new cell, in order to release the initial base station 1804 from the traffic concerning communication between the mobile stations 1805 and 1806.

FIG. 19 shows, in the form of a flow diagram, how the creation of a new cell is implemented or the mobile stations are put in direct communication.

When, during an operation 1901, the base station 1804 receives a call request internal to the cell, from a mobile station 1806 and intended for a mobile station 1805, it performs a test 1902 during which it determines:

whether the connection requested requires a number of slots greater than a predetermined value (for example four slots, a value beyond which the communication is necessarily other than a voice communication), or whether the number of slots necessary is greater than the number of slots available.

When the result of test 1902 is negative, during an operation 1903, the connection between the mobile stations 1805 and 1806 is established by means of the base station, in a fashion known in the state of the art prior to the present invention.

When the result of test 1902 is positive, during a test 1904, the base station determines whether or not at least one of the mobile stations 1805 or 1806 has a current connection.

When the result of test 1904 is positive, operation 1903 is performed. When the result of test 1904 is negative, during a test 1905, the base station determines whether or not the mobile stations 1805 and 1806 are both in the list__SM__ direct. When the result of test 1905 is positive, during an operation 1906, the base station sends, to each of the mobile stations 1805 and 1806, a message "switch-mode-request" in order to indicate to them to switch into direct communication mode, and to indicate to them the identity of the mobile station which constitutes their interlocutor (see FIG. 21B).

In the event of failure of the implementation of the direct communication between the mobile stations 1805 and 1806 (for example if one of the mobile stations rejects the switching into direct communication mode), a test 1907 is performed (see below).

In the event of success in putting the mobile stations 1805 and 1806 in direct communication, at the end of their direct communication, the two mobile stations synchronise themselves once again with the base station 1804.

When the result of test 1905 is negative, during a test 1907, the base station 1804 determines whether or not the mobile station 1805 is in the list__SM__auto. When the result of test 1907 is positive, during an operation 1908, the base station 1804 sends to the mobile station 1805 a message "switch-mode-request" 2101 (FIG. 21A) in order to indicate to it that it should switch into base station mode and sends it the identity of the mobile station 1806 so that the mobile station 1805 allocates to it.

In addition, on reception of a message "switch-mode-accept" 2102 from the mobile station 1805, the base station 1804 sends to the mobile station 1806 a message "switch-base-request" 2103 containing the identity of the base station 1805, in order to indicate to the mobile station 1806 that it should synchronise itself with the new base station 1805 (see FIG. 21A).

In the event of failure of the switching of the mobile station 1805 into base station mode (for example if it rejects the switching), a test 1909 is performed (see below).

When the result of test 1907 is negative, during a test 1909, the base station 1804 determines whether or not the mobile station 1806 is in the list__SM__auto. When the result of test 1909 is positive, during an operation 1910, the base station 1804 sends to the mobile station 1806 a message "switch-mode-request" 2101 in order to indicate to it that it should switch into base station mode and sends it the identity of the mobile station 1805 so that the mobile station 1806 allocates to it.

In addition, on reception of a message "switch-mode-accept" 2102 from the mobile station 1806, the base station 1804 sends to the mobile station 1805 a message "switch-base-request" 2103 containing the identity of the base station 1806, in order to indicate to the mobile station 1805 that it should synchronise itself with the new base station 1806.

It will be seen, with regard to FIG. 21A, that, for the one of the mobile stations which switches into base station mode, as soon as the data communication 2104 between the stations 1805 and 1806 is ended, it returns to mobile station mode after having sent a message "switch-base-request" 2105 to the mobile station with which it was communicating data. The mobile station which receives this message 2105 then synchronises itself once again with the base station 1804.

In the event of failure of the switching of the mobile station 1806 into base station mode (for example if it rejects the switching), an operation 1911 is performed (see below).

When the result of test 1909 is negative, during an operation 1911 (FIG. 20), the base station determines whether or not the number of slots which remain available is strictly less than the number of slots necessary for the requested communication.

When the result of test 1911 is negative, operation 1903 is performed. When the result of test 1911 is positive, during an operation 1912, the temporary variable k is initialised to the value "0". Then, during a test 1913, the base station determines whether or not the value of the variable k is strictly less than the size of the list list__SM__auto. When the result of test 1913 is negative, operation 1903 is performed. It should be noted here that the performance of operation 1903 does not guarantee the setting up of the communication, rejection procedures being provided, in accordance with the known state of the art. When the result of test 1913 is positive, during a test 1914, the base station determines whether or not the $k^{th}$ station in the list list__SM__auto has a current connection.

When the result of test 1914 is positive, during an operation 1915, the value of the variable k is incremented by 1. Then test 1913 is reiterated. When the result of test 1914 is negative, during an operation 1916, the base station 1804 sends, to the mobile station identified at the $k^{th}$ position in the list list__SM__auto, here the mobile station 1810, a message "switch-mode-request", and then, if the mobile station under consideration 1810 agrees to take the role of the new base station, the initial base station 1804 sends, to each of the mobile stations 1805 and 1806, a message "switch-base-request", indicating the identity of the new base station 1810 so that each of the mobile stations 1805 and 1806 synchronises itself with the new base station 1810 (see FIG. 22).

At the end of the communication between the mobile stations 1805 and 1806, the new base station 1810 once again switches into mobile station functioning mode.

If, on reception of the message "switch-mode-request", the mobile station 1810 refuses to change communication mode, by sending a message "switch-mode-reject", or by not responding to the message "switch-mode-request", operation 1915 is performed by the base station 1804.

According to a variant, not shown, when the result of test 1913 is negative, the part of the flow diagram illustrated in FIGS. 19 and 20, starting from test 1907, is once again implemented, but considering the list "list__SM__manual" in place of the list "list__SM__auto".

In FIG. 21A it can be seen that, for the mobile station 1805 to switch into base station mode and for the mobile station 1806 to attach itself to the base station 1805, the initial base station 1804 sends first of all, to the mobile station 1805, a message "switch-mode-request" 2101 and awaits in return a message "switch-mode-accept" 2102. Then the initial base station 1804 sends, to the mobile station 1806, a message "switch-base-request" 2103, and awaits in return a message "switch-base-accept" 2106.

When the communication between the stations 1805 and 1806 is ended, the message "switch-base-request" 2105 is followed in return by a message "switch-base-accept" 2107.

In FIG. 21B it can be seen that, to establish direct communication between the mobile stations 1805 and 1806, during operation 1906, the base station 1804 first of all sends, to one of the mobile stations involved in the communication to be set up (for example the station 1805), a message 2111 "switch-mode-request", indicating the requested communication mode (direct communication mode) and indicating the identity of the other mobile station. On reception of a message "switch-mode-accept" 2112 from the mobile station (station 1805 in our example) for which the message "switch-mode-request" 2111 was intended, the base station 1804 sends, to the other mobile station involved in the communication (station 1806 in our example), a message "switch-mode-request" 2113 indicating the requested communication mode (direct communication mode) and indicating the identity of the other mobile station. On reception of a message "switch-mode-accept" 2114 from the mobile station (station 1806 in our example) for which the message "switch-mode-request" was intended, the two mobile stations switch into direct communication mode. At the end of the communication, the station 1805 sends, to the station 1806, a message "switch-mode-request" 2116 and receives in return a message "switch-mode-accept" 2117, and the two stations 1805 and 1806 then switch into mobile station mode.

In FIG. 22, it can be seen that, to establish a communication between the mobile stations 1805 and 1806 by means of a new base station 1810, during operation 1916, the base station 1804 first of all sends, to the mobile station 1810, a message "switch-mode-request" 2201 indicating the required communication mode, base station mode, and the two mobile stations 1805 and 1806 to which are to be opened. On reception, from the mobile station 1810, of a message "switch-mode-accept" 2202, the base station 1804 sends, to the mobile station 1806, a message "switch-base-request" 2203.

On reception of a message "switch-base-accept" 2208 in return, the base station 1804 sends, to the mobile station 1805, a message "switch-base-request" 2204. Each of the messages 2203 and 2204 indicates, to each of the mobile stations, that the new base station which concerns them is station 1810.

After the mobile station 1805 has sent a message "switch-base-accept" 2209 to the base station 1804, mobile stations 1805 and 1806 attach themselves to the new base station 1810.

By means of communications 2205 and 2206, the mobile stations 1806 and 1805 then communicate data to each other, through the new base station 1810. At the end of the communication of the data, the new base station 1810 sends, to the mobile station 1806, a message "switch-base-request" 2207 and, to the mobile station 1805, a message "switch-base-request" 2208, indicating to each of the mobile stations that the new base station is the station 1804.

On reception, in return, of messages "switch-base-accept" 2210 and 2211, from the mobile stations 1805 and 1806, the base station 1810 switches into mobile station mode.

FIG. 23 describes a flow diagram for classifying mobile stations having a capability of switching automatically into base station mode, as a function of criteria defining this capability of becoming a base station.

Naturally, a similar procedure can be followed to classify the list of mobile stations having a capability of switching manually into base station mode.

The procedure illustrated in FIG. 23 is executed by a base station when a new mobile station (hereinafter designated SMk) joins itself to a cell and sends a message illustrated in FIGS. 6A et 6B.

When this event occurs, during an operation 3201, the controller 306 of the base station effects an initialisation of the temporary variable I to the value "0". Then, during a test 3202, the controller 306 determines whether or not the value of the temporary variable I is greater than or equal to the size of the list list_SM_auto. When the result of test 3202 is positive, during an operation 3207, the identity of the mobile station SMk is inserted at position I in the list list_SM_auto, and the classification procedure is terminated.

When the result of test 3202 is negative, during a test 3203, the controller 306 determines whether or not the maximum transmission rate of the station SMk is strictly greater than the maximum rate of the $I^{th}$ station of the list list_SM_auto.

When the result of test 3203 is positive, operation 3207 is performed. When the result of test 3203 is negative, during a test 3204, the controller 306 determines whether or not the maximum transmission rate of the station SMk is strictly less than the maximum rate of the $I^{th}$ station in the list list_SM_auto.

When the result of test 3204 is positive, during an operation 3208, the value of the temporary variable I is incremented by 1 and test 3202 is reiterated. When the result of test 3204 is negative, during a test 3205, the controller 306 determines whether or not the memory capacity of the station SMk is strictly greater than the memory capacity of the $I^{th}$ station in the list list_SM_auto.

When the result of test 3205 is positive, operation 3207 is performed. When the result of test 3205 is negative, during a test 3206, the controller 306 determines whether or not the memory capacity of the station SMk is strictly less than the memory capacity of the $I^{th}$ station in the list list_SM_auto.

When the result of test 3206 is positive, operation 3208 is performed. When the result of test 3206 is negative, a new parameter for the capability of becoming a base station is considered and tests similar to tests 3203 and 3204, or 3205 and 3206, are performed, considering this new parameter in place of the maximum transmission rate (tests 3203 and 3204) or memory capacity (tests 3205 and 3206). Naturally, the parameters tested are tested in decreasing order of importance. When the last parameter has been considered with once again a negative result for the two tests concerning it, operation 3207 is performed.

It will now be described how, when a station has determined that it has better capabilities of being a base station than the current station, it sends to it a message "chg-base-request", which includes information representing its fixity coefficient CF, its energy coefficient CE and its network interface coefficient CIR.

On reception of this message the initial base station then successively compares these coefficients, in decreasing order of their importance (the communication coefficient is of greater importance than the fixity coefficient, itself of greater importance than the energy coefficient): for each coefficient successively processed:

if the initial base station has a better coefficient than the mobile station, it rejects the change in base, by means of a message "chg-base-reject", if the initial base station has a lesser coefficient than the mobile station, it accepts the change in base, by means of a message "chg-base-accept", and in the latter case (equality for the coefficient under consideration) it goes to the following coefficient.

When all the coefficients have been processed, the base station returns an acceptance of change in base, in the form of a message "chg-base-accept".

For implementing this procedure, the mobile station follows the flow diagram illustrated in FIG. 11, only operation 1104 being modified in order to transmit, in the message "chg-base-request", information representing the coefficients CF, CE and CIR.

The base station then performs the operations illustrated in FIG. 25. First of all, during an operation 2501, the base station receives a message "chg-base-request". Next, during a test 2502, the base station determines whether or not its functioning mode is the base station mode (MO=SB) and at the same time it has the capability of changing functioning mode (BA=true). When the result of test 2502 is negative, the controller 306 of the base station performs an operation 2505, during which it sends a message "chg-base-reject" to the mobile station which sent the message "chg-base-request". The procedure is then ended (on a failure).

When the result of test 2502 is positive, during a test 2503, the controller 306 determines whether or not the coefficient CIR received is nil. When the result of test 2503 is positive, during a test 2512, the controller 306 determines whether or not the coefficient CIR stored in the read-only memory 305 is nil. When the result of test 2512 is negative, operation 2505 is performed. When the result of test 2512 is positive, during a test 2504, the controller 306 determines whether or not the coefficient CF received is less than or equal to the coefficient CF stored in the read-only memory 305 and at the same time the coefficient CE received is less than or equal to the coefficient CE stored in the read-only memory 305.

When the result of test 2504 is positive, operation 2505 is performed. When the result of test 2504 is negative, an operation 2507, described below, is performed.

When the result of test 2503 is negative, during a test 2506, the controller 306 determines whether or not the coefficient CIR received is different from the coefficient CIR stored in the read-only memory and at the same time the coefficient CIR stored in the read-only memory is different from "2".

When the result of test 2506 is negative, test 2504 is performed.

When the result of test 2506 is positive, during operation 2507, the initial base station sends, to the mobile station which sent the message "chg-base-request" , a message "chg-base-accept". Next, during a test 2508, the controller 306 determines whether or not the coefficient CIR stored in the read-only memory is nil.

When the result of test 2508 is negative, the procedure is completed and the initial base station remains in base station mode. When the result of test 2508 is positive, during a test 2509, the controller 306 determines whether or not a connection is active. When the result of test 2509 is positive, it is reiterated. When the result of test 2509 is negative, during an operation 2510, the initial base station switches into mobile station mode.

Where the communication station is combined with an access to an external network, the device illustrated in FIG. 3B also has:

an external communication means 314 accessing an external line 315 of an external network, and a line controller 313.

The line controller 313 is adapted to detect the taking of the external line 315 by the external communication means 314.

In this case, it functions by implementing the flow diagram illustrated in FIG. 26. It will be seen there that initially such a device functions in base station mode, operation 2601. It then performs a test 2602, during which it determines whether or not the external line is taken, using the line controller 313.

When the result of test 2602 is negative, it is reiterated. When the result of test 2602 is positive, during a test 2603, it determines whether or not access to the external line is effected by a mobile station. When the result of test 2603 is positive, test 2602 is reiterated. When the result of test 2603 is negative, during an operation 2604, the controller 306 causes the operating mode to switch into mobile station mode. Then, during a test 2605, the controller 306 determines whether or not the external line is busy, using the line controller 313. When the result of test 2605 is negative, it is reiterated. When the result of test 2605 is positive, during an operation 2606, the functioning mode is switched into base station mode.

The procedure followed by the base station for requesting a new base station when its communication quality is too low, is illustrated in FIG. 27.

The station under consideration operating in base station mode, operation 2301, its controller 306 performs a test 2302 during which it determines whether or not:

the quantity of energy NB available is less than the quantity NB_min, or the quality of the radio signal QR is less than the value QR_min.

When the result of test 2302 is negative, during an operation 2310, the controller 306 waits for a time T7, and then the test 2302 is reiterated. When the result of test 2302 is positive, during an operation 2303, the controller 306 performs a procedure of seeking a new base station.

Following the operation 2303, during a test 2304, the controller 306 determines whether or not a new base station has been found. When the result of test 2304 is positive, during an operation 2305, the value DB is set to the value "1" and then, during an operation 2306, the operating mode of the base station under consideration is switched into mobile station mode.

When the result of test 2304 is negative, during a test 2307, the controller 306 determines whether or not the quantity of available energy NB is less than the value NB-min.

When the result of test 2307 is positive, operation 2306 is performed. When the result of test 2307 is negative, during an operation 2309, the central unit waits for a time T8, and then test 2302 is reiterated.

Naturally, the procedure illustrated in FIG. 27 can be followed only when no connection is active. Otherwise it is necessary to add a connection deactivation operation, before operation 2306.

For a mobile station (see FIG. 28), when it receives a message "new-base-request" which designates it, operation 2801, its controller 306 performs first of all a test 2802, during which it determines whether or not on the one hand the quantity of energy NB available is greater than the quantity NB_max and on the other hand, at the same time, the quality of the radio signal QR is higher than the value QR_max.

When the result of test 2802 is negative, during an operation 2807, the controller 306 sends a message "new-base-reject" to the base station, and thus ends the procedure of changing its operating mode. When the result of test 2802 is positive, during an operation 2803, the central unit 306 sends, to the base station, a message "new-base-accept".

Following operation 2803, the controller 306 determines, during a test 2804, whether or not it has received the information necessary for its functioning in base station mode.

When the result of test 2804 is negative, it is reiterated. When the result of test 2804 is positive, during an operation 2805, the controller 306 of the mobile station under consideration sends an acknowledgement message "ack" to the initial base station. Then, during an operation 2806, the controller 306 switches into base station operating mode. The procedure of switching operating mode because of failure of the initial base station is then ended.

In order to evaluate the communication quality, a first method consists of determining a transmission error rate.

A second method is illustrated in FIG. 29. It is intended to be executed at regular time slots. First of all, during an operation 2901, the controller 306 of the base station effects an initialisation of the variables which are used in the flow diagram of FIG. 29. Next, during operation 2902, the controller 306 causes a message "signal-strength-request" to be broadcast to all the mobile stations in the cell.

Each mobile station then returns a message representing the power of the message "signal-strength-request" which it has received (see in this regard, in the DECT standard, the use of the primitive "PL_ME_SIG_STR_req").

So that all the answers have the time to reach it, the base station waits for a time T9, operation 2903, before performing an operation 2904, during which the variable QR is determined as being the mean of the values of the answers obtained during operation 2903.

FIG. 30 illustrates a procedure followed by a mobile station which has previously been a base station and which has recovered the capabilities of functioning correctly in base station mode.

This station being in mobile station operating mode, operation 3101, its controller 306 performs a test 3102, during which it determines whether or not, all at the same time:

the quantity of energy NB available is greater than the quantity NB_max, the quality of the radio signal QR is higher than the value QR_max, and the value of the variable DB is equal to "1".

When the result of test 3102 is negative, the controller 306 performs an operation 3110, during which it waits for a time T10. Then it reiterates test 3102.

When the result of test 3102 is positive, during an operation 3103, the controller 306 gives the value "0" to the variable DB. Then, during an operation 3104, the controller 306 listens out on the channel Q. Next, during a test 3105, the controller 306 determines whether its capabilities of being a base station are better than those of the base station currently active.

When the result of test 3105 is negative, the procedure is ended (by a failure). When the result of test 3105 is positive, during an operation 3106, the controller 306 sends a message "chg-base-request" to the active base station. During operation 3106, the mobile station under consideration waits for a sufficient period to enable a communication station according to the present invention and functioning in base station mode to answer, before performing a test 3107.

Then, during test 3107, the controller 306 determines whether or not it has received a message "chg-base-accept" from the active base station. When the result of test 3107 is negative, the controller 306 considers that the request to change base station has failed and the procedure is ended (on a failure). When the result of test 3107 is positive, during operation 3108, the controller 306 switches the operating mode into base station mode. Then the procedure is ended (with success).

FIG. 24 shows a second functioning mode of a communication device according to the fourth and sixth aspects of the present invention. When such a communication device has not detected any base station (in accordance with the prior art or after having performed all the operations and tests illustrated in FIG. 4, including one of operations 411 or 415, but without reproducing operation 402), and it has an information transmission to effect, it takes the role of base station throughout the transmission.

To this end, during an operation 2401, the station under consideration determines that it has an information transmission to effect. It then reproduces operations 401 to 403 in FIG. 4, and if a base station which provides it with a right of access is detected, it locks onto this base station, but if no base station is detected, it performs operation 2402 during which the controller 306 causes the operating mode of the device to switch into base station mode.

Next, during an operation 2403, the device waits for a predetermined period T5, whilst regularly transmitting synchronisation signals. This period is intended to leave time for the mobile station with which the device wishes to communicate to lock onto it. Then, during an operation 2404, the device transmits an identification request to the mobile station with which it wishes to communicate. Next, during an operation 2405, it allows a predetermined period T6 to pass, which must be sufficient for the mobile station called to be able to respond.

Then, during a test 2406, the device determines whether or not it has received, from at least one mobile station, an answer to the identification request. When the result of test 2406 is negative, during an operation 2410, the controller 306 causes the functioning mode of the device to switch into mobile station mode. When the result of test 2406 is positive, during a test 2407, the device determines whether or not the identity of one of the mobile stations corresponds to the identity of the station with which it must communicate.

When the result of test 2407 is negative, the operation 2410 is performed. When the result of test 2407 is positive, during an operation 2408, the transmission which the device is to make is effected. Then, at the end of the transmission, during an operation 2409, the transmission is ended. Finally, operation 2410 is performed.

According to a first variant, all the communication requests issuing from the other mobile stations are refused, the base station testing the identity of each mobile station requesting communication and accepting only the communications coming from the mobile station with which it has communicated during operation 2408 and which are intended for it. According to this first variant, the other mobile stations therefore do not then benefit from the capability of the device to change operating mode.

According to a second variant, if, whilst the device is acting as a base station, a mobile station locks onto it and attempts to establish a communication, the device behaves as a base station, until the attempt is abandoned or, if the attempt succeeds, until the end of the communication, or else until another base station substitutes itself for it (see FIGS. 9 to 13). To implement this second variant, after the operation 2409 and before performing operation 2410, the controller 306 of the communication station determines, during a test (not shown), whether or not a connection with it is active, and in the affirmative reiterates this test, at regular time slots. If this test determines that no connection is active, operation 2410 is performed.

FIG. 31 depicts, in one and the same local area or "cell" 4100, different communication stations:

a so-called "initial" base station 4101, supplying a synchronisation signal to the other communication stations, and two communication devices or stations 4102 and 4103 initially operating in mobile station operating mode, that is to say, using the synchronisation signal supplied by the communication device 4101.

By way of example:

the communication stations 4102 and 4103 are multimedia terminals meeting the AB type data profile DECT standard, this DECT profile allowing notably communication devices 4102 and 4103 to exchange data (in file form, for example) on the radio link with a transmission rate which may go up to 552 kbits/second, the communication devices 4102 and 4103 are capable of behaving, in the cell 4100, as a base station or as a mobile station, and the base station 4101 is a conventional type DECT base station supporting both voice or data communications as specified by the DECT standard.

The communication devices in accordance with the eighth aspect of the present invention, 4102 and 4103, can be configured by their user to request a transmission in confidential mode or in normal mode.

Each device in accordance with the eighth aspect of the present invention, 4102 or 4103, is set, at the time of its initialisation, into mobile station operating mode.

When the initialisation is performed, each communication device operating as a mobile station can initiate or accept a connection through the intermediary of the base station to which the mobile station has been locked. Each device can then communicate with the other devices operating in mobile station mode which are also locked on the same base station and with the base station itself, in particular when the latter provides a point of access to another network, for example a telephone network.

It should be noted here that, if there is no base station sending a synchronisation signal, no communication is possible between the mobile stations, in accordance with the prior art.

In FIG. 32, it may be seen that each communication device in accordance with the eighth aspect of the present invention, 4102 or 4103, has, interconnected by a bus 4201:

a controller 4206, a DECT baseband unit 4202, a DECT radio unit 4203, itself connected, furthermore, to a transmitting/receiving antenna 4207, a random access memory 4204, a read-only memory 4205, a keyboard 4210, a display 4208, an electrical power supply 4209 (cell, battery, or mains), and an input/output interface 4211.

The controller 4206 and the DECT baseband unit 4202 is, in fact, composed of a processor and an operating program stored in read-only memory 4205.

The DECT baseband unit 4202 and the DECT radio unit are of known type and are adapted to implement the operating modes of a base station and those of a mobile station, with all the capabilities of the DECT standard known from before the present invention.

The controller 4206 is adapted to implement the method of the seventh aspect of the invention and, in particular, the flow diagrams illustrated in FIGS. 36 and 37.

The random access memory 4204 stores, in registers which, for convenience, each bear the same name as the data they contain:

a variable "OM" representing the current operating mode, mobile station or base station, and a memory area "Tx/Rx" reserved for the reception or transmission of data.

The read-only memory 4205 stores, in registers which, for convenience, each bear the same name as the data they contain:

an information item representing its identity, an information item "OC" representing the operational capability of the device. This information item can take the following values:

"BS": the device can operate only in base station mode,

"MS": the device can operate only in mobile station mode,

"BS/MS_manual": the device can change operating mode through the intervention of its user, "BS/MS_auto": the device can automatically change operating mode, "MS/MS_direct": the device can communicate directly with another mobile in which the "OC" information item takes the value "MS/MS_direct", and an information item "BA" representing the capability of automatic or manual switching from a base station operating mode to a mobile station operating mode and vice versa ("BA" being equal to "true" when this capability exists and "false" otherwise), and time delay values T1 to T7.

The read-only memory 4205 constitutes a means of storing information readable by a computer-or a microprocessor, storing instructions of a computer program, characterised in that it allows the implementation of the method of the seventh aspect of the invention. According to a variant, the read-only memory 4205 is removable, partially or totally, and includes, for example, a magnetic tape, a flash memory, a diskette or a CD-ROM.

The procedure followed by the controller 4206 for setting up a confidential communication between the communication devices 4102 and 4103 is the object of FIGS. 36 and 37.

FIG. 33 depicts how, when the user has chosen a normal communication mode, in accordance with the prior art, an encrypted communication is established between the two communication devices 4102 and 4103, through the intermediary of the base station 4101. This communication mode is thus used when the normal communication mode is chosen by the user of the device 4102, for entering into communication with the communication device 4103.

When the communication device 4102 has to enter into communication with the communication device 4103, it performs a step of requesting a connection 4301 in contact with the base station 4101. Next, the base station 4101 performs a step of requesting a connection 4302 in contact with the mobile station 4103. During each of these steps 4301 and 4302, the connection parameters (passband, encryption, etc) are negotiated between the stations involved in these steps. Furthermore, a procedure for authenticating the different units involved in the connection takes place, as well as the exchange of an encryption key which then serves to encrypt the data. These procedures are followed at the level of the network layer of the DECT standard.

Next, transmission of the data can take place. For the data passing from the mobile station 4102 to the mobile station 4103, a first transmission 4303 first takes place between the communication device 4102 and the base station 4101. The data are first encrypted at the level of the channel access (MAC) layer of the DECT standard. When these data are received by the base station, they are first decrypted at the level of the MAC layer of the base station, and then afterwards re-encrypted in order to be sent by the base station 4101, to the communication device 4103, during the transmission 4304.

It should be noted that, in this situation, in accordance with the prior art previous to the present invention, the base station 4101 is capable of processing or storing all the decrypted data which pass through it. There is, therefore, from the point of view of the communicating devices 4102 and 4103, a "hole" in the security of the communication, at the level of the base station 4101, the latter being able to "listen to" the communication.

FIG. 34 depicts how, in accordance with the prior art, a communication encrypted by the use of a proprietary encryption algorithm is established between mobile stations 4410 and 4411, through the intermediary of the base station 4101.

First of all, two steps 4401 and 4402 are identical to the phases 4301 and 4302 illustrated in FIG. 33, without, however, there being any exchange of encryption key. Next, during a step 4403, which is not located at the level of the network signalling layer of the DECT standard but at the level of its user layer, the encryption key exchange is performed. This means that these data are transmitted transparently by the base station 4101 (which means that the base station considers these data as user data and therefore, normally, it must not attempt to interpret these data unlike the signalling messages implemented at the level of the DECT network layer) between the stations 4410 and 4411.

Once the phase 4403 is finished, the encrypted data can be transmitted confidentially and transparently at the level of the base station 4101, during a phase 4404. For the data passing from the mobile station 4410 to the mobile station 4411, the data are encrypted at the level of the user layer of the mobile station 4410 and decrypted at the level of the user layer of the mobile station 4411.

This solution requires that the mobile stations 4410 and 4411 both use the same proprietary encryption algorithm, which limits its use.

FIG. 35 depicts, in a manner similar to FIGS. 33 and 34, how the present invention provides the confidentiality of a communication between the communication devices 4102 and 4103, when the user has chosen the confidential mode for this communication.

The steps 4501 and 4502 correspond to the establishment of a DECT communication between the communication devices 4102 and 4103, with no exchange of encryption key. These steps 4501 and 4502 are thus identical to the steps 4401 and 4402. When the connection between the communication devices 4102 and 4103 is established with the help of the initial base station 4101, the communication device 4102 sends a message 4503 which passes, transparently, through the base station 4101, in order to reach the communication device 4103. This message 4503 contains a request for transmission in confidential mode and the operating mode in which the device 4103 must operate during the confidential transmission. The device 4103 then replies with its acceptance or rejection of the confidential communication request, by means of a message 4504.

In the example illustrated in FIG. 35, the communication device 4103 receives an instruction with a view to its operation in mobile station operating mode and the message 4504 signifies an acceptance of the confidential communication.

Following reception of the message 4504, the communication device 4102 terminates the connection with the communication device 4103, by implementing the appropriate procedures provided for by the DECT standard, during the steps 4505 and 4506.

When the connection with the communication device 4103, through the base station 4101, is closed, the communication device 4102 automatically switches into base station operating mode. The communication device 4102 is then referred to as the "new base station". Next, the communication device 4103 starts a procedure for synchronising itself with the new base station 4102, after having performed a detachment procedure with the base station 4101. When the communication device 4103 is synchronised with the communication device 4102, the communication device 4103 uses the procedure defined by the DECT standard for establishing a connection in encrypted mode (exchange of messages 4507 and 4508), in order to exchange confidential data between the communication devices 4102 and 4103.

It should be noted that there are then no more "holes" in the security since all the other stations are outside the cell composed of the communication devices 4102 and 4103.

At the end of the communication between the communication devices 4102 and 4103, the communication device 4102 again switches in order to return to the mobile station operating mode.

FIGS. 36 and 37 depict, schematically, two flow diagrams of the operation of communication devices in accordance with the seventh and eighth aspects of the present invention, with a view to establishing a confidential communication mode. In the example depicted, it is the communication device 4102 which is attempting to communicate with the communication device 4103. It is considered that there are no other connections in progress when the procedures illustrated in FIGS. 36 and 37 are implemented.

When the user of the communication device 4102 wishes to establish a confidential communication with the communication device 4103, he configures, to that end, the communication device 4102. During the test 4601, the controller 4206 determines whether or not a confidential call request has been made by the software application used by the user.

When the result of the test 4601 is negative, the device 4102 operates in a manner in accordance with the prior art. When the result of the test 4601 is positive, the controller 4206 uses the DECT standard network layer procedures relating to the establishment of a connection for calling the device 4103. Next, the step 4603 consists of waiting for a duration T41, to allow the communication time to be established. Next, during a test 4604, the controller 4206 determines whether or not the connection with the communication device 4103 is correctly established. When the result of the test 4604 is negative, the controller 4206 performs a communication rejection operation 4613 to the software application in the process of operating. For example, a software interrupt is triggered and the user must choose either to perform a nonconfidential transmission, or to abandon the transmission. When the result of the test 4604 is positive, during a test 4605, the controller 4206 determines whether or not automatic switching of the communication device 4102 is authorised, for this device 4102, by determining whether or not, simultaneously, the value of the register OC of the read-only memory 4205 is equal to BS/MS_auto, on the one hand, and the value of the variable BA is "true", on the other hand.

When the result of the test 4605 is negative, during an operation 4606, the communication device 4102 sends a confidential call to the communication device 4103, specifying that the communication device 4103 must switch into base station operating mode. Then, during a step 4607, the controller 4206 allows a duration T42 to pass. Next, during a test 4608, the controller 4206 determines whether it has received, from the communication device 4103, a "confidential_accept" message representing an acceptance of the conditions of the proposed confidential communication. When the result of the test 4608 is negative, during the operation 4613, a communication rejection procedure is triggered. When the result of the test 4608 is positive, during an operation 4609, the connection between the communication devices 4102 and 4103 is closed, using the known procedures of the DECT standard.

It should be noted here that, at the same time, the communication device 4103 switches its operating mode in order to start operating in base station mode (see operation 4715, FIG. 37).

Then, during an operation 4610, the communication device 4102 synchronises itself with the new base station constituted by the communication device 4103.

Next, the communication device 4102 allows a duration T43 to pass, during an operation 4611. Next, during a test 4612, the controller 4206 determines whether or not the communication device 4102 is synchronised with the communication device 4103. When the result of the test 4612 is negative, the operation 4613 is performed. When the result of the test 4612 is positive, during an operation 4621, the controller 4206 sends, to the new base station 4103, a request for connection, in encrypted mode, according to the known procedures of the DECT standard and the communication takes place, in confidential mode, between the communication devices 4102 and 4103.

When the result of the test 4605 is positive, during an operation 4614, the communication device 4102 sends a confidential call to the communication device 4103, specifying that the communication device 4103 must remain in mobile station operating mode. Then, during a step 4615, the controller 4206 allows a duration T44 to pass. Next, during a test 4616, the controller 4206 determines whether it has received, from the communication device 4103, a "confidential_accept" message representing an acceptance of the conditions of the proposed confidential communication. When the result of the test 4616 is negative, during the operation 4613, a communication rejection procedure is triggered. When the result of the test 4616 is positive, during an operation 4617, the connection between the communication devices 4102 and 4103 is closed, using the known procedures of the DECT standard.

Next, during an operation 4618, the controller 4206 performs an automatic switching into base station operating mode, that is to say, in particular, starts to send synchronisation signals intended so that mobile stations in search of a base station with which they might get into step, can synchronise themselves with it, and allocates a right of access to the single communication station 4103. Next, during an operation 4619, the controller 4206 allows a duration T45 to pass. Then, during a test 4620, the controller 4206 determines whether or not the connection with the communication device 4102 is effective. When the result of the test 4620 is negative, the operation 4613 is performed. When the result of the test 4620 is positive, the confidential communication is performed between the devices 4102 and 4103.

When the confidential communication is finished, that communication station which had switched into base station operating mode again changes operating mode (operation not depicted).

The two communication devices involved in the confidential communication then synchronise themselves with the old base station and, in order to make known to it that they can again communicate with it, they can, as a variant, initiate an attachment procedure as specified by the DECT standard.

Before desynchronising themselves from the initial base station Oust before the establishment of the confidential communication, during the operations 4610 or 4707 and/or during the steps 4618 and 4715 before the device concerned switches into base station operating mode), in order to make known its unavailability during the duration of this confidential communication, the communication devices 4102 and 4103 can initiate a detachment procedure in accordance with the DECT standard.

It should be noted here that the messages "confidential_call" (operations 4606 and 4614) and "confidential_accept" (tests 4608 and 4616) do not form part of the DECT protocol signalling, but this message is transferred, in accordance with the DECT standard, as user data. This message is therefore transferred transparently by the initial base station 4101 between the communication devices 4102 and 4103.

FIG. 37 illustrates how the communication device 4103 operates on reception of a "confidential_call" message from the communication device 4102, that is to say when a test 4701 for reception of such a message gives a positive result.

The controller 4206 of the device 4103 determines, during a test 4702, whether or not it accepts the communication.

When the result of the test 4702 is negative, the device 4103 remains in mobile station operating mode after having performed an alarm triggering operation 4711 intended to inform the user of the communication device 4103 that an attempt at a confidential communication with the communication device 4102 has failed.

When the result of the test 4702 is positive, during a test 4704, the controller 4206 of the communication device 4103 determines whether or not the "confidential_call" message prescribes that the communication device 4103 must operate in mobile station mode.

When the result of the test 4704 is negative, during a test 4712, the controller 4206 of the communication device 4103 determines whether or not automatic switching is authorised, for this device 4103, by determining whether or not, simultaneously, the value of the register OC of the read-only memory 4205 is equal to BS/MS_auto, on the one hand, and the value of the variable BA is "true", on the other hand.

When the result of the test 4712 is negative, the device 4103 performs the operation 4711, and remains in mobile station operating mode. When the result of the test 4712 is positive, during an operation 4713, the controller 4206 of the communication device 4103 sends a "confidential_accept" message to the communication device 4102.

Then, during a test 4714, the communication device 4103 determines whether or not the connection with the communication device 4102 is closed. When the result of the test 4714 is negative, it is reiterated. When the result of the test 4714 is positive, during an operation 4715, the communication device 4103 switches into base station, operating mode, allocating a right of access to the single communication device 4102.

Then, during an operation 4716, the controller 4206 allows a duration T47 to pass. Next, during a test 4717, the controller 4206 of the communication device 4103 determines whether or not the connection with the communication device 4102 is correct.

When the result of the test 4717 is negative, the alarm operation 4711 is triggered, and the communication device 4103 remains in mobile station operating mode. When the result of the test 4717 is positive, the confidential communication takes place between the communication devices 4102 and 4103.

When the result of the test 4704 is positive, during an operation 4705, the controller 4206 of the communication device 4103 sends, to the communication device 4102, a "confidential_accept" message. Then, during a test 4706, the controller 4206 of the communication device 4103 determines whether or not the connection with the device 4102 is closed. When the result of the test 4706 is negative, it is reiterated.

When the result of the test 4706 is positive, during an operation 4707, the communication device 4103 synchronises itself with the communication device 4102, which then acts in base station operating mode (see operation 4618, FIG. 36).

Then, during an operation 4708, the controller 4206 allows a duration T46 to pass. Next, during a test 4709, the controller 4206 determines whether or not the synchronisation with the new base station 4102 is correct. When the result of the test 4709 is negative, the operation 4711 is performed. When the result of the test 4709 is positive, during an operation 4710, the controller 4206 sends, to the new base station 4102, a connection request, in accordance with the known procedures of the DECT standard and the communication takes place, in confidential mode, between the communication devices 4102 and 4103.

Where the confidential communication has to concern three communication devices, a number of ways of modifying the flow diagrams illustrated in FIGS. 36 and 37 can be used:

where the base station is the station which implements the step 4614 illustrated in FIG. 36, this communication device sends two confidential messages and expects, in return, two acceptance messages. According to variant, the reception of only one of the acceptance messages causes the continuation of the putting into communication procedure, or, on the contrary, its abandonment.

Where the device initiating the confidential communication, the one which implements the step 4606 illustrated in FIG. 36, cannot switch into base station operating mode, it must determine which of the other communication devices involved in the communication must switch into base station operating mode.

A first way consists of first performing the procedure with one, at random, of the two devices concerned, and then, in the event of failure (noted by the absence of reply from this device), with the other device concerned, that one then allocating a right of access to each of the other communication devices concerned and requesting them to attach themselves to it.

A second way consists of interrogating each of the communication devices concerned about the value of its variables BA and OC, and then choosing one of the devices which replied indicating that it was capable of switching into base station operating mode.

What is claimed is:

1. A method of communicating between communication stations adapted to communicate with each other when at least one of said communication stations supplies a control signal, said one of said stations then functioning in a "base station" mode, and other stations not supplying a control signal then functioning in a "mobile station" mode, the method being performed by a first communication station needing to send information, the method comprising the steps of:

determining the presence of a second communication station functioning in base station mode able to convey said information; and in a case where the determining step determines that no second communication station is functioning in base station mode and is capable of conveying said information, performing a switching operation, during which said first communication station switches to function in base station mode.

2. A method according to claim 1, wherein, when the first communication station functions in base station mode, it performs an operation of determining the completion of said communication and, when the communication of said information is completed, said first communication station performs a switching operation during which said first communication station switches to function in mobile station mode.

3. A method according to claim 2, wherein, when the communication of said information is completed, said first communication station performs an operation of determining the existence of any communication in which it serves as a base station and, when no such communication exists, performs a switching operation during which said first communication station switches to function in mobile station mode.

4. A method according to claim 1, wherein, following said operation of switching into base station mode, said first communication station allows only a communication between itself and a communication station to which said information is to be communicated.

5. A method according to claim 1, further comprising the steps of, performed by said first communication station, when it is functioning in the base station mode:

determining the presence of a station functioning in mobile station mode; and in a case where it is determined that no station is functioning in the mobile station mode, performing a switching operation during which said station switches to mobile station mode.

6. An information storage means which can be read by a computer or a microprocessor, the information storage means storing instructions of a computer program for performing a communication method according to any one of claims 1 to 4.

7. An information storage means which is partially or totally removable and which can be read by a computer or a microprocessor, the information storage means storing instructions of a computer program for performing a communication method according to any one of claims 1 to 4.

8. A method according to claim 1, the method further being performed for the establishment of a confidential communication between at least two communication stations initially functioning in the mobile station mode, in contact with an "initial" base station, the method further comprising the steps of:

switching into a "new" base station mode one of the communication stations initially functioning in the mobile station mode; and establishing communication between the new base station and each of the communication stations concerned by the confidential communication.

9. A device for communicating between communication stations adapted to communicate with each other when at least one of said communication stations supplies a control signal, said one of said stations then functioning in a "base station" mode and other stations not supplying a control signal then functioning in a "mobile station" mode, the device having a processing means adapted to perform process steps when a first communication station of which the processing means forms a part needs to send information, the process steps comprising:

determining the presence of a second communication station functioning in base station mode able to convey said information; and in a case where it is determined that no second communication station is functioning in base station mode and is capable of conveying said information, switching the functioning of said communication into base station mode.

10. A device according to claim 9, wherein, the processing means further performs the steps of, when the first communication station is functioning in base station mode, determining completion of said communication and, when the communication of said information is completed, switching said first communication station into mobile station mode.

11. A device according to claim 10, wherein, the processing means further performs the steps of, when the communication of said information is completed, determining the existence of any communication in which the communication station which has said processing means serves as a base station and, when no such communication exists, switching the functioning mode of said first communication station into mobile station mode.

12. A device according to claim 9, wherein, the processing means further performs the step of, following the switching into base station mode, allowing only a communication between the communication station which contains the processing means and a communication station to which the information is to be communicated.

13. A device according to claim 9, wherein the processing means further performs the steps of, when the communication station which contains the processing means is functioning in base station mode:

determining the presence of a station functioning in mobile station mode; and in case where it is determined that no station is functioning in mobile station mode, switching into mobile station mode.

14. A communication network, comprising at least two devices according to any one of claims 9 to 13.

15. A device according to any one of claims 9 to 13, wherein the device is included in a telephone.

16. A device according to any one of claims 9 to 13, wherein the device is included in a photographic apparatus.

17. A device according to any one of claims 9 to 13, wherein the device is included in a printer.

18. A device according to any one of claims 9 to 13, wherein the device is included in a scanner.

19. A device according to any one of claims 9 to 13, wherein the device is included in a camera.

20. A device according to any one of claims 9 to 13, wherein the device is included in a computer.

21. A device according to any one of claims 9 to 13, wherein the device is included in a facsimile machine.

22. A device according to any one of claims 9 to 13, wherein the device is included in a television receiver.

23. A device according to any one of claims 9 to 13, wherein the device is included in an audio/video player.

24. A device according to claim 9, wherein the processing means further performs process steps of:

determining a request for confidential communication between at least two stations initially functioning in mobile station mode;

switching the mode of one of the communication stations concerned by a confidential communication initially functioning in the mobile station mode to base station mode, said station then being referred to as a "new base station"; and establishing communication between the new base station and each of the communication stations concerned by the confidential communication.

* * * * *

UNITED STATES PATENT AND TRADEMARK OFFICE
CERTIFICATE OF CORRECTION

PATENT NO. : 6,574,452 B1
DATED : June 3, 2003
INVENTOR(S) : Morvan et al.

It is certified that error appears in the above-identified patent and that said Letters Patent is hereby corrected as shown below:

Column 16,
Line 11, "which:" should read -- which --.

Column 27,
Line 41, "station", concerns" should read -- station".), concerns --; and
Line 49, "CL'," should read -- CL, --.

Column 30,
Line 62, "to" should read -- access rights to --.

Column 31,
Line 13, "to" should read -- access rights to --.

Column 32,
Line 53, "are" should read -- access rights are --.

Column 33,
Line 22, "et" should read -- and --.

Column 39,
Line 53, "-or" should read -- or --.

Column 43,
Line 26, "Oust" should read -- (just --.

Signed and Sealed this

Twenty-eighth Day of December, 2004

JON W. DUDAS
*Director of the United States Patent and Trademark Office*